(12) United States Patent
Matsuya et al.

(10) Patent No.: US 11,493,905 B2
(45) Date of Patent: Nov. 8, 2022

(54) SYSTEM AND METHOD FOR SUPPORTING PRODUCTION MANAGEMENT

(71) Applicant: Hitachi, Ltd., Tokyo (JP)

(72) Inventors: Kazuhiro Matsuya, Tokyo (JP);
Yusuke Yajima, Tokyo (JP);
Kenichirou Kawakami, Tokyo (JP);
Shigeyasu Kubo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 472 days.

(21) Appl. No.: 16/579,960

(22) Filed: Sep. 24, 2019

(65) Prior Publication Data
US 2020/0150636 A1 May 14, 2020

(30) Foreign Application Priority Data
Nov. 8, 2018 (JP) .............................. JP2018-210221

(51) Int. Cl.
G06Q 50/04 (2012.01)
G05B 19/418 (2006.01)

(52) U.S. Cl.
CPC ....... *G05B 19/41865* (2013.01); *G06Q 50/04* (2013.01); *G05B 2219/31318* (2013.01);
(Continued)

(58) Field of Classification Search
None
See application file for complete search history.

(56) References Cited

U.S. PATENT DOCUMENTS 5,093,794 A * 3/1992 Howie ............. G05B 19/41865
700/100
5,255,197 A * 10/1993 Iida .................... G05B 19/4184
700/115
(Continued)

FOREIGN PATENT DOCUMENTS

JP 2010170368 A * 8/2010
JP 2011-242831 A 12/2011
(Continued)

OTHER PUBLICATIONS

Torenli "Assembly line design and optimization" (https://www.proplanner.com/media/cms/ArtunTorenli_Thesis_MAN_Public_41372EB3DF63E.pdf) (Year: 2009).*
(Continued)

*Primary Examiner* — Sujay Koneru
(74) *Attorney, Agent, or Firm* — Crowell & Moring LLP

(57) ABSTRACT

The production management support system analyzes, on the basis of one or more attentional perspectives on a plurality of different models of products, past record information that includes information as a past record which shows, for each product loaded in a production system in which the plurality of different models of products are loaded and a sequential order of two or more of a plurality of steps is different depending on the model, an execution time of each of the steps and that serves as a basis for a production management chart showing a production situation, to detect, among display objects displayed in the production management chart, a display object satisfying one or more requirements associated with the one or more attentional perspectives. The system performs accentuated display on at least one of the detected display objects.

10 Claims, 37 Drawing Sheets

(52) U.S. Cl.
CPC .............. *G05B 2219/31405* (2013.01); *G05B 2219/32291* (2013.01)

(56) References Cited

U.S. PATENT DOCUMENTS

| | | | | |
|---|---|---|---|---|
| 6,141,598 | A * | 10/2000 | Nam | B23P 21/004 700/95 |
| 7,043,318 | B1 * | 5/2006 | Barto | G06N 5/043 703/22 |
| 10,878,350 | B1 * | 12/2020 | Cai | G06F 3/0484 |
| 11,330,870 | B2 * | 5/2022 | Manz | A43D 119/00 |
| 2002/0156663 | A1 * | 10/2002 | Weber | G06Q 10/06375 705/7.11 |
| 2006/0025877 | A1 * | 2/2006 | Watanabe | G05B 19/41865 700/99 |
| 2006/0100729 | A1 * | 5/2006 | Daferner | G06Q 10/04 705/28 |
| 2011/0258837 | A1 * | 10/2011 | Scannon | B23P 25/00 29/33 R |
| 2013/0159007 | A1 * | 6/2013 | Brosche | G06Q 10/06 705/1.1 |
| 2014/0067468 | A1 * | 3/2014 | Marwaha | G06Q 10/04 705/7.31 |
| 2015/0032497 | A1 * | 1/2015 | Ishibashi | G06Q 10/063 705/7.25 |
| 2015/0097840 | A1 * | 4/2015 | Nishimura | G06Q 10/0639 345/443 |
| 2015/0101133 | A1 * | 4/2015 | Manz | A43B 23/0235 12/142 R |
| 2016/0132754 | A1 * | 5/2016 | Akhbardeh | G06T 7/215 382/103 |
| 2018/0129187 | A1 * | 5/2018 | Spieker | G05B 19/4099 |
| 2019/0202133 | A1 * | 7/2019 | Jacobs, II | B33Y 10/00 |

FOREIGN PATENT DOCUMENTS

| | | |
|---|---|---|
| JP | 2015-75795 A | 4/2015 |
| JP | 2017-102544 A | 6/2017 |
| JP | 6287018 B2 | 3/2018 |

OTHER PUBLICATIONS

Japanese-language Office Action issued in Japanese Application No. 2018-210221 dated Jul. 28, 2020 with English translation (eight (8) pages).

* cited by examiner

FIG. 5

PAST RECORD TABLE
351

| PRODUCT ID /501 | STARTING TIME OF STEP 1 /502S1 | ENDING TIME OF STEP 1 /502E1 | STARTING TIME OF STEP 2 /502S2 | ENDING TIME OF STEP 2 /502E2 | STARTING TIME OF STEP 3 /502S3 | ENDING TIME OF STEP 3 /502E3 |
|---|---|---|---|---|---|---|
| ... | ... | ... | ... | ... | ... | ... |
| 0011 | 2017/6/30 13:21:06 | 2017/6/30 13:27:12 | 2017/6/30 13:29:13 | 2017/6/30 13:34:15 | 2017/6/30 13:37:12 | 2017/6/30 13:42:19 |
| 0012 | 2017/6/30 13:22:10 | 2017/6/30 13:28:16 | 2017/6/30 13:30:19 | 2017/6/30 13:35:23 | 2017/6/30 13:38:20 | 2017/6/30 13:43:25 |
| 0013 | 2017/6/30 13:23:14 | 2017/6/30 13:29:20 | 2017/6/30 13:33:23 | 2017/6/30 13:38:27 | 2017/6/30 13:41:01 | 2017/6/30 13:46:02 |
| 0014 | 2017/6/30 13:24:22 | 2017/6/30 13:30:30 | 2017/6/30 13:42:18 | 2017/6/30 13:47:24 | 2017/6/30 13:49:08 | 2017/6/30 13:54:08 |
| 0015 | 2017/6/30 13:30:24 | 2017/6/30 13:36:28 | 2017/6/30 13:42:58 | 2017/6/30 13:48:07 | 2017/6/30 13:49:55 | 2017/6/30 13:55:01 |
| ... | ... | ... | ... | ... | ... | ... |

FIG. 6

EVENT TABLE 352

| EVENT ID /601 | EVENT NAME /602 | STARTING TIME /603 | ENDING TIME /604 | OCCURRENCE STEP /605 | PRODUCT ID /606 | ANNOUNCED PRIORITY /607 | EVENT TYPE /608 |
|---|---|---|---|---|---|---|---|
| ... | ... | ... | ... | ... | ... | ... | ... |
| 000002 | Scheduled maintenance | 2017/6/30 11:30:00 | 2017/6/30 13:00:00 | 1,2,3 | NA | Low | Scheduled |
| 000003 | Tooling change | 2017/6/30 13:05:00 | Null | 3 | W02A001 | Medium | Scheduled |
| 000004 | Abnormal operation | 2017/6/30 13:40:00 | 2017/6/30 14:22:00 | 3 | W02A002 | High | Urgent |
| 000005 | Jig change | 2017/6/30 14:50:00 | Null | 3 | W02A003 | Medium | Unscheduled |
| ... | ... | ... | ... | ... | ... | ... | ... |

FIG. 9

RETENTION NUMBER TABLE
353

| 2017/6/30 | ... | 13:27 | 13:28 | 13:29 | 13:30 | 13:31 | 13:32 | ... | 13:36 | 13:37 | 13:38 | ... |
|---|---|---|---|---|---|---|---|---|---|---|---|---|
| IN STEP 1 | ... | 4 | 3 | 2 | 1 | 1 | 1 | ... | 1 | 0 | ... | ... |
| BETWEEN STEPS 1 AND 2 | ... | 0 | 1 | 2 | 2 | 2 | 2 | ... | 1 | 2 | 2 | ... |
| IN STEP 2 | ... | ... | ... | 0 | 1 | 2 | 2 | ... | 1 | 1 | 1 | ... |
| BETWEEN STEPS 2 AND 3 | ... | ... | ... | ... | 0 | 0 | 0 | ... | 2 | 2 | 1 | ... |
| IN STEP 3 | ... | ... | ... | ... | ... | ... | ... | ... | ... | ... | 1 | ... |

FIG.16

RETENTION PERIOD TABLE
354

| PRODUCT ID | RETENTION PERIOD IN STEP 1 | RETENTION PERIOD BETWEEN STEPS 1 AND 2 | RETENTION PERIOD IN STEP 2 | RETENTION PERIOD BETWEEN STEPS 2 AND 3 | RETENTION PERIOD IN STEP 3 |
|---|---|---|---|---|---|
| 0011 | 366 | 121 | 302 | 177 | 187 |
| 0012 | 366 | 123 | 304 | 177 | 305 |
| 0013 | 366 | 243 | 304 | 154 | 301 |
| 0014 | 368 | 708 | 306 | 104 | 300 |
| 0015 | 364 | 390 | 309 | 108 | 306 |
| ⋮ | | | | | ⋮ |

FIG. 17

CHANGING TENDENCY TABLE
355

| PRODUCT ID | INTRA-STEP DIFFERENCE IN STEP 1 | INTER-STEP DIFFERENCE BETWEEN STEPS 1 AND 2 | INTRA-STEP DIFFERENCE IN STEP 2 | INTER-STEP DIFFERENCE BETWEEN STEPS 2 AND 3 | INTRA-STEP DIFFERENCE IN STEP 3 |
|---|---|---|---|---|---|
| 0011 | - | - | - | - | - |
| 0012 | 0 | 2 | 2 | 0 | 118 |
| 0013 | 0 | 120 | 0 | -23 | -4 |
| 0014 | 2 | 465 | 2 | -50 | -1 |
| 0015 | -4 | -318 | 3 | 4 | 6 |
| ... | | | | | |

FIG. 18

| PRODUCT ID | INTRA-STEP DIFFERENCE IN STEP 1 | INTER-STEP DIFFERENCE BETWEEN STEPS 1 AND 2 | INTRA-STEP DIFFERENCE IN STEP 2 | INTER-STEP DIFFERENCE BETWEEN STEPS 2 AND 3 | INTRA-STEP DIFFERENCE IN STEP 3 |
|---|---|---|---|---|---|
| 0011 | - | - | - | - | - |
| 0012 | 0 | 2 | 2 | 0 | 118 |
| 0013 | 0 | 120 | 0 | -23 | -4 |
| 0014 | 2 | 465 | 2 | -50 | -1 |
| 0015 | -4 | -318 | 3 | 4 | 6 |
| ... | ... | ... | ... | ... | ... |

1801 → 585, POSITIVE VALUE

1802 → -73, NEGATIVE VALUE

1803 → 147, NEGATIVE VALUE

1804 → -46, POSITIVE VALUE

FIG. 19

ANALYSIS TIME BLOCK TABLE
356

| INTERVAL ID /1901 | INTERVAL TYPE /1902 | STARTING TIME /1903 | ENDING TIME /1904 | INTERVAL CORRECTION VALUE (SECONDS) /1905 | CORRECTED STARTING TIME /1906 | CORRECTED ENDING TIME /1907 |
|---|---|---|---|---|---|---|
| 000001 | Urgent | 2017/6/30 13:40:00 | 2017/6/30 14:22:00 | 2520 | 2017/6/30 12:38:00 | 2017/6/30 15:24:00 |
| 000002 | Unscheduled | 2017/6/30 14:50:00 | Null | 600 | 2017/6/30 14:40:00 | Null |
| ... | ... | ... | ... | ... | ... | ... |

FIG. 20

| EVENT ID /601 | EVENT NAME /602 | STARTING TIME /603 | ENDING TIME /603 | OCCURRENCE STEP /604 | PRODUCT ID /605 | ANNOUNCED PRIORITY /606 | EVENT TYPE /607 |
|---|---|---|---|---|---|---|---|
| ... | ... | ... | ... | ... | ... | ... | ... |
| 000004 | Abnormal operation | 2017/6/30 13:40:00 | 2017/6/30 14:22:00 | 3 | W02A002 | High | Urgent |
| 000005 | Jig change | 2017/6/30 14:50:00 | Null | 3 | W02A003 | Medium | Unscheduled |
| ... | ... | ... | ... | ... | ... | ... | ... |

| INTERVAL ID /1901 | INTERVAL TYPE /1902 | STARTING TIME /1903 | ENDING TIME /1904 | INTERVAL CORRECTION VALUE (SECONDS) /1905 | CORRECTED STARTING TIME /1906 | CORRECTED ENDING TIME /1907 |
|---|---|---|---|---|---|---|
| 000001 | Urgent | 2017/6/30 13:40:00 | 2017/6/30 14:22:00 | 2520 | 2017/6/30 12:38:00 | 2017/6/30 15:24:00 |
| 000002 | Unscheduled | 2017/6/30 14:50:00 | Null | 600 | 2017/6/30 14:40:00 | Null |
| ... | ... | ... | ... | ... | ... | ... |

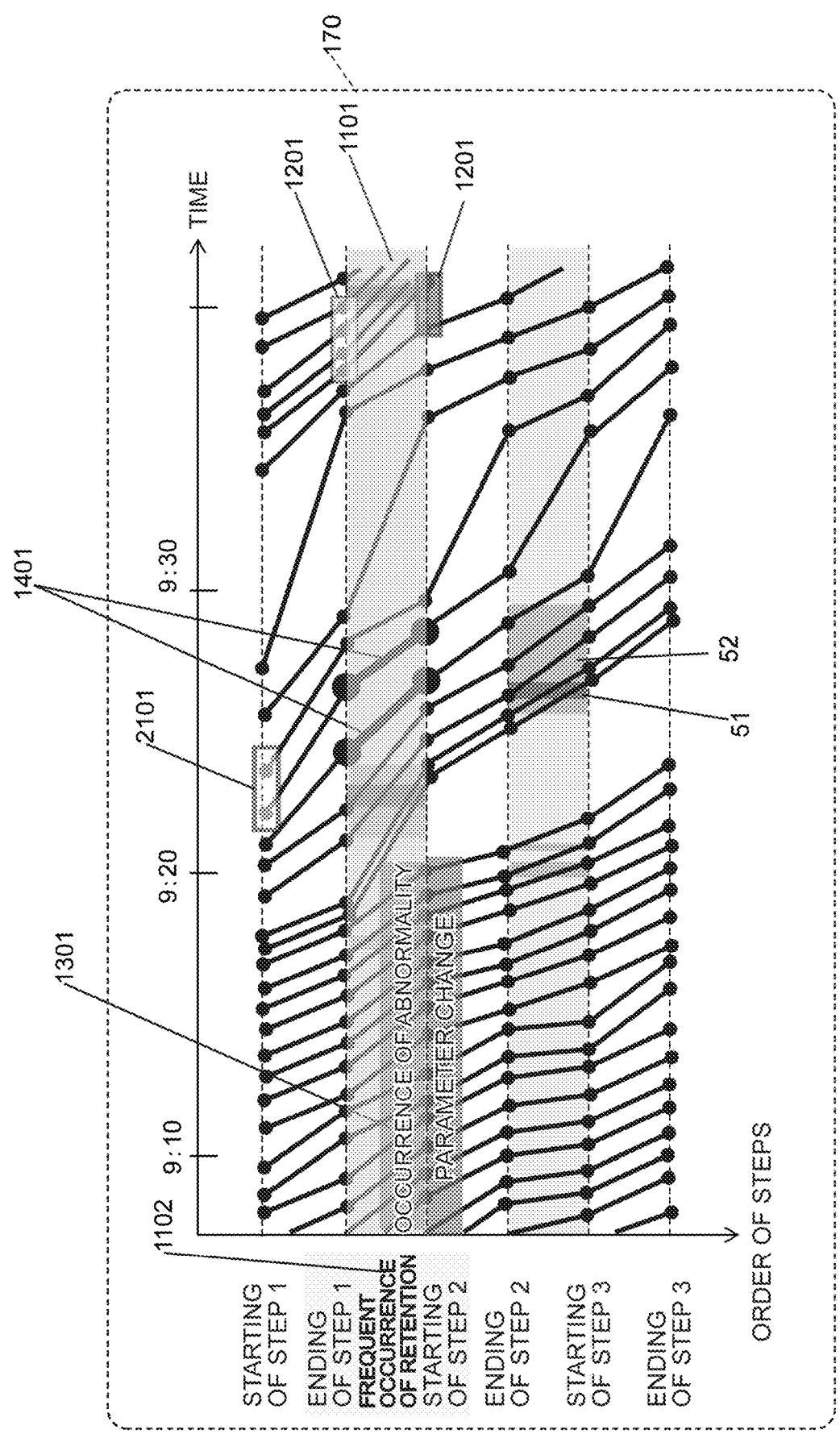

FIG.33

STANDARD LT TABLE
3201

| MODEL NAME | OVERALL STANDARD LT | BREAKDOWN | | |
|---|---|---|---|---|
| | | From | To | PARTIAL STANDARD LT |
| MODEL X | 10 HOURS | STARTING OF STEP 1 | ENDING OF STEP 1 | 1 HOUR |
| | | ENDING OF STEP 1 | STARTING OF STEP 3 | 2 HOURS |
| | | ... | ... | ... |
| MODEL Y | 15 HOURS | STARTING OF STEP 1 | ENDING OF STEP 1 | 1 HOUR |
| | | ... | ... | ... |
| ... | ... | ... | ... | ... |

FIG.34

ACCENTUATION CONTROL TABLE
3202

| DEVIATION UPPER LIMIT | DEVIATION LOWER LIMIT | ACCENTUATION LEVEL |
|---|---|---|
| — | 10 HOURS | LINE TYPE: SOLID LINE<br>COLOR DEPTH LEVEL:100% |
| 10 HOURS | 3 HOURS | LINE TYPE: SOLID LINE<br>COLOR DEPTH LEVEL:60% |
| ... | ... | ... |

FIG.35

STEP-ORDER TABLE
3203

| ORDER / MODEL NAME | 1 | 2 | 3 | 4 |
|---|---|---|---|---|
| MODEL X | STEP1 | STEP2 | STEP3 | STEP4 |
| MODEL Y | STEP1 | STEP3 | STEP4 | - |
| MODEL Z | STEP1 | STEP3 | STEP4 | - |
| MODEL W | STEP3 | STEP1 | STEP4 | - |

SYSTEM AND METHOD FOR SUPPORTING PRODUCTION MANAGEMENT

CROSS-REFERENCE TO PRIOR APPLICATION

This application relates to and claims the benefit of priority from Japanese Patent Application number 2018-210221, filed on Nov. 8, 2018 the entire disclosure of which is incorporated herein by reference.

BACKGROUND

The present invention relates generally to a computer technique for supporting production management.

As a technique for supporting production management, the technique disclosed in PTL 1 is known. The technique disclosed in PTL 1 visually recognizably displays a production period and a wait period for each step.

PTL 1: Japanese Patent No. 6287018 (Specification)

SUMMARY

According to the visualization technique of PTL 1, production management of a production system for one specific sequential order of steps, that is, a line production system is possible.

However, it is hard for the visualization technique of PTL 1 to support production management in such a production system that a plurality of different models of products (parts or materials serving as a base of a finished product) are loaded and the sequential order of two or more of steps is different depending on the model (e.g., a production system in which two or more sequential orders of steps sharing some steps are mixed).

A production management supporting system analyzes, on the basis of one or more attentional perspectives on a plurality of different models of products, past record information that includes information as a past record which shows, for each product loaded in a production system in which the plurality of different models of products are loaded and a sequential order of two or more of a plurality of steps is different depending on the model, an execution time (at least one of a starting time and an ending time) of each of the steps and that serves as a basis for a production management chart showing a production situation, to detect, among display objects displayed in the production management chart, a display object satisfying one or more requirements associated with the one or more attentional perspectives. The system performs accentuated display on at least one of the detected display objects. Note that the production management chart has a first axis and a second axis perpendicular to the first axis. The first axis corresponds to time. The second axis corresponds to the steps.

It is possible to support production management of a production system in which a plurality of different models of products are loaded and the sequential order of two or more of a plurality of steps is different depending on the model.

BRIEF DESCRIPTION OF THE DRAWINGS

FIG. 5 shows a past record table;
FIG. 6 shows an event table;
FIG. 9 shows a retention number table;
FIG. 16 shows a retention period table;
FIG. 17 shows a changing tendency table;
FIG. 18 is an illustrative view of an example of changing tendency calculation;
FIG. 19 shows an analysis time block table;
FIG. 20 is an illustrative view of an example of updating of the analysis time block table;
FIG. 21 shows an example of a diagram chart according to a second embodiment, displaying the execution time (starting time or ending time) of each of steps instead of displaying both of the starting time and the ending time of each of the steps;
FIG. 33 shows a standard LT table;
FIG. 34 shows an accentuation control table;
FIG. 35 shows an order-of-step table.

DESCRIPTION OF EMBODIMENTS

Figure 1:
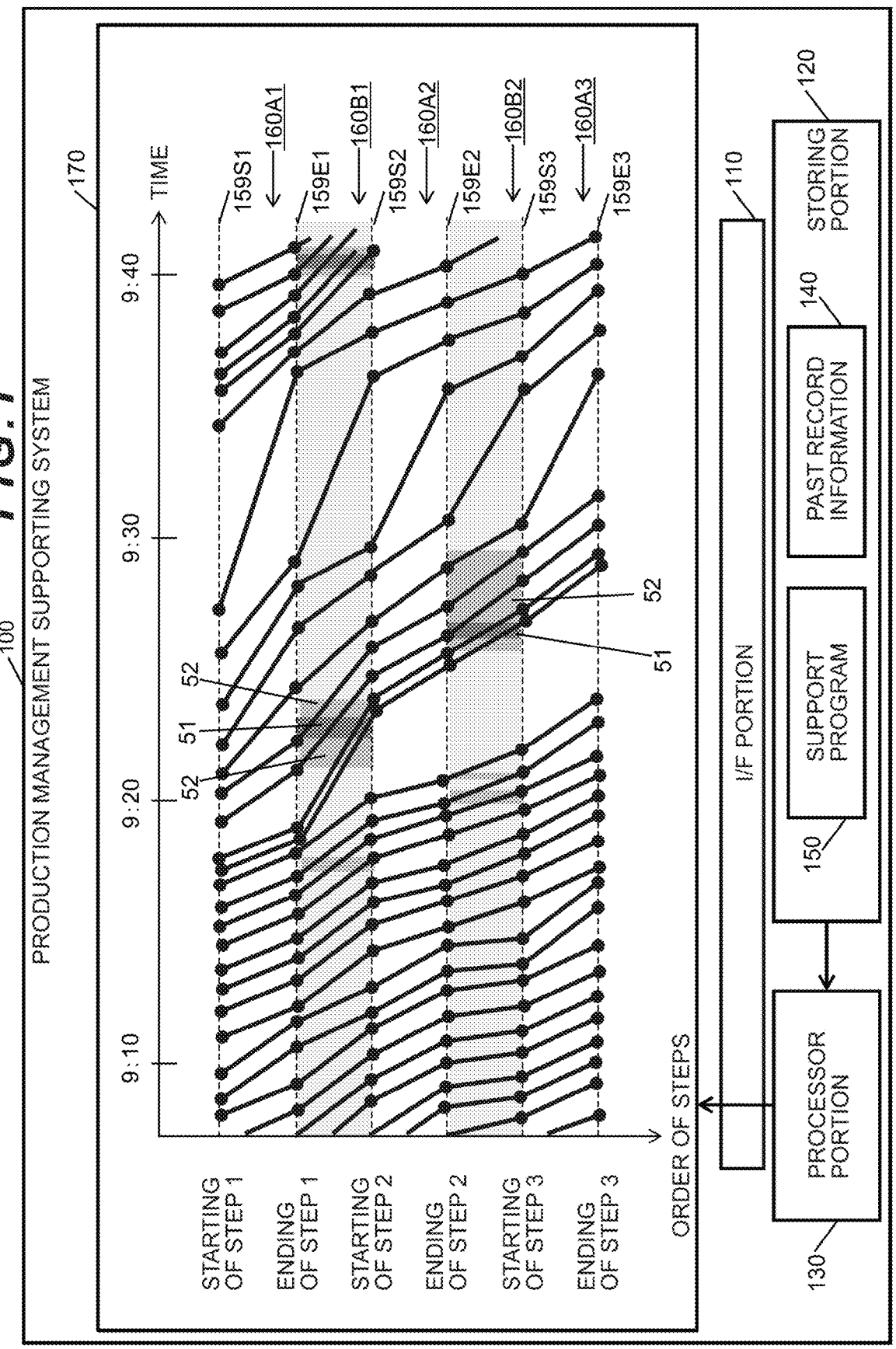
FIG. 1 shows the outline of a first embodiment.

The following will describe several embodiments of the present invention.

In the following description, an "interface portion" includes one or more interfaces. The one or more interfaces may include at least one of a user interface portion and a communication interface portion. The user interface portion may include at least one I/O device among one or more I/O devices (e.g., input devices (e.g., a keyboard and a pointing device) and an output device (e.g., a display device)) and a display computer or may include an interface device for the at least one I/O device. The communication interface portion may include one or more communication interface devices. The one or more communication interface devices may be one or more communication interface devices of the same type (i.e., one or more network interface cards (NICs)) or two or more communication interface devices of different types (e.g., a NIC and a host bus adapter (HBA)).

In the following description, a "storing portion" includes one or more memories. At least one of the memories associated with the storing portion may appropriately be a volatile memory. The storing portion is used mainly during a process performed by the processor portion. The storing portion may also include, in addition to the memories, one or more nonvolatile storing devices (e.g., hard disk drives (HDDs) or solid state drives (SSDs)).

In the following description, the "processor portion" includes one or more processors. At least one of the processors is typically a microprocessor such as a central processing unit (CPU), but the processors may also include a processor of another type such as graphics processing unit (GPU). Each of the one or more processors may be a single-core processor or a multi-core processor. The processors may also include a hardware circuit which performs a part or the whole of a process.

In the following description, a process may be described using a "program" as a subject. Since a program performs a determined process by being executed by the processor portion, while appropriately using the storing portion (e.g., memory), the interface portion (e.g., communication port), and/or the like, the subject of the processor may also be the processor. The process described using the program as the subject may also be a process performed by the processor portion or an apparatus having the processor portion. The processor portion may also include a hardware circuit (e.g., field-programmable gate array (FPGA) or an application specific integrated circuit (ASIC)) which performs a part or the whole of the process. The program may also be installed from a program source to an apparatus such as a computer. The program source may be, e.g., a program distribution server or a recording medium (e.g., non-transitory recording medium) which is readable by the computer. In the following description, two or more programs may be implemented as one program or one program may be implemented as two or more programs.

In the following description, information may be described using such an expression as "a xxx table", but the information may be expressed using any data structure. Specifically, to show that the information does not depend on any data structure, "a xxx table" can be referred to also as "xxx information". Also, in the following description, a configuration of each table is exemplary. One table may be divided into two or more tables or all or any of two or more tables may be one table.

In the following description, a "production management supporting system" may be configured to include one or more computers. Specifically, when, e.g., a computer has a display device and displays information on the display device thereof, the computer may appropriately be the production management supporting system. Alternatively, when, e.g., a first computer (e.g., management server) transmits information to be displayed to a remote second computer (display computer (e.g., management client)) and the display computer displays the information (when the first computer displays the information on the second computer), at least the first computer of the first and second computers may appropriately be the production management supporting system. The production management supporting system may also have an interface portion, a storing portion, and a processor portion coupled to the interface portion and the storing portion. The interface portion may appropriately be at least one of a user interface portion and a communication interface portion. The user interface portion may be at least one I/O device among one or more I/O devices (e.g., input devices (e.g., a keyboard and a pointing device) and an output device (e.g., a display device)) and the second computer. The communication interface portion may appropriately be one or more communication interface devices. The "display of information to be displayed" by the computer in the production management supporting system may be the display of information to be displayed on the display device of the computer or may also be the transmission of the information to be displayed from the computer to the display computer (in the latter case, the display computer displays the information to be displayed). The function of at least one of the management server in the production management supporting system and the production management supporting system may also be implemented by a virtual computer (e.g., virtual machine (VM)) implemented by at least one physical computer (e.g., a physical calculation resource on a cloud basis). At least a portion of the production management supporting system may be software-defined.

When the following description is given without discriminating elements of the same type from each other, the common portions of reference signs may be used while, when the following description is given while discriminating elements of the same type from each other, the reference signs may be used. For example, when bands are not discriminated from each other, each of the bands may be referred to as a "band 160". When the bands are discriminated from each other, each of the bands may be referred to as an "intra-step band 160A" or "inter-step band 160B". When the bands are further discriminated from each other, each of the bands may be referred to as an "intra-step band 160A1" or "intra-step band 160A2", or alternatively referred to as an "inter-step band 160B1" or "inter-step band 160B2".

A "product" generally means a produced item, i.e., a finished product. However, in the following description, the "product" means each of the items loaded in a production line. Accordingly, in the following description, the "product" may be any of an item before loaded into the production line, an item currently in the production line (i.e., "semi-finished product"), and a finished product in a shippable state through all the steps in the production line.

Also, in the following description, the intra-step range of a step x (x is a natural number) may be referred to as an "intra-step range x", while an inter-step range between the step x and a step y may be referred to as an "inter-step range x-y".

First Embodiment

FIG. 1 shows the outline of a first embodiment.

A production management supporting system 100 has an I/F (interface) portion 110, a storing portion 120, and a processor portion 130 coupled to the I/F portion 110 and the storing portion 120. The storing portion 120 stores past record information 140 and a support program 150.

The past record information 140 include information showing the past record of production, specifically, e.g., information showing an execution time of each of steps for each product loaded in a production line. The execution time of the step may be one or more times selected between the starting time of the step and the ending time thereof in accordance with a predetermined rule. In the present embodiment, both of the starting time and the ending time are adopted.

The support program 150 performs visualization of a production situation as one of supports for production management. Specifically, the support program 150 analyzes the past record information 140 by being executed by the processor portion 130 and displays a diagram chart 170 showing the production situation on the basis of the result of the analysis. The diagram chart 170 is a so-called polygonal line graph. In the present embodiment, in the chart 170, the horizontal axis (an example of a first axis) corresponds to time, the vertical axis (an example of a second axis) corresponds to the steps, and one polygonal line corresponds to one product (individual product). However, each polygonal line may correspond to a lot (this may be the same in the second and subsequent embodiments). In the following description, the abscissa axis is referred to as a "time axis", while the ordinate axis is referred to as a "step axis".

In the chart 170, in the sequential order of the steps, starting axes 159S each corresponding to a starting time and parallel with the time axis and ending axes 159E each corresponding to an ending time and parallel with the time axis are alternately arranged along a direction parallel with the step axis (i.e., direction perpendicular to the time axis). Consequently, the intra-step bands 160A and the inter-step bands 160B are alternately arranged along a direction parallel with the step axis. For each product, the point on each of the starting axes 159S corresponds to the starting time of the step for the product corresponding to the starting axis 159S. Also, for each product, the point on each of the ending axes 159E corresponds to the ending time of the step for the product corresponding to the ending axis 159E. Note that the "intra-step band" is the belt-like region extending in parallel with the time axis from the starting axis 159S to the ending axis 159E and corresponding to the intra-step range from the starting of a step to the ending of the step. The "inter-step band" is the belt-like region extending in parallel with the time axis from the ending axis 159E to the starting axis 159S and corresponding to the inter-step range from the ending of the step to the starting of the subsequent step.

The support program 150 specifies, for each of one or more times in a display target period and on a per inter-step (and/or intra-step) range basis, a retention number as the number of products present at the time on the basis of the past record information 140. The "each of one or more times" mentioned herein may be each of the times during the display target period (e.g., the times each corresponding to a unit time) or the time specified by the user using a pointing device or the like during the display target period. The support program 150 determines whether or not one or more retention situations in accordance with the retention number specified for the one or more times on a per inter-step (and/or intra-step) range basis include a retention situation satisfying a predetermined requirement. When there is the satisfying retention situation, the support program 150 performs accentuated display of a target portion that is the portion of the diagram chart 170 corresponding to the inter-step range (and/or intra-step range) in which the satisfying retention situation has occurred and to a period having the satisfying retention situation. This allows the user to recognize (visually recognize), for a relatively large number of products as the whole, the situation in each inter-step range (and/or in each intra-step range).

Note that the "accentuated display of the target portion" may be the display of a display object having a length corresponding to the period having the satisfying retention situation along a direction of the time axis such that the display object overlaps a line segment (a portion of the polygonal line) over the inter-step band 160B (or intra-step band 160A) corresponding to the inter-step range (or intra-step range) in which the satisfying retention situation has occurred or the like. In the present embodiment, the "accentuated display of the target portion" is accentuated display of a rectangular portion 51 or rectangular portions 52 corresponding to the period having the satisfying retention situation in the inter-step band 160B (or intra-step band 160A) corresponding to the inter-step range (or intra-step range) in which the satisfying retention situation has occurred. The inter-step band 160B (or intra-step band 160A) is the background of the polygonal lines. The portion subjected to the accentuated display is a portion of the background, and the position and range of the portion correspond to the period having the foregoing satisfying retention situation. Accordingly, it is easy to recognize the relationships between the retention situations and the production situations for a relatively large number of products as the whole without impairing the visibility of the polygonal lines showing the production situations of the products.

As the mode of the "accentuated display", any of various adoptable modes (e.g., changing of a line width, changing of a color, changing of a density, changing of a pattern, blinking, and displaying of a pop-up message) can be adopted.

The display mode of each of the inter-step bands 160B may be the same as the display mode of each of the intra-step bands 160A, but is different from the display mode of each of the intra-step bands 160A in the present embodiment. This allows the user to easily discriminate the regions corresponding to the intra-step ranges from the regions corresponding to the inter-stage ranges.

Also, in the present embodiment, the "retention situation satisfying a predetermined requirement" is a situation in which the retention number is equal to or larger than a first threshold or the retention number is less than a second threshold smaller than the first threshold, in the inter-step range (and/or in the intra-step range). This allows the inter-step range (and/or intra-step range) in which an excess situation having a relatively large retention number has occurred or the inter-step range (and/or intra-step range) in which an over-reduction situation having a relatively small retention number has occurred to be recognized from the diagram chart. Note that, e.g., the "excess situation" includes a warning retention situation in which the retention number is equal to or larger than a warning threshold and less than an abnormal threshold (the warning threshold is smaller than the abnormal threshold) and an abnormal retention situation in which the retention number is equal to or larger than the abnormal threshold. Each of the warning threshold and the abnormal threshold is an example of the first threshold. In addition, each of the excess situation and the over-reduction situation may be at multiple levels. As the level of the excess situation or the over-reduction situation is higher, the level of the accentuated display may be higher. For example, the level of the accentuated display of each of the abnormal rectangular portions 52 as the rectangular portions corresponding to the abnormal retention situation (rectangular regions in the band 160) is higher than the level of the accentuated display of the warning rectangular portion 51 as the rectangular portion corresponding to the warning retention situation (e.g., each of the abnormal rectangular portions 52 is displayed in a color more vivid or darker than the color of the warning rectangular portion 51).

In the present embodiment, with respect to at least one inter-step range (and/or at least one intra-step range), at least one of the first threshold (threshold for the excess situation) and the second threshold (threshold for the over-reduction situation) is a value depending on the inter-step range and/or the intra-step range. When the first threshold (threshold for the excess situation) is taken as an example, at least one of the warning threshold and the abnormal threshold differs from one inter-step range (and/or one intra-step range) to another. Consequently, the retention situation to be subjected to the accentuated display is appropriate with respect to at least one inter-step range (and/or at least one intra-step range).

In the present embodiment, the heights of the respective inter-step bands 160B and the heights of the respective intra-step bands 160A (lengths along the step axis) are uniform. Accordingly, the degree of influence given by the retention period (period from the ending time to the starting time) of each product in each inter-step range on the inclination of the line segment and the degree of influence given by the retention period (period from the starting time to the ending time) of each product in each intra-step range on the inclination of the line segment are uniform. As a result, it is possible to recognize, from the inclination of each of the line segments, which product has a relatively long retention period in which inter-step or intra-step range.

On the diagram chart 170, each of the polygonal lines represents, for each product, the relationship between the step and the execution time (which is the starting time and the ending time in the present embodiment, as described above). When the flow of products becomes irregular due to a cause such as the occurrence of fluctuations in a processing period in a given step or the occurrence of product overtaking (such that a given product is removed in a given step and a product loaded later than the product flows ahead of the product), any of the blank regions on the diagram chart 170 may be unnaturally increased or reduced in size. When the irregular flow occurs frequently, numerous such blank regions are observed on the diagram chart 170.

In production management, management of a situation between steps and a situation between products in the same step is an important management item. It can be considered that at least one of the shape and size of the blank region depends on such a situation.

However, it is difficult to precisely determine, by visual inspection, whether or not each of the blank regions is a noteworthy blank region (e.g., blank region associated with any abnormal situation). For example, even when the blank region has a large size, the blank region is not necessarily the blank region associated with an abnormal situation. Conversely, even when the blank region has a small size, the blank region is not necessarily a blank region associated with a normal situation.

In addition to such a problem associated with the size of the blank region, when numerous blank regions are present on the diagram chart 170, it is significantly difficult to examine, by visual recognition, all the blank regions for whether or not the blank regions are associated with abnormal situations. Specifically, since, e.g., products are successively loaded into the production line in a short period of time as described above, there are numerous management targets. When it is attempted to holistically manage the production situation, the polygonal lines are densely arranged on the display screen of the diagram chart 170. Consequently, there are numerous blank regions which are so small that it is difficult to visually recognize the blank regions, and noteworthy blank regions may be missed.

Accordingly, in the present embodiment, each of the blank regions on the diagram chart 170 may be adopted as one of the display objects. In other words, in addition to objects actually drawn such as polygonal lines, the region between the polygonal lines in a display area, such as a plot area, may also be adopted as one of the display objects. In short, the concept of the display object may be expanded. Specifically, the support program 150 may specify, among the plurality of blank regions on the diagram chart 170, the blank region satisfying the one or more requirements associated with the one or more attentional perspectives and perform the accentuated display of the specified blank region. Thus, the noteworthy blank region may automatically be recommended. The user is allowed to preferentially examine first the details (e.g., the details of a product) of a situation (e.g., the step or time belonging to the blank region) associated with the recommended blank region (subjected to the accentuated display). As a result, it can be expected to further reduce a burden on production management for recognizing an abnormality occurring in the production process in the production line and reliably preventing shipment of defective products.

Note that the support program 150 can set the accentuation level (e.g., color shade) of the blank region as an accentuated display target to an accentuation level in accordance with at least one of items (A) to (C) shown below which are:

(A) the degree of importance of at least one of the one or more attentional perspectives on the basis of which the blank region is determined to be the accentuated display target;

(B) the number of the attentional perspectives on the basis of which the blank region is determined to be the accentuated display target; and (C) the value (e.g., the area of the blank region or a measurement value obtained by measuring the interval between the times belonging to the blank region) obtained for the blank region on the basis of the attentional perspectives.

As a result, when the plurality of blank regions are subjected to the accentuated display, the user can promptly determine the blank region, the situation of which should preferentially be recognized first. Note that (A) and (B) are effective when, e.g., the blank region as the accentuated display target is determined on the basis of the plurality attentional perspectives (i.e., when the same blank region may be determined to be the accentuated display target on the basis of each of the plurality of attentional perspectives). On the other hand, (C) is effective when the value calculated for the blank regions on the basis of the same attentional perspective differs from one blank region to another.

In addition, the user is allowed to specify at least one of the attentional perspectives or the degree of importance thereof. This allows the noteworthy blank region to be recommended on the basis of the perspective intended by the user.

The following will describe the present embodiment in detail.

Figure 2:
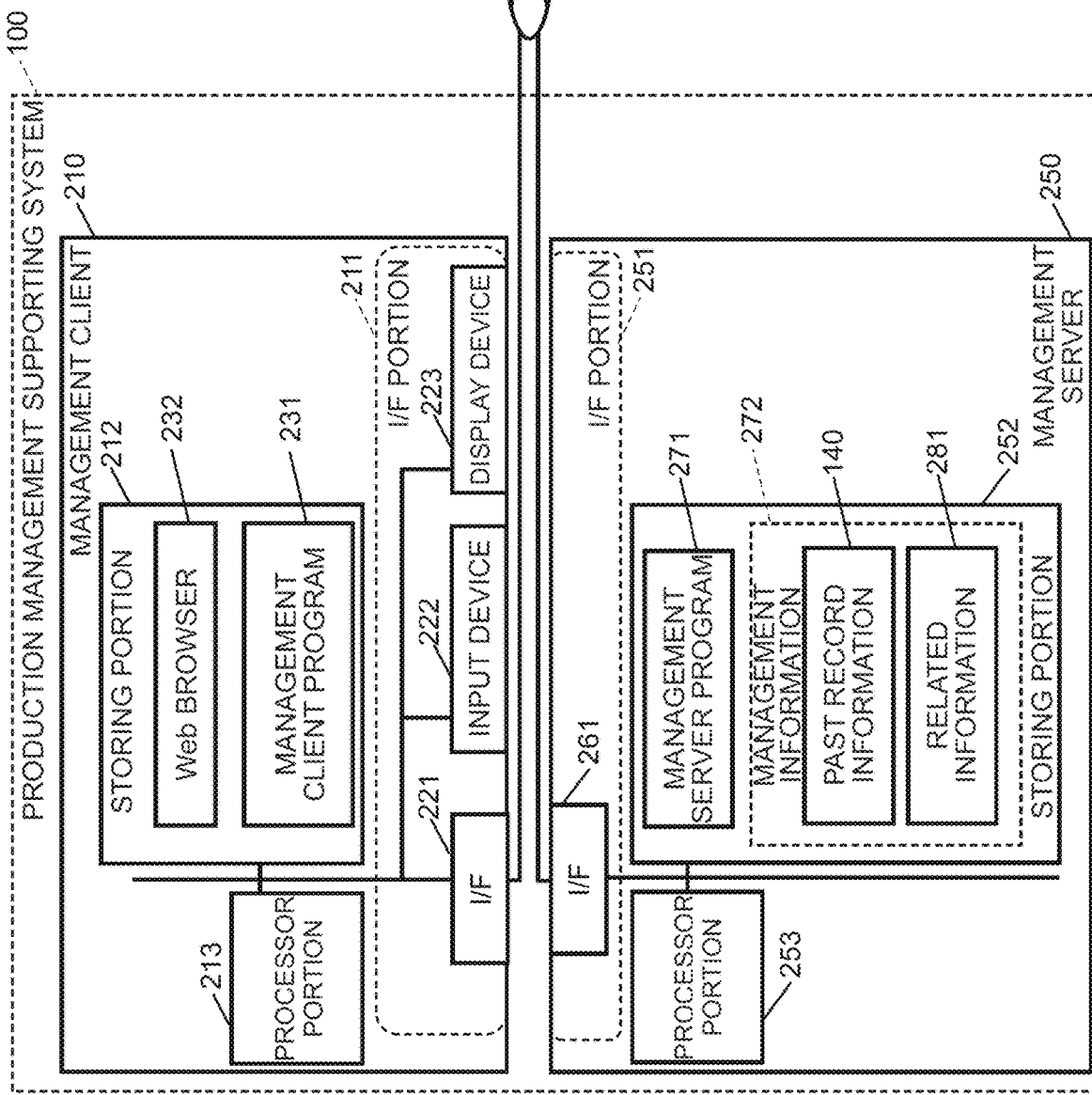
FIG. 2 shows a configuration of a production management supporting system according to the first embodiment.

FIG. 2 shows a configuration of the production management supporting system 100.

The production management supporting system 100 includes a management server 250 and one or more management clients 210 coupled to the management server 250. To the management server 250, each of the management clients 210 and a production system 200 is coupled via a communication network (e.g., a local area network (LAN), a wide area network (WAN), or the Internet) 290.

The production system 200 is a system (e.g., factory) including a production line and includes apparatuses such as, e.g., a plurality of apparatuses for a plurality of steps in the production line, a plurality of sensors which regularly perform measurement for a plurality of measurement items with regard to the plurality of steps, and a server which stores a plurality of measurement values regularly obtained using the plurality of sensors and transmits the plurality of measurement values to the management server 250. From the production system 200, information (raw data such as, e.g., production dynamic state data, facility data, and quality measurement data) is regularly or irregularly transmitted to the management server 250 and stored in the management server 250. For example, the information includes, for each product, a product ID, and the starting time and the ending time of each step.

The management client 210 has an I/F portion 211, a storing portion 212, and a processor portion 213 coupled to the I/F portion 211 and the storing portion 212.

The I/F portion 211 includes an I/F (communication interface device coupled to the communication network 290) 221, an input device (e.g., pointing device or keyboard) 222, and a display device (device having a physical screen which displays information) 223. A touch screen integrally including the input device 222 and the display device 223 may also be adopted.

The storing portion 212 stores a computer program executed by the processor portion 213 and information used by the processor portion 213. Specifically, for example, the storing portion 212 stores a management client program 231 and a Web browser 232. The management client program 231 communicates with the management server 250 and displays information such as the diagram chart 170 described above via the Web browser 232.

The management server 250 has an I/F portion 251, a storing portion 252, and a processor portion 253 coupled to the I/F portion 251 and the storing portion 252.

The I/F portion 251 includes an I/F (communication interface device coupled to the communication network 290) 261.

The storing portion 252 stores a computer program executed by the processor portion 253 and information used by the processor portion 253. Specifically, for example, the storing portion 252 stores a management server program 271 and management information 272. The management server program 271 communicates with the management client program 231. The management information 272 includes the past record information 140 and related information 281. The past record information 140 is information related to a past record such as the starting time and the ending time of each of the steps for each product loaded in the production line. The past record information 140 may include the raw data mentioned above. The related information 281 is information related to the past record. A portion of the related information 281 may also be data generated on the basis of the result of analyzing the past record information 140. The related information 281 includes a threshold (e.g., threshold in each inter-step range (and/or in each intra-step range)) to be compared to the retention number in, e.g., the inter-step range (and/or intra-step range).

Through a cooperative process performed by the management server program 271, the management client program 231, and the Web browser 232, the display of a screen (typically graphical user interface (GUI)) including the diagram chart 170 is implemented.

The relationships between the components shown in FIG. 2 and the components shown in FIG. 1 are, e.g., as follows. Specifically, of the I/F portions 211 and 251, at least the I/F portion 251 corresponds to the I/F portion 110. Of the storing portions 212 and 252, at least the storing portion 252 corresponds to the storing portion 120. Of the processor portions 213 and 253, at least the processor portion 253 corresponds to the processor portion 130. Of the management server program 271, the management client program 231, and the Web browser 232, at least the management server program 271 corresponds to the support program 150.

Figure 3:
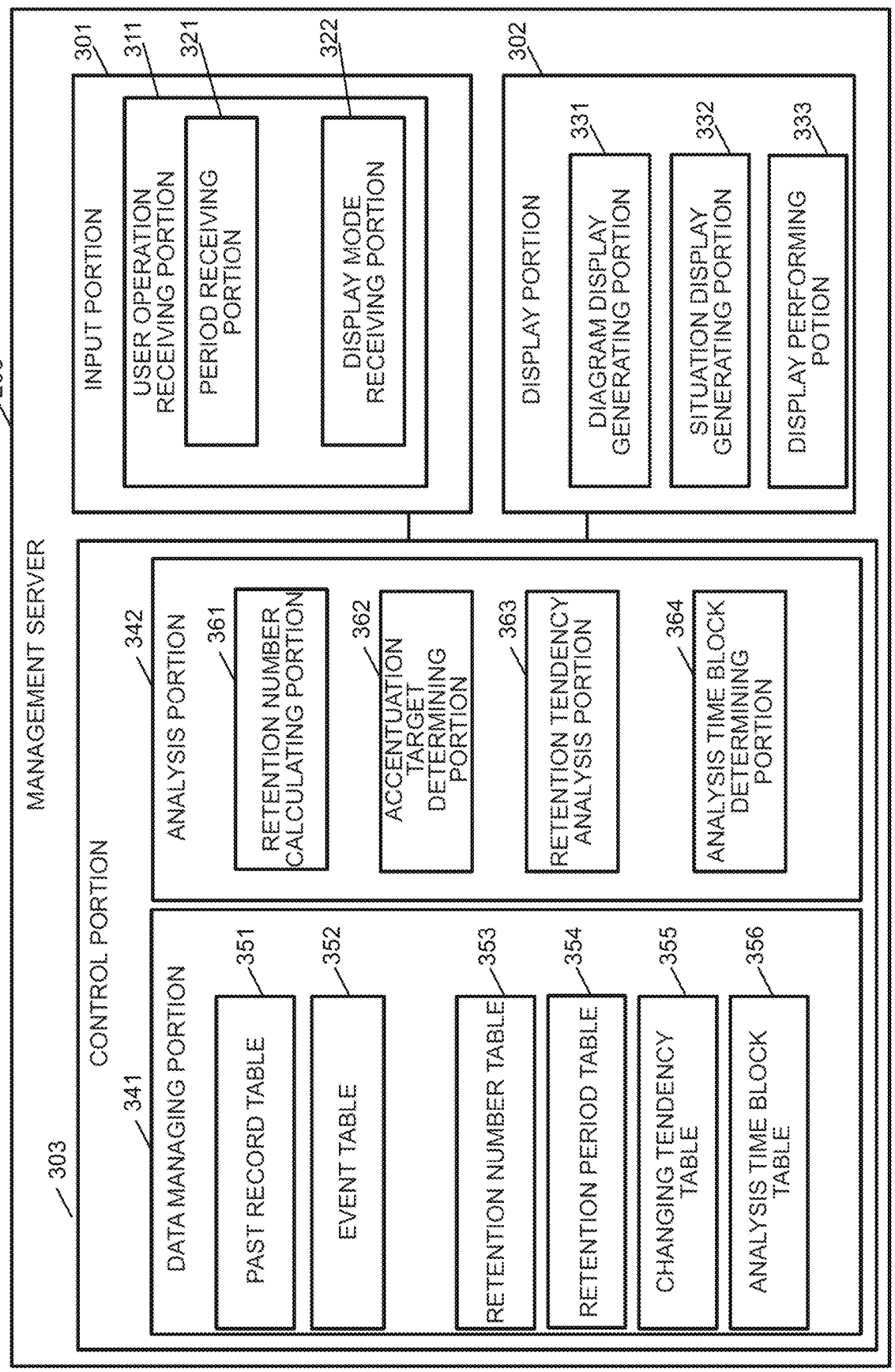
FIG. 3 shows an example of functions implemented in a management server.

FIG. 3 shows an example of the functions implemented in the management server 250.

The management server program 271 is executed by the processor portion 253 to allow the illustrated functions, i.e., an input portion 301, a display portion 302, and a control portion 303 to be implemented. In other words, the management server program 271 has the input portion 301, the display portion 302, and the control portion 303.

The input portion 301 is the function for receiving information. The input portion 301 includes a user operation receiving portion 311. The user operation receiving portion 311 is a function for receiving a user operation (operation performed on the screen by the user using the input device). The user operation receiving portion 311 includes a period receiving portion 321 and a display mode receiving portion 322. The period receiving portion 321 is a function for receiving a specification of the display target period. The display mode receiving portion 322 is a function for receiving a specification of which one of a plurality of display modes described later is to be achieved.

The display portion 302 is the function for displaying information. The display portion 302 includes a diagram display generating portion 331, a situation display generating portion 332, and a display performing portion 333. The diagram display generating portion 331 is a function for generating the display of the diagram chart (e.g., drawing the diagram chart on a memory portion). The situation display generating portion 332 is a function for generating the display of the retention situation or the like (e.g., generating (drawing) the accentuated display of the rectangular portion corresponding to the retention situation satisfying the predetermined requirement). The display performing portion 333 is a function for performing the display of the diagram chart (and the retention situation or the like) the display of which is generated.

The control portion 303 is a function for control. The control portion 303 includes a data managing portion 341 and an analysis portion 342.

The data managing portion 341 acquires the past record data of a product to update a past record table 351 on the basis of the past record data and acquires related data to update an event table 352 on the basis of the related data.

The data managing portion 341 also manages tables such as the past record table 351, the event table 352, a retention number table 353, a retention period table 354, a changing tendency table 355, and an analysis time block table 356.

Note that the "past record data" is data showing the past record of production and including, e.g., a product ID (e.g., product number), a step ID (e.g., step number), a time (e.g., the collection time of the data or the starting time and the ending time of the step), and a status (showing that, e.g., a process is currently performed in the step or the step was ended). For example, the data managing portion 341 regularly or irregularly collects the past record data from the line production system 200 and updates the past record table 351 on the basis of the collected past record data. The past record table 351 is at least a portion of the past record information 140.

On the other hand, the "related data" is data related to the past record of production (e.g., data other than the past record data, which is data of a predetermined type). For example, the data managing portion 341 regularly or irregularly collects event data as an example of the related data from the line production system 200 and updates the event table 352 on the basis of the collected event data.

The retention number table 353, the retention period table 354, the changing tendency table 355, and the analysis time block table 356 are dynamically generated on the basis of the past record table 351 and the event table 352. Each of the event table 352, the retention number table 353, the retention period table 354, the changing tendency table 355, and the analysis time block table 356 is at least a portion of the related information 281.

The analysis portion 345 is a function for analysis. The analysis portion 345 includes a retention number calculating portion 361, an accentuation target determining portion 362, a retention tendency analysis portion 363, and an analysis time block determining portion 364. The retention number calculating portion 361 calculates the retention number. The accentuation target determining portion 362 determines the presence or absence of an accentuated display target. When there is an accentuated display target, the accentuation target determining portion 362 causes the display portion 302 to draw and perform the accentuated display of the target. The retention tendency analysis portion 363 analyzes the changing tendency of retention. The analysis time block determining portion 364 determines an analysis time block as the time block (e.g., time window) as a range subjected to analysis.

Figure 4:
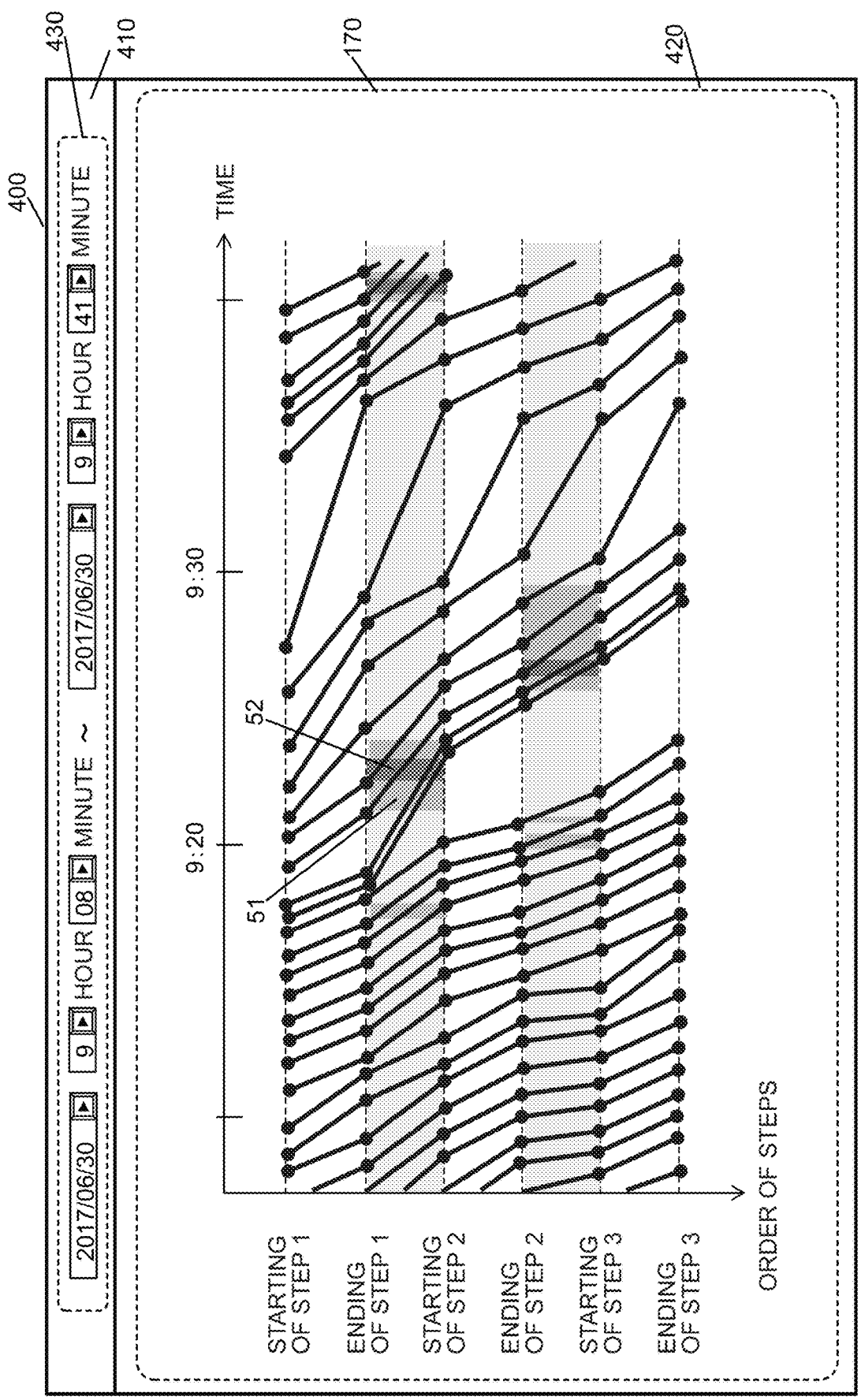
FIG. 4 shows an example of a diagram chart screen.

FIG. 4 shows an example of a diagram chart screen.

A diagram chart screen 400 is, e.g., a graphical user interface (GUI) and has a user interface (UI) area 410 and a graph area 420.

On the UI area 410, a period specification UI 430 is displayed. The period specification UI 430 is the UI (e.g., GUI component) that receives a specification of the display target period. The "display target period" is the period of the production situation determined to be a display target among the managed production situations. In the present embodiment, as shown in the drawing, the display target period is specified by a pair of a starting time and an ending time. However, the display target period may also be specified by another method, e.g., a pair of a reference time (e.g., starting time) and a length or by scrolling a display range (scrolling along the direction of the axis corresponding to time).

The graph area 420 displays the diagram chart 170 showing the production situation during the display target period specified using the period specification UI 430. The chart 170 is a two-dimensional graph in which the abscissa axis is the time axis, the ordinate axis is the step axis, and one polygonal line corresponds to one product.

Along the step axis, the steps are alternately arranged in the order in which the steps are present in the production line. Specifically, the starting axes 159S of the steps and the ending axes 159E thereof are alternately arranged in the sequential order of the steps. In other words, the intra-step bands 160A and the inter-step bands 160B are alternately arranged in the sequential order of the steps. For each product belonging to the display target period, respective points corresponding to the starting times and the ending times of a plurality of steps through which the product has passed are plotted on the starting axes 159S and the ending axes 159E. By connecting all the points with a line for each product, the polygonal line is formed, the result of which is displayed as the diagram chart 170.

On the diagram chart 170 shown in FIG. 4, at the time when the diagram chart 170 is displayed, the rectangular portions (the warning rectangular portion 51 and the abnormal rectangular portions 52 each mentioned above) each corresponding to the retention situation in which the retention number is equal to or larger than the threshold are already subjected to the accentuated display. However, whether or not such rectangular portions each corresponding to the retention situation are to be subjected to the accentuated display may also be settable by a user operation.

FIG. 5 shows the past record table 351.

The past record table 351 is prepared for, e.g., each production line. The past record table 351 holds information related to the past record of production. Specifically, the past record table 351 shows a history of products flowing in the production line, and the starting times and the ending times of the steps included in the production line. More specifically, the past record table 351 has, e.g., records for individual products on a one-to-one basis. Each of the records stores information such as a product ID 501, starting times 502S1 to 502S3 of steps 1 to 3 included in the production line, and ending times 502E1 to 502E3 thereof.

Also, in the present embodiment, a time is represented in a year/month/day/hour/minute/second unit, but the unit of a time may be rougher or finer than the unit used in the present embodiment. A time may also be represented in a different unit.

FIG. 6 shows the event table 352.

The event table 352 holds information related to the events occurred in relation to the production line. Specifically, the event table 352 has, e.g., records for the individual events on a one-to-one basis. Each of the records stores information such as an event ID 601, an event name 602, a starting time 603, an ending time 604, an occurrence step 605, a product ID 606, an announcement priority 607, and an event type 608. One record corresponds to the event data. The event data is an example of the related data.

The event ID 601 shows the ID of the event. The event name 602 shows the name of the event. The starting time 603 shows the time at which the event is started (has occurred). The ending time 604 shows the time at which the event is ended. "Null" means that the ending time of the event is undetermined. The occurrence step 605 shows the step in which the event has occurred. The product ID 606 shows the ID of the product associated with the event. The announcement priority 607 shows the priority of the announcement (display) of the event. The event type 608 shows the event type to which the event belongs. "Scheduled" means a scheduled event. "Unscheduled" means an unscheduled event. "Urgent" means the highly urgent event (e.g., abnormal event) among unscheduled events.

According to the example in FIG. 6, the announcement priority is at "Low", "Medium", and "High" three levels, but the number of the levels may be smaller or larger than three. The level of the announcement priority of each of the events may also depend on the event type.

In the present embodiment, for example, there are display modes (m1) to (m5) shown below. In the present embodiment, to achieve one or more of the display modes (m2) to (m5), the achievement of the display mode (m1) is mandatory. However, instead of doing so, it may also be possible to achieve one or more of the display modes (m2) to (m5) without achieving the display mode (m1).

Display mode (m1): display of trouble retention situation
Display mode (m2): display of trouble high frequency step
Display mode (m3): display of affected interval
Display mode (m4): display of event
Display mode (m5): display of changing tendency of retention The following will describe each of the display modes. It is assumed that, in the following description, for ease of explanation, the retention number is calculated for each inter-step range and for each intra-step range, while the warning threshold and the abnormal threshold are set for each inter-step range, but are not set for each intra-step range. In other words, it is assumed that, in the following description, the accentuated display associated with the warning retention situation and the abnormal retention situation may be performed for the inter-step range, but may not be performed for the intra-step range. Note that, in the present invention, the accentuated display of the trouble retention situation such as the warning retention situation or the abnormal retention situation is not limited to that for the inter-step range. Instead of or in addition to the accentuated display of the trouble retention situation for the inter-step range, the accentuated display of the trouble retention situation for the intra-step range may also be performed.

Display Mode (m1): Display of Trouble Retention Situation

"Display of the trouble retention situation" is displaying a retention situation such as the warning retention situation or the abnormal situation, if any.

Figure 7:
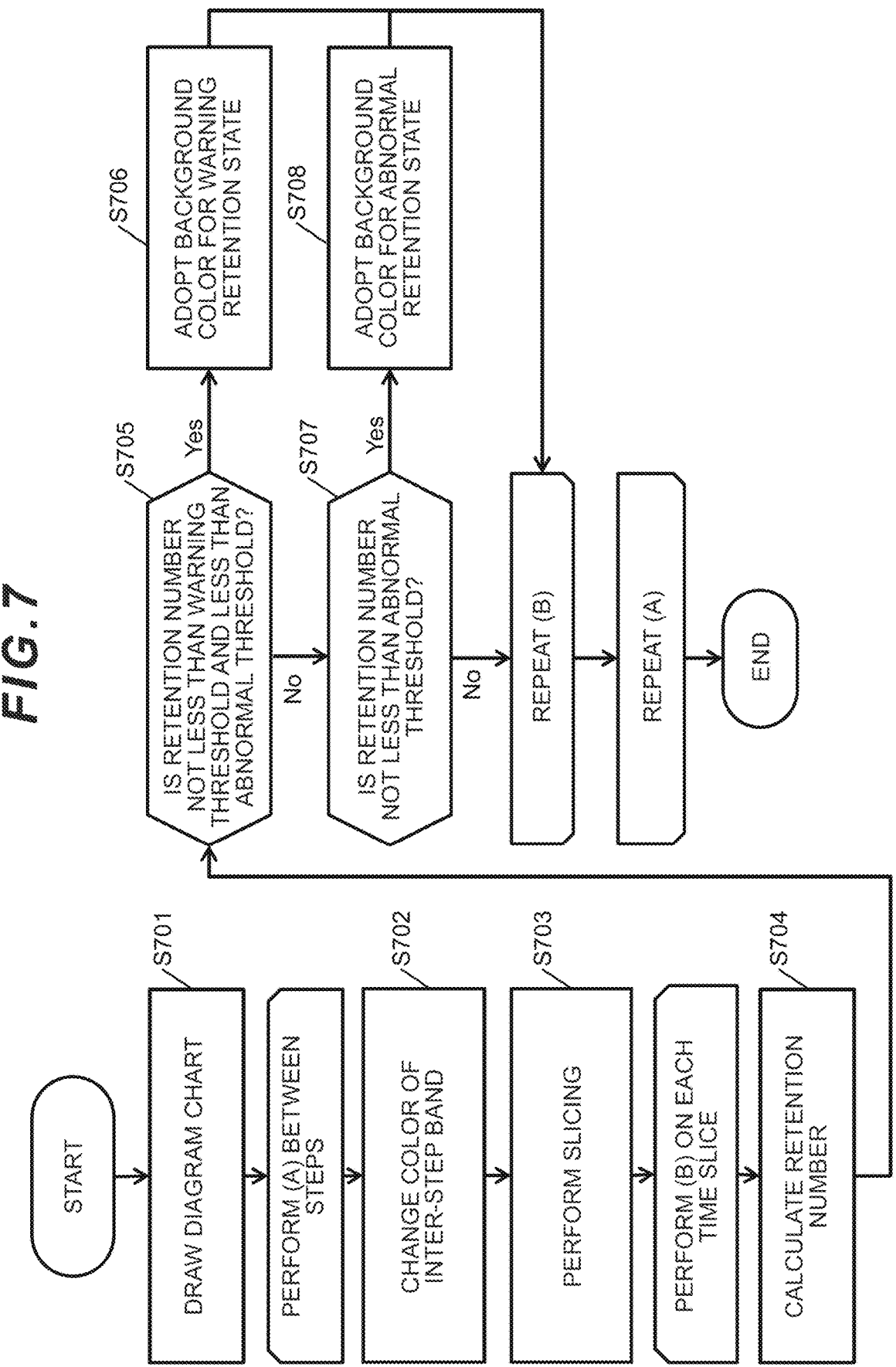
FIG. 7 shows the flow of a display control process related to a display mode (m1)

FIG. 7 shows the flow of a display control process related to the display mode (m1).

The management server program 271 draws the diagram chart during the display target period on the memory portion on the basis of the past record table 351 (S701). For example, the time axis and the step axis are drawn and, for each step, the starting axis 159S and the ending axis 159E are drawn. As a result, the intra-step bands 160A and the inter-step bands 160B are alternately arranged along a direction parallel with the step axis. Then, for each product belonging to the display target period, the point corresponding to the starting time of each step for the product is plotted on the starting axis, the point corresponding to the ending time of each step for the product is plotted on the ending axis, and the point on the starting axis and the point on the ending axis are connected. Consequently, the polygonal line for each product is drawn.

With respect to each inter-step range and each intra-step range, S702 to S708 are performed (loop (A)). In the following, one inter-step range and one intra-step range are taken as examples (which are a "target inter-step range" and a "target intra-step range" in the description of FIG. 7).

The management server program 271 displays the inter-step band 160B corresponding to the target inter-step range in a display mode (e.g., color) different from the display mode in which each of the intra-step bands 160A is displayed (S702).

The management server program 271 slices the display target period on a per unit time basis (e.g., every one minute), starting from the starting time (S703). In other words, a time corresponding to every unit time between the starting time of the display target period to the ending time thereof is determined to be a time as a target of retention number calculation. The individual periods obtained by the slicing are hereinafter referred to as "time slices". A time belonging to each of the time slices (e.g., the starting time of each of the time slices) is an example of the time as the target of retention number calculation. Note that the time slices may also be determined by another method, such as by random determination.

With respect to each of the time slices, S704 to S708 are performed (loop (B)). In the following, one time slice is taken as an example (which is a "target time slice" in the description of FIG. 7).

The management server program 271 calculates, for the target time slice, the respective retention numbers in the target inter-step range and the target intra-step range (S704). The retention numbers calculated for the target inter-step range and the target intra-step range in S704 correspond to the number of products present in the target time slice and is recorded in the retention number table 353.

The management server program 271 determines, for the target time slice, whether or not the retention number in the target inter-step range is equal to or larger than the warning threshold in the target inter-step range and less than the abnormal threshold in the target inter-step range on the basis of the retention number table 353 (S705). When the result of the determination in S705 is true (Yes in S705), the management server program 271 changes the display mode of the portion of the inter-step band 160B as the target inter-step range which corresponds to the target time slice to a display mode corresponding to the warning retention situation (S706).

When the result of the determination in S705 is false (No in S705), the management server program 271 determines, for the target time slice, whether nor not the retention number in the target inter-step range is equal to or larger than the abnormal threshold in the target inter-step range on the basis of the retention number table 353 (S707). When the result of the determination in S707 is true (Yes in S707), the management server program 271 changes the display mode of the portion of the inter-step band 160B as the target inter-step range which corresponds to the target time slice to a display mode corresponding to the abnormal retention situation (S708).

Figure 8:
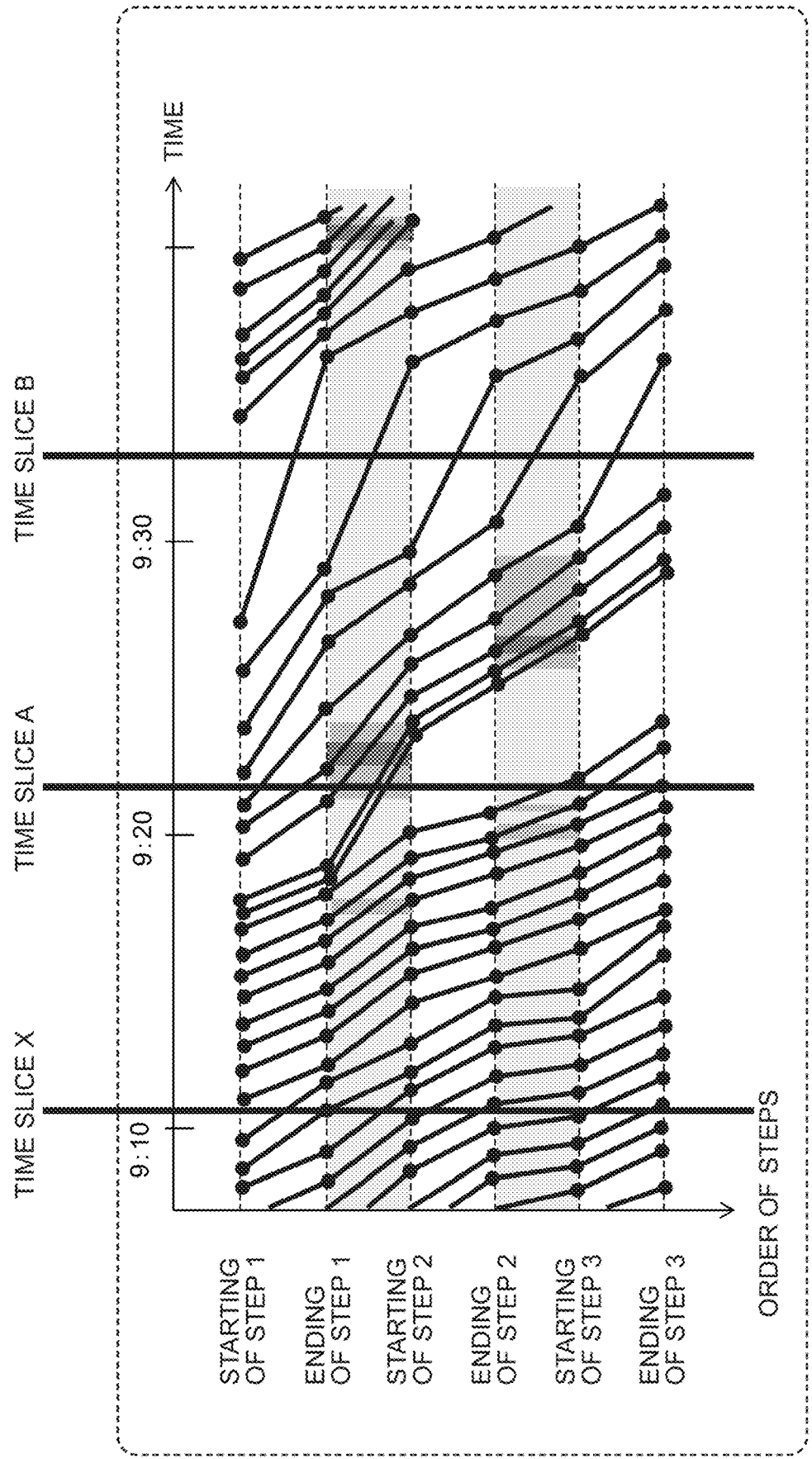
FIG. 8 shows the outline of an example of retention number calculation.

FIG. 8 shows the outline of an example of retention number calculation.

It is assumed that, in FIG. 8, the relationships between each inter-step range and the warning threshold and the abnormal threshold are as follows.

Inter-step range 1-2: warning threshold is "3" and abnormal threshold is "4"
Inter-step range 2-3: warning threshold is "2" and abnormal threshold is "3"

In FIG. 8, three time slices X, A, and B are shown by way of example. These times slices X, A, and B are as follows. Specifically, the time slice X is as follows.

The retention number in the inter-step range 1-2 is "1".
This is because the number of the line segments crossing the time slice X in the inter-step range 1-2 is "1".
The retention number "1" is smaller than each of the warning threshold and the abnormal threshold in the inter-step range 1-2. Accordingly, the portion of the inter-step band 160B1 which corresponds to the time slice X is not determined to be the accentuated display target.

The retention number in the inter-step range 2-3 is "0". Accordingly, the portion of the inter-step band 160B2 which corresponds to the time slice X is not determined to be the accentuated display target.

The time slice A is as follows.

The retention number in the inter-step range 1-2 is "3". This is because the number of the line segments crossing the time slice A in the inter-step range 1-2 is "3". The retention number "3" is equal to or larger than the warning threshold in the inter-step range 1-2, but is less than the abnormal threshold in the inter-step range 1-2. Accordingly, the portion of the inter-step band 160B1 which corresponds to the time slice A is determined to be the accentuated display target corresponding to the warning retention situation.

The retention number in the inter-step range 2-3 is "1". The retention number "1" is smaller than each of the warning threshold and the abnormal threshold in the inter-step range 2-3. Accordingly, the portion of the inter-step band 160B2 which corresponds to the time slice A is not determined to be the accentuated display target.

The time slice B is as follows.

The retention number in the inter-step range 1-2 is "1". Accordingly, the portion of the inter-step band 160B1 which corresponds to the time slice B is not determined to be the accentuated display target.

The retention number in the inter-step range 2-3 is also "1". Accordingly, the portion of the inter-step band 160B2 which corresponds to the time slice B is not determined to be the accentuated display target.

FIG. 9 sows the retention number table 353.

The retention number table 353 holds, for each time slice, the retention numbers calculated on a per inter-step and intra-step range basis. Specifically, for example, the retention number table 353 has records for the individual inter-step ranges and the individual intra-step ranges on a one-to-one basis. In each record, the retention number calculated for the intra-step range or inter-step range corresponding to the record is recorded on a per time slice basis.

Figure 10:
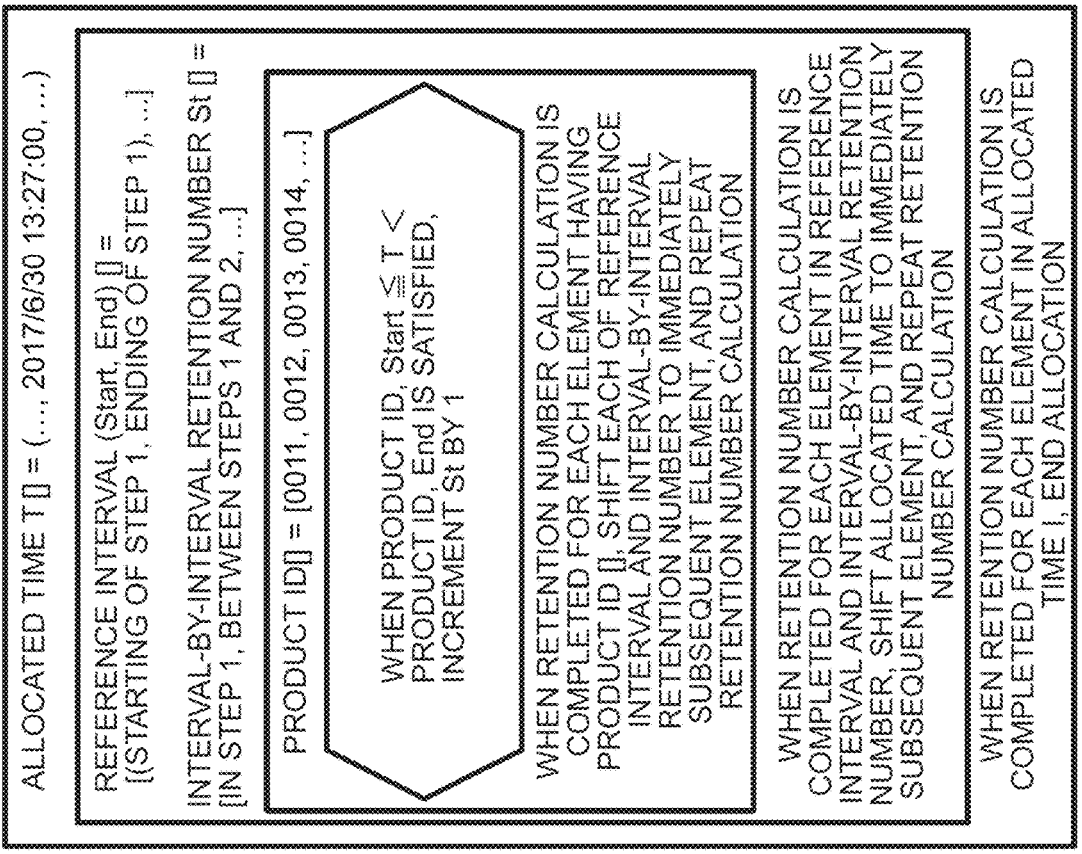
FIG. 10 is an illustrative view of an example of retention number calculation.

FIG. 10 is an illustrative view of an example of retention number calculation.

In the retention number calculation, the following variables are used. Of the following variables, a reference interval (Start, End) and an interval-by-interval retention number St are provided on a per time slice basis. A product ID is provided on a per reference interval basis. The variables include:

an allocated time T as a variable to which a time (e.g., starting time) in the time slice is set as a value;

the reference interval (Start, End) as variables to which the reference interval is set as values, of which "Start" is the variable to which the definition of the starting of the reference interval is set as a value (specifically, a variable to which the inter-step range or intra-step range in which the reference interval is started is set as a variable) and "End" is a value to which the definition of the ending of the reference interval is set as a value (specifically, a variable to which the inter-step range or intra-step range in which the reference interval is ended is set as a variable);

the interval-by-interval retention number St as the count value of the products in each reference interval; and the product ID.

The details of the retention number calculation (S704) is as follows. In the following, one reference interval (inter-step range or intra-step range) and one time slice are taken as examples (which are a "target reference interval" and a "target time slice" in the description of FIG. 10).

The management server program 271 sets a time (e.g., stating time) in the target time slice to the allocated time T.

Next, the management server program 271 respectively sets the starting and ending of the target reference interval to Start and End.

Finally, "when product ID, Start≤T<product ID, End is satisfied, the management server program 271 increments the interval-by-interval retention number St by 1" on a per product basis.

For example, when allocated time T=2017/6/30 13:27:00 and reference interval (Start, End)=(starting of step 1, ending of step 1) are assumed to be satisfied, according to the example in FIG. 10, "product ID, Start≤T<product ID, End" is satisfied with respect to the four products (product IDs "0011" to "0014") Accordingly, "4" is allocated to the retention number, and the retention number "4" is recorded in the corresponding cell of the retention number table 353 (the cell corresponding to in step 1 and 2017/6/30 13:27:00).

Display Mode (m2): Display of Trouble High Frequency Step

The display mode (m2) can be adopted when there are two or more inter-step ranges (the inter-step range may also be one when the accentuated display target of the trouble retention situation is also applicable to the intra-step range). The "display of the trouble high frequency step" is performing the accentuated display of the inter-step range in which the frequency of the retention situation satisfying the predetermined requirement is relatively high. The "retention situation satisfying the predetermined requirement" may appropriately be, e.g., the excess situation or over-reduction situation at a level worse than a given level (e.g., the worst) among the excess situations or over-reduction situations at multiple levels.

Figure 11:
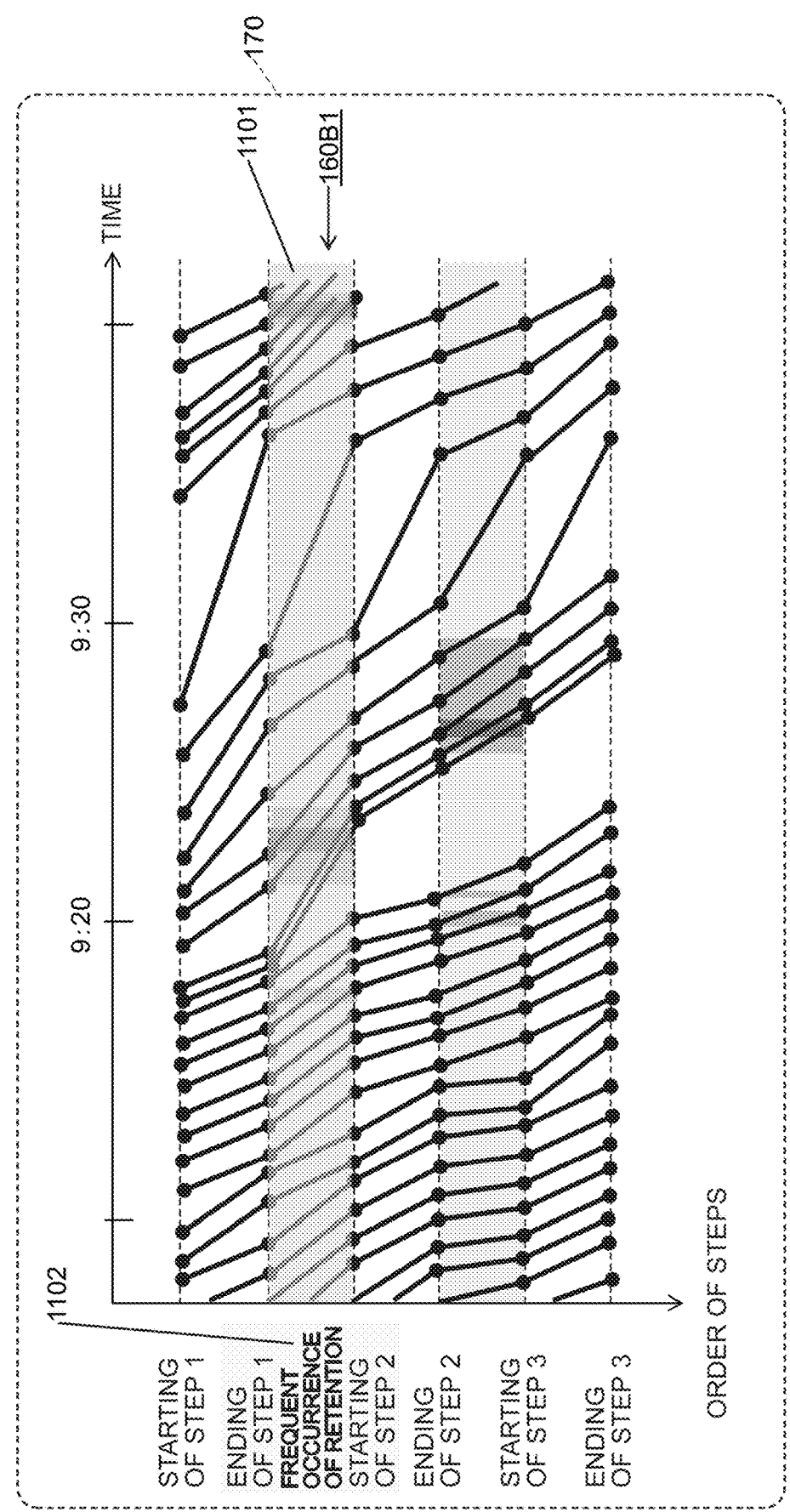
FIG. 11 shows an example of display of a trouble high frequency step.

FIG. 11 shows an example of the display of the trouble high frequency step.

The display shown by way of example in FIG. 11 may be performed when the achievement of the present display mode (m2) is specified by the user or settings which allow the display to be performed may also be made in advance. According to the example in FIG. 11, "the retention situation satisfying the predetermined requirement" is the abnormal retention situation. The "frequency" is at least one of the number of occurrences of the abnormal retention situation and a cumulative period. The "number of occurrences" is a count value when the abnormal retention situation from the start thereof to the end thereof is counted as one set (once). The "cumulative period" is a total value of one or more periods individually corresponding to one or more abnormal retention situations. The period of each of the abnormal retention situations is the period from the starting of the abnormal retention situation to the ending thereof.

The management server program 271 may allocate, for each time slice, the retention number on a per inter-step range basis and determine whether or not the retention number is equal to or larger than the abnormal threshold, by using a method such as that shown in FIG. 7. When there is the inter-step range for which the result of the determination is true for each time slice, the period corresponding to the time slice is the period having the abnormal retention situation with respect to the inter-step range.

The management server program 271 calculates, for each inter-step range, the frequency of the abnormal retention situation (which is at least one of the number of occurrences of the abnormal retention situation and the cumulative period). Then, the management server program 271 performs the accentuated display of the inter-step range having a calculated frequency which is relatively high (highest). According to the example in FIG. 11, the inter-step range having a relatively high frequency is the inter-step range 1-2, the accentuated display target is the inter-step band 160B1 corresponding to the inter-step range 1-2, and the mode of the accentuated display is the superimposition of a translucent band 1101 (an example of the display object) over the entire region of the inter-step band 160B1 and the display of a display object 1102 including the character string "FREQUENT OCCURRENCE OF RETENTION" subjected to the accentuated display over the region including the character string "ENDING OF STEP 1" and the character string "STARTING OF STEP 2".

For example, when only the display mode (m1) is adopted as the display mode to be achieved, the display mode of the inter-step range in which the abnormal retention situation has occurred is the same irrespective of the frequency of the abnormal retention situation. Accordingly, for the user to recognize the frequency of the abnormal retention situation, the user needs to individually calculate the frequency on a per inter-step range basis by visual inspection. However, when the display target period is long, the time axis is compressed (the period corresponding to the same range on the time axis is elongated), and therefore numerous polygonal lines are densely arranged along a direction parallel with the time axis. As a result, it is difficult for the user to calculate the frequency by visual inspection.

According to the present display mode (m2), it is possible to intuitively (easily) recognize the inter-step range for which measures should preferentially be taken in the whole production line by visual inspection.

Display Mode (m3): Display of Affected Interval

The "display of affected interval" is displaying an interval in which productivity is presumably affected.

Figure 12:
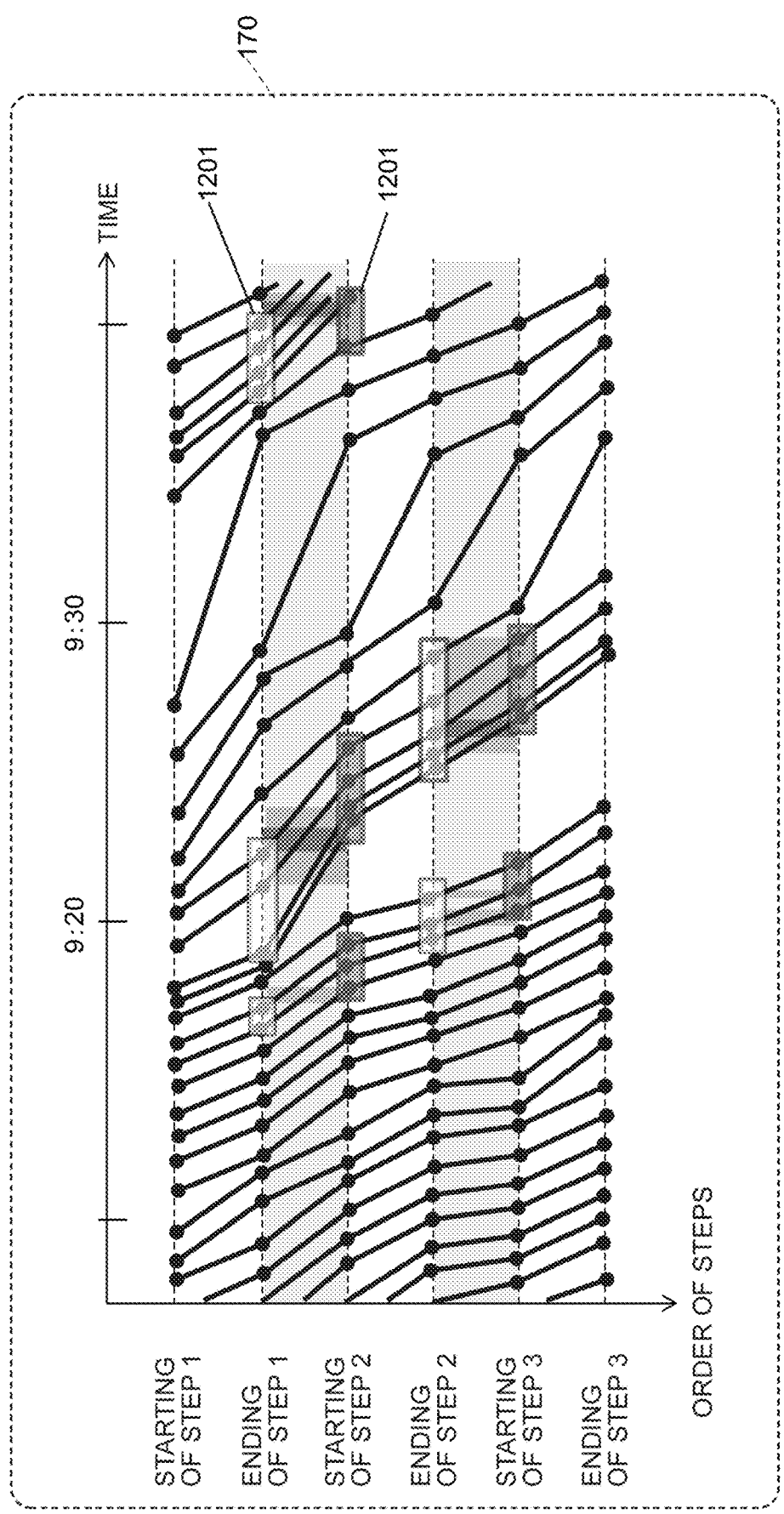
FIG. 12 shows an example of display of affected intervals.

FIG. 12 shows an example of the display of the affected interval.

The display shown by way of example in FIG. 12 may be performed when the achievement of the present display mode (m3) is specified by the user or settings which allow the display to be performed may also be made in advance. The management server program 271 determines the presence or absence of a target time group for at least one step on the basis of the past record table 351.

For at least one step, the "target time group" mentioned herein is at least one of an ending time group and a starting time group.

For at least one step, the "ending time group" includes two or more ending times forming an ending time interval shorter than a starting time interval for the subsequent step and respectively corresponding to two or more consecutive products.

On the other hand, for at least one step, the "starting time group" includes two or more starting times forming a starting time interval longer than an ending time interval for the previous step and respectively corresponding to two or more consecutive products.

When there is such a target time group, it is presumed that, with respect to the inter-step range or intra-step range to which the target time group belongs, the retention period of a product having the starting time or the ending time belonging to the target time group tends to be long. As a result, it is presumed that the retention number in the inter-step range or intra-step range tends to be large. Accordingly, the target time group corresponds to the interval in which productivity is presumably affected.

As a result, when there is such a target time group, the management server program 271 displays an affected interval display object 1201 as the display object covering two or more points corresponding to the two or more times forming the target time group such that the affected interval display object 1201 overlaps the two or more points (or as the background of the two or more points). At that time, as shown by way of example in FIG. 12, the display mode of the affected interval display object 1201 may differ depending on whether the target time group is the ending time group or the starting time group.

Instead of or in addition to the display of the affected interval display object 1201, the management server program 271 may also perform the accentuated display of the two or more points respectively corresponding to the two or more times forming the target time group.

The presence or absence of the target time group is determined for at least one step, and the "at least one step" may be each of all the steps or may also be limited to the step included in the inter-step range or intra-step range to which the retention situation satisfying the predetermined requirement (e.g., at least one of the warning retention situation and the abnormal retention situation) belongs. It may also be possible that the presence or absence of the target time group is determined for the affected time block that is a time block including at least a portion of a period having the retention situation satisfying the predetermined requirement (e.g., at least one of the warning retention situation and the abnormal retention situation), and is not determined for the other time blocks. This can reduce a burden on the process for displaying the affected interval. Note that the "affected time block" may be at least a portion of the period having the retention situation satisfying the predetermined requirement or a period obtained by adding on a given period at the beginning and/or ending of at least the portion of the period.

Display Mode (m4): Display of Event

The "display of event" is displaying an event presumed to have at least partially caused the retention situation (e.g., at least one of the warning retention situation and the abnormal retention situation) satisfying the predetermined requirement or presumed to be at least partially affected by the satisfying retention situation.

Figure 13:
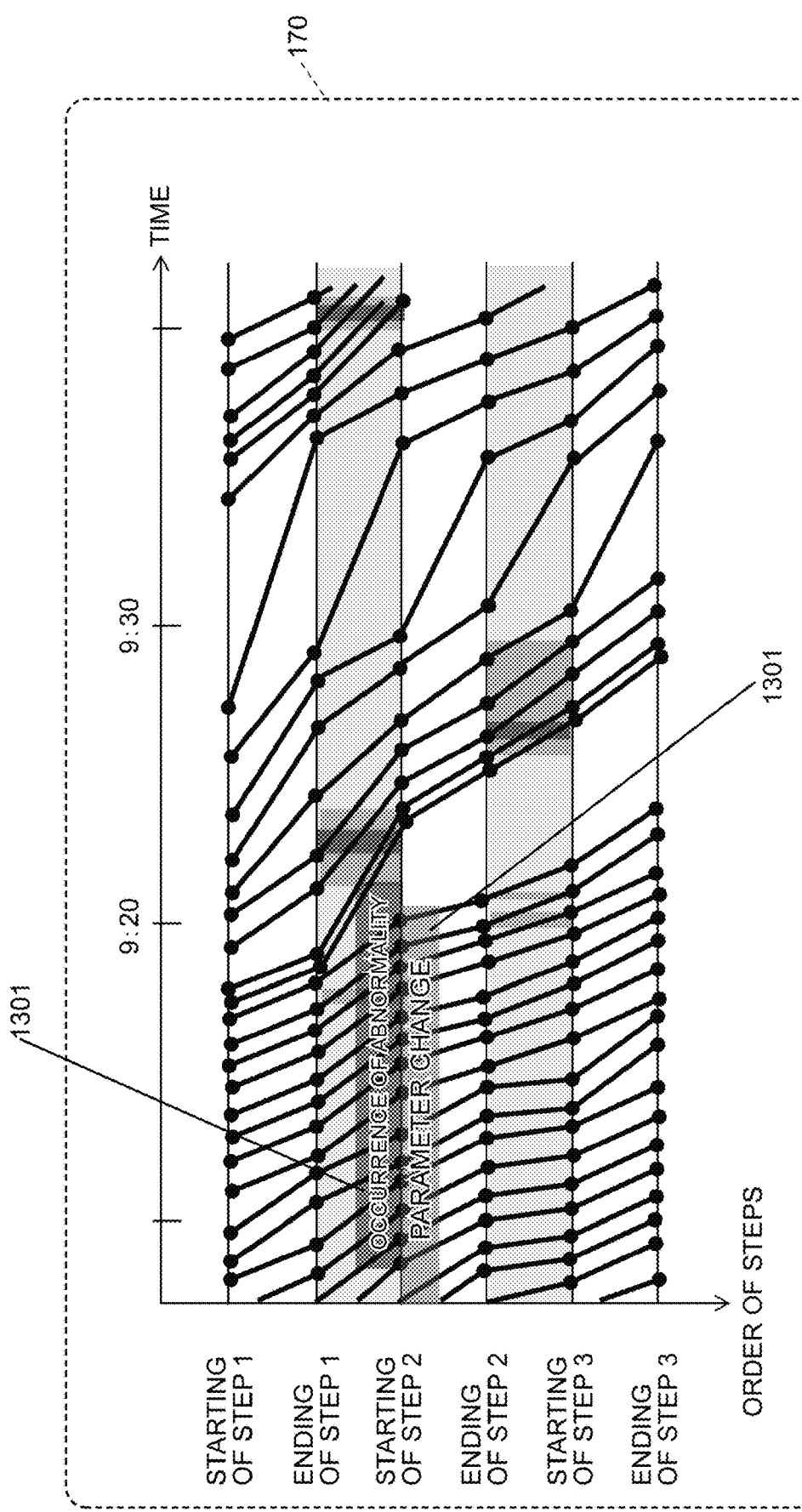
FIG. 13 shows an example of display of events.

FIG. 13 shows an example of the display of an event.

The display shown by way of example in FIG. 13 may be performed when the achievement of the present display mode (m4) is specified by the user or settings which allow the display to be performed may also be made in advance. When there is the retention situation satisfying the predetermined requirement, the management server program 271 determines the presence or absence of an event satisfying requirements (c1) and (c2) shown below on the basis of the event table 352. Such an event corresponds to the event presumed to have at least partially caused the retention situation satisfying the predetermined requirement or presumed to be at least partially affected by the satisfying retention situation. Note that the "time block" in the requirement (c2) may be at least a portion of the period having the satisfying retention situation or a period obtained by adding on a given time at the beginning and/or ending of at least the portion of the period.

(c1) the occurrence step belongs to the inter-step and/or intra-step range in which the satisfying retention situation has occurred; and (c2) at least a portion of the event time block of the event belongs to a time block including at least a portion of a period having the satisfying retention situation.

When there is such an event, the management server program 271 superimposes an event display object 1301 (e.g., translucent band) as the display object having a length corresponding to the event time block of the event and parallel with the time axis, on the position on the diagram chart 170 corresponding to the step coincident with the occurrence step of the event and to the event time block of the event.

For example, in the display mode (m1) described above, the portion of the diagram chart 170 corresponding to the retention situation satisfying the predetermined requirement is subjected to the accentuated display. However, it may be difficult to recognize, only from the accentuated display of such a portion as corresponding to the retention situation, the factor that has caused the retention situation or the influence given by the retention situation.

Accordingly, in the present display mode (m4), the event display object 1301 corresponding to the event satisfying the requirements (c1) and (c2) shown above is displayed so as to overlap the diagram chart 170. This allows the user to browse through the diagram chart 170 and compare the event display object 1301 to the portion (e.g., the rectangular portion corresponding to the warning retention situation or the abnormal retention situation) of the diagram chart 170 which is subjected to the accentuated display. As a result, it can be expected to allow which event has caused which retention situation or which event has affected which retention situation to be presumed.

Note that, on the basis of FIG. 13, e.g., the following description may be given.

For each event, the event data showing the event has at least the event time block and the occurrence step. In the event data, the event time block includes, of the starting time and the ending time of the event, at least the occurrence time. When the ending time of the event time block is undetermined in the event data, the ending time may appropriately be a given time after the starting time. The given time may also differ from one event type to another.

As described above, the management server program 271 overlaps the event display object 1301 of the event on the "position corresponding to the step coincident with the occurrence step of the event and to the event time block of the event" on the diagram chart 170. When the "position corresponding to the step coincident with the occurrence step of the event and to the event time block of the event" refers to a position on the time axis, the position referred to may be a position corresponding to the starting time of the event time block for one end of the event display object 1301 and may be a position corresponding to the ending time of the event time block for the other end of the event display object 1301 (the ending time may be the ending time specified by the event data or may also be the ending time determined by the management server program 271). When the position refers to a position on the step axis, the position referred to may be a position corresponding to the occurrence step (specifically, e.g., at least one of the position coincident with the occurrence step, a position at a predetermined distance from the coincident position in a positive direction (downward direction in the example in FIG. 13), and a position at the predetermined distance from the coincident position in a negative direction (upward direction in the example in FIG. 13)).

When there are a plurality of the events each satisfying the requirements (c1) and (c2) shown above and the display positions of the plurality of events at least partly overlap, the event as the display target may be an event having a relatively high priority (e.g., having a highest priority) or having a relatively short event time block (e.g., having a shortest event time block). The "plurality of events" mentioned herein are, e.g., events having the same occurrence step and the overlapping event time blocks. When all the events are adopted as display targets with respective to the same step and the same time, visibility may be degraded. Accordingly, the number of the events which can be displayed with respect to the same step and the same time is preferably limited to N or less (N is an integer of 2 or more). However, since the event adopted as a display target under the limit is the event corresponding to at least one of an event having a relatively high priority and an event having a relatively short event time block, it can be expected that a more appropriate event is preferentially displayed.

Note that the "occurrence step" is a step in which the event has occurred, but one or more steps may also be the "occurrence steps". In other words, the occurrence step may be one or more steps. Accordingly, a first event (any event) and a second event (any event other than the first event) which have "the same occurrence step" may indicate that at least one of the occurrence steps of the first event and at least one of the occurrence steps of the second event are the same step.

Also, the first event and the second event which have "the overlapping event time blocks" mean that a time block corresponding to at least a portion of the event time block of the first event and a time block corresponding to at least a portion of the event time block of the second event are the same time block. Accordingly, the event time block of one of the first event and the second event may also be completely or partially included in the event time block of the other of the first event and the second event.

In addition, the N (N is an integer of 2 or more) event display objects respectively corresponding to the N events among the events having the same occurrence step and having the overlapping event time blocks are arranged in parallel with the step axis with respect the same occurrence step. This allows the user browsing through the diagram chart 170 to be notified of the N events occurred in given overlapping time blocks with respect to the same step. Note that, in accordance with at least one of the number of the events adopted as the display targets with respect to the same step and the same time and the priorities thereof, the height (height of the band) of the event display object of each of the events may be determined by the management server program 271. According to the example in FIG. 13, when there are two events as the display targets with respect to the same time, the height of the event display object is adjusted to ½ of the height of the event display object when the event as the display target is one.

Display Mode (m5): Display of Changing Tendency of Retention

The "display of changing tendency of retention" is displaying the changing tendency of the retention period in each inter-step range (and/or in each intra-step range). Specifically, the "display of changing tendency of retention" is performing the accentuated display of a changing tendency satisfying a requirement corresponding to an increasing tendency or a requirement corresponding to a decreasing tendency when such a changing tendency is found.

Figure 14:
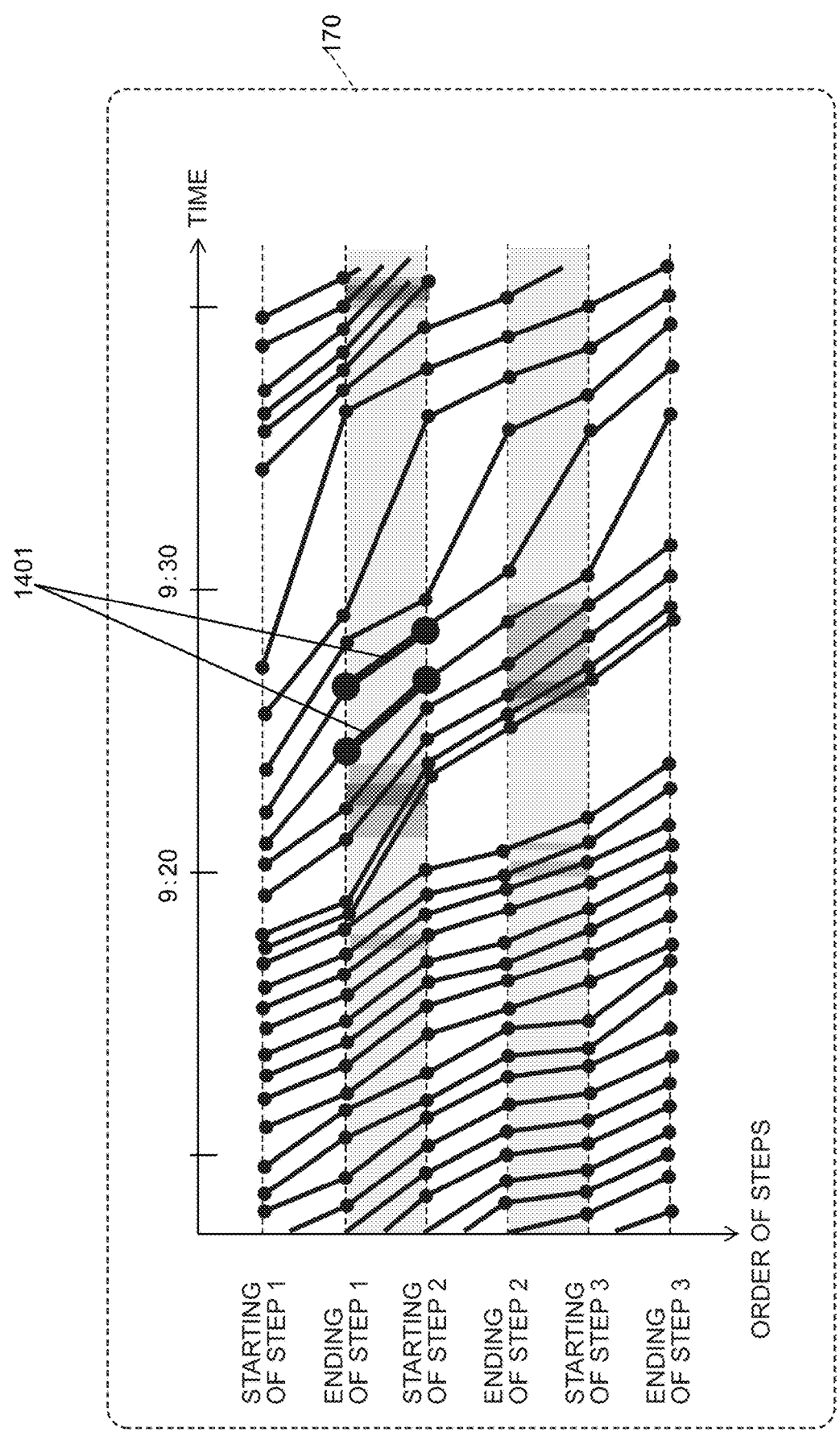
FIG. 14 shows an example of display of the changing tendency of retention.
Figure 15:
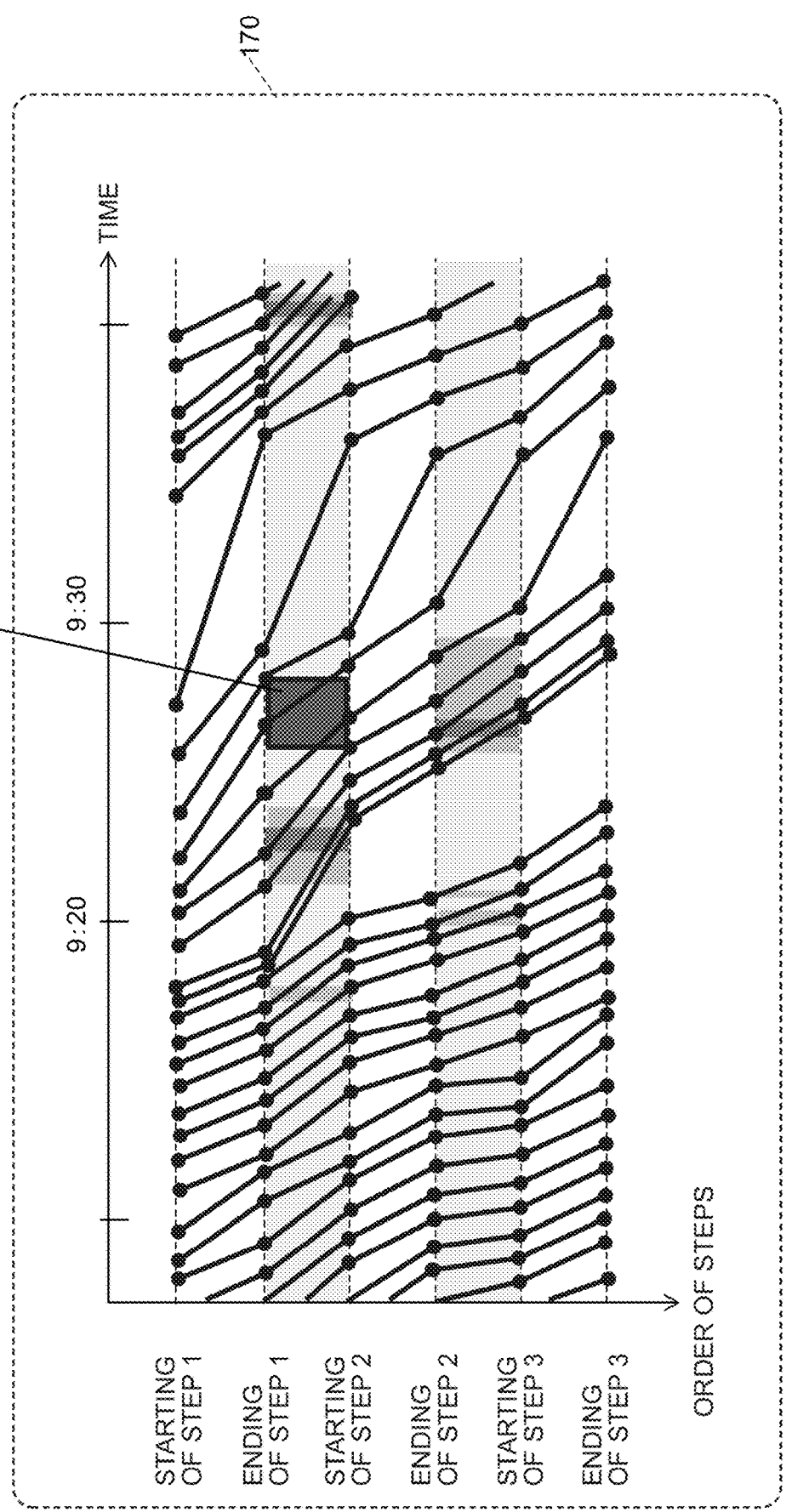
FIG. 15 shows another example of the display of the changing tendency of retention.

FIG. 14 shows an example of the display of the changing tendency of retention. FIG. 15 shows another example of the display of the changing tendency of retention.

The display shown by way of example in FIG. 14 or FIG. 15 may be performed when the achievement of the present display mode (m5) is specified by the user or settings which allow the display to be performed may also be made in advance. The management server program 271 specifies, for each of two or more consecutive products during the display target period and on a per step basis, an intra-step retention period as the period from the starting time of each of the steps to the ending time of the step and/or an inter-step retention period as the period from the ending time of the step to the starting time of the subsequent step on the basis of the past record table 351. The management server program 271 determines whether or not there is the changing tendency of retention satisfying a predetermined requirement on the basis of each intra-step retention period and/or each inter-step retention period specified for each of the two or more products. When there is the satisfying changing tendency, the management server program 271 performs the accentuated display of the display object to which the satisfying changing tendency belongs.

For example, when only the display mode (m1) is adopted as the display mode to be achieved, the occurrence of the trouble retention situation (e.g., the warning retention situation or the abnormal retention situation) can be recognized by visual inspection. However, it is difficult to predict whether or not any trouble retention situation will occur again after this trouble retention situation and, if any, the time at which the future trouble retention situation will occur. It can be considered that the problem encountered is more serious particularly when the display target period is long and therefore the time axis is compressed, as described above.

In the present display mode (m5), when there is the changing tendency of retention satisfying the predetermined requirement, the display object to which the changing tendency belongs is subjected to the accentuated display. Accordingly, by comparing the display object to the display position of the trouble retention situation, it is possible to predict the occurrence of trouble after the current trouble retention situation.

Note that the display object to which the changing tendency satisfying the predetermined requirement belongs may be such a newly produced display object as to be displayed so as to overlap the diagram chart 170. In the present embodiment, such a display object is at least one of display objects (x) and (y) shown below. According to FIGS. 14 and 15, either one of the display objects (x) and (y) corresponds to such a display object. The display object (x) is a line segment 1401 shown by way of example in FIG. 14. The display object (y) is a rectangular portion 1501 shown by way of example in FIG. 15. Thus, it can be expected to maintain visibility by using the display objects present on the diagram chart 170 to display the changing tendency irrespective of whether or not the present display mode (m5) is adopted.

(x) in the inter-step band (and/or intra-step band) to which the satisfying changing tendency belongs, a line segment to which the satisfying changing tendency belongs among two or more line segments respectively corresponding to the two or more products; and (y) in the inter-step band (and/or intra-step band) to which the satisfying changing tendency belongs, a rectangular portion having a width corresponding to a time block to which the satisfying changing tendency belongs.

The following will describe an example of a method of specifying the changing tendency. Note that, in the following description, a product having a product ID: a may be referred to as the "product a".

First, the management server program 271 specifies, for each of the two or more consecutive products during the display target period and on a per step basis, the intra-step retention period as the period from the starting time of each of the steps to the ending time of the step and the inter-step retention period as the period from the ending time of the step to the starting time of the subsequent step on the basis of the past record table 351. The management server program 271 records, for each product, the intra-step retention period and the inter-step retention period of each of the steps in the retention period table 354. As shown in FIG. 16, the retention period table 354 holds, for each product, the product ID and information showing the intra-step retention period and the inter-step retention period of each of the steps. Note that the values shown by way of example in FIG. 16 are calculated from the past record table 351 shown by way of example in FIG. 5. For example, in the inter-step range 1-2, the inter-step retention period of the product 0011 is "121" (measured in seconds) from the ending time "2017/6/30 13:22:12" of step 1 to the starting step "2017/6/30 13:29:13" of step 2.

Next, the management server program 271 performs, for each of the two or more consecutive products mentioned above other than the leading one, processes (m1) and/or (m2) shown below.

(m1) The management server program 271 specifies, for each intra-step range, an intra-step difference as a value obtained by subtracting the intra-step retention period of the product from the intra-step retention period of the product previous to the product.

(m2) The management server program 271 specifies, for each inter-step range, an inter-step difference as a value obtained by subtracting the inter-step retention period of the product from the inter-step retention period of the product previous to the product.

The management server program 271 records, for each product other than the leading product, the specified intra-step difference and/or inter-step difference in the changing tendency table 355 on a per step basis. As shown in FIG. 17, the changing tendency table 355 holds, for each product, a production ID and information showing the intra-step difference and the inter-step difference in each of the steps. Note that the values shown by way of example in FIG. 17 are calculated from the retention period table 354 shown by way of example in FIG. 16. For example, a value obtained by subtracting the intra-step retention period "366" of the product 0011 from the intra-step retention period "366" of the product 0012 for the range in step 1 is "0". Also, for example, a value obtained by subtracting the inter-step retention period "121" of the product 0011 from the inter-step retention period "123" of the product 0012 for the inter-step range 1-2 is "2".

The satisfying changing tendency is any of tendencies (a) to (d) shown below (e.g., the probability that any of the tendencies has consecutively occurred N times (N is a natural number) or has occurred in a given period has a given value or more) and, in each of the tendencies (a) to (d), at least one of the intra-step difference or inter-step difference of the product and the intra-step difference or inter-step difference of the subsequent product has an absolute value equal to or larger than a threshold.

(a) With respect to any intra-step range or inter-step range, the sum of the intra-step difference or inter-step difference of each of the products and the intra-step difference or inter-step difference of the subsequent product is positive, and the intra-step difference or inter-step difference of the subsequent product is also positive.

(b) With respect to any intra-step range or inter-step range, the sum of the intra-step difference or inter-step difference of each of the products and the intra-step difference or inter-step difference of the subsequent product is negative, and the intra-step difference or inter-step difference of the subsequent product is also negative.

(c) With respect to any intra-step range or inter-step range, the sum of the intra-step difference or inter-step difference of each of the products and the intra-step difference or inter-step difference of the subsequent product is positive, while the intra-step difference or inter-step difference of the subsequent product is negative.

(d) With respect to any intra-step range or inter-step range, the sum of the intra-step difference or inter-step difference of each of the products and the intra-step difference or inter-step difference of the subsequent product is negative, while the intra-step difference or inter-step difference of the subsequent product is positive.

FIG. 18 shows an example of each of the tendencies (a) to (d). It is assumed that, in FIG. 18, of the intra-step difference and the inter-step difference, the inter-step difference is a use target. It is also assumed that, in the description of FIG. 18, the threshold compared to the absolute value of the inter-step difference is "5".

A reference sign 1801 shows an example of the tendency (a). Specifically, in the inter-step range 1-2, the absolute value of each of the inter-step difference "120" of the product 0013 and the inter-step difference "465" of the subsequent product 0014 is equal to or larger than the threshold "5". The sum of the inter-step difference "120" of the product 0013 and the inter-step difference "485" of the product 0014 is a positive value "585". The inter-step difference "485" of the product 0014 subsequent to the product 0013 is also a positive value. Such a result shows that, in the inter-step range 1-2, the inclinations of the line segments tend to decrease with regard to the products 0013 and 0014. In other words, the retention period tends to increase.

A reference sign 1802 shows an example of the tendency (b). Specifically, in the inter-step range 2-3, the absolute value of each of the inter-step difference "−23" of the product 0013 and the inter-step difference "−50" of the subsequent product 0014 is equal to or larger than "5". The sum of the inter-step difference "−23" of the product 0013 and the inter-step difference "−50" of the product 0014 is a negative value "−73". The inter-step difference "−50" of the product 0014 subsequent to the product 0013 is also a negative value. Such a result shows that, in the inter-step range 2-3, the inclinations of the line segments tend to increase with regard to the products 0013 and 0014. In other words, the retention period tends to decrease.

A reference sign 1803 shows an example of the tendency (c). Specifically, in the inter-step range 1-2, the absolute value of each of the inter-step difference "465" of the product 0014 and the inter-step difference "−318" of the subsequent product 0015 is equal to or larger than "5". The sum of the inter-step difference "465" of the product 0014 and the inter-step difference "−318" of the product 0015 is a positive value "147". However, the inter-step difference "−318" of the product 0015 subsequent to the product 0014 is a negative value. Such a result shows that, in the inter-step range 1-2, the retention period has abruptly increased with regard to the products 0014 and 0015 or, in other words, the increase of the retention period is maintained.

A reference sign 1804 shows an example of the tendency (d). Specifically, in the inter-step range 2-3, the absolute value of the inter-step difference "−50" of the product 0014 is equal to or larger than "5". The sum of the inter-step difference "−50" of the product 0014 and the inter-step difference "4" of the product 0015 is a negative value "−46". However, the inter-step difference "4" of the product 0015 subsequent to the product 0014 is a positive value. Such a result shows that, in the inter-step range 2-3, the retention period has temporarily decreased with regard to the products 0014 and 0015 or, in other words, the decrease of the retention period is maintained.

The foregoing is the description of the display modes (m1) to (m5).

The time block as a range in which the presence or absence of the trouble retention situation is examined (and the time block as a range in which the presence or absence of the changing tendency satisfying the predetermined requirement is examined) may be the whole display target period but, in that case, it may be difficult to recognize the relation to a real event. Accordingly, in the present embodiment, the time block as the range in which the presence or absence of the trouble retention situation is examined (and the time block as the range in which the presence or absence of the changing tendency satisfying the predetermined requirement is examined) is within at least one analysis time block. The analysis time block is the time block defined as an analysis target and including the event time block of at least one of all the events shown by at least any event data having the event time block belonging to the display target period. In other words, in the present embodiment, such an examination target range can be narrowed down to the analysis time block as a portion of the display target period using the event table 352.

The following will describe an example of a method of determining the analysis time block.

FIG. 19 shows the analysis time block table 356.

The analysis time block table 356 has records for the individual analysis time blocks on a one-to-one basis. Each of the records holds information such as an interval ID 1901, an interval type 1902, a starting time 1903, an ending time 1904, an interval correction value 1905, a post-correction starting time 1906, and a post-correction ending time 1907. The following will take one analysis time block as an example ("target analysis time block" in the description of FIG. 19).

The interval ID 1901 shows the ID of the target analysis time block. The interval type 1902 shows the event type of the event on the basis of which the target analysis time block is determined. The starting time 1903 shows the starting time of the event. The ending time 1904 shows the ending time of the event. The interval correction value 1905 shows an interval correction value as the period determined on the basis of at least one of the starting time and the ending time of the event. The post-correction starting time 1906 shows the starting time of the target analysis time block, specifically the time obtained as a result of reflecting the interval correction value on the starting time of the event. The post-correction ending time 1907 shows the ending time of the target analysis time block, specifically the time obtained as a result of reflecting the interval correction value on the ending time of the event.

FIG. 20 shows an example of the determination of the analysis time block.

The management server program 271 specifies the event the event type 608 of which has a predetermined value (e.g., "Unscheduled" or "Urgent") in the event table 352. In the following description of FIG. 20, one event is taken as an example.

The management server program 271 records, among the records corresponding to the specified event, the event type 608, the starting time 603, and the ending time 604 as the interval type 1902, the starting time 1903, and the ending time 1904 in the records of the analysis time block table 356.

The management server program 271 determines the interval correction value. Specifically, when, e.g., the ending time 1904 is not "Null", the management server program 271 determines that the period from the starting time 1903 to the ending time 1904 is the interval correction value. When the ending time 1904 is "Null", the management server program 271 determines that a predetermined value (e.g., "600") is the interval correction value. The management server program 271 records the determined interval correction value as the interval correction value 1905.

Then, the management server program 271 determines the analysis time block. Specifically, for example, the management server program 271 records the time previous to the starting time 1903 by the interval correction value 1905 as the post-correction starting time 1906. The management server program 271 also records the time after the lapse of the interval correction value 1905 from the ending time 1904 as the post-correction ending time 1907. In other words, in this example, the analysis time block is a time block including the event time block and the interval correction values respectively added on at the beginning and ending thereof.

Second Embodiment

A second embodiment will be described. At that time, differences from the above-described embodiment will be mainly focused on, and the description of the common points with the above-described embodiment will be omitted or simplified (Note that the same applies to the subsequent embodiments).

Figure 39:
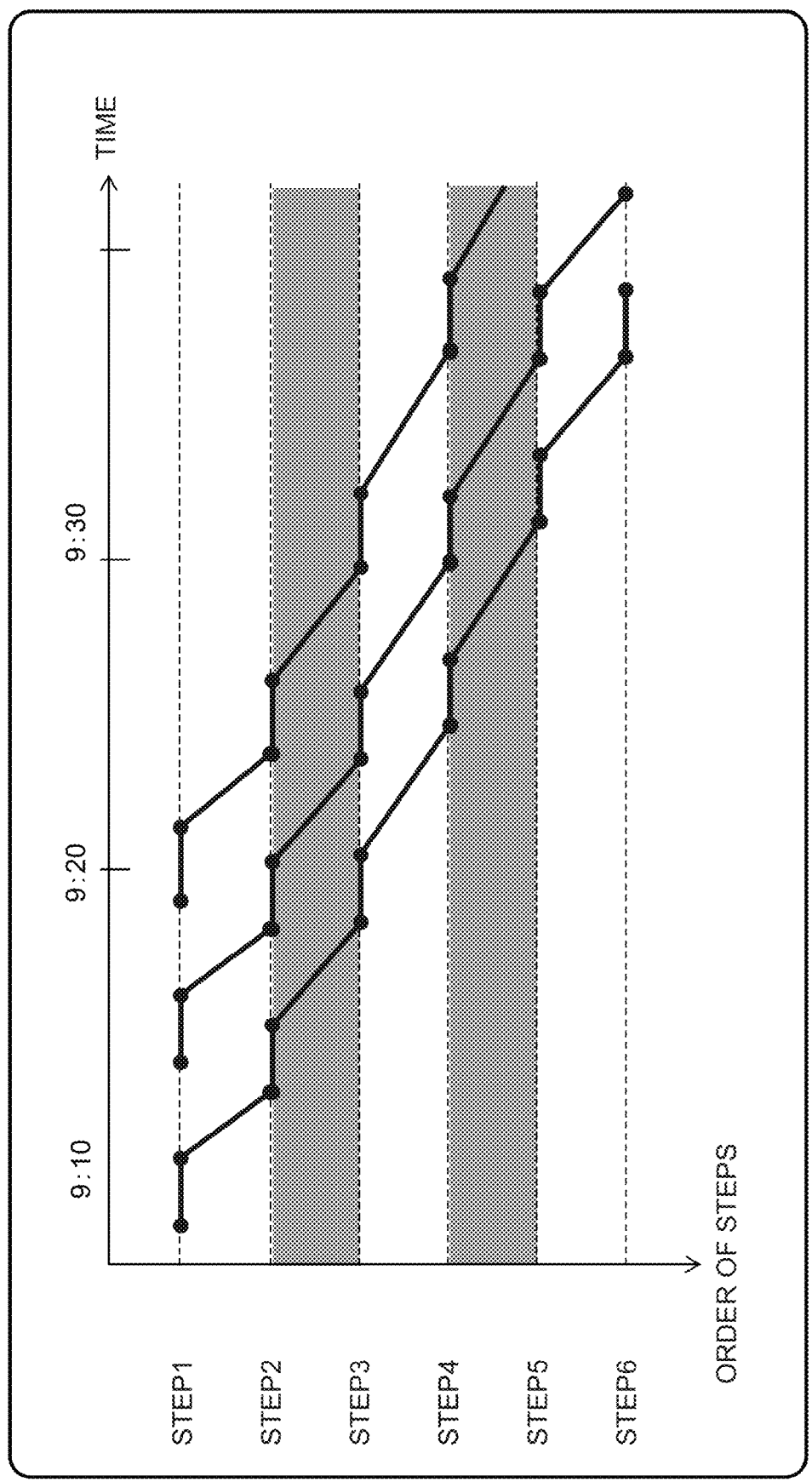
FIG. 39 shows another example of a diagram chart according to the second embodiment.

In the diagram chart 170, instead of displaying the starting time and the ending time for each step along the step axis, the execution time (one of the starting time and the ending time) may be displayed for each step as shown by way of example in FIG. 21, or both the starting time and the ending time may be displayed along the time axis for each step as shown by way of example in FIG. 39. Even in this case, any of the display modes (m1) to (m5) can be adopted. For example, even when the display mode (m1) is adopted, in the inter-step range, the rectangular portion 51 corresponding to the warning retention situation and the rectangular portions 52 corresponding to the abnormal retention situation may be subjected to the accentuated display (e.g., see an inter-step range 4-5). Also, in the inter-step range (e.g., in step 1), the warning retention situation and the abnormal retention situation may be subjected to the accentuated display. A reference sign 2101 in FIG. 21 denotes a display object showing the warning retention situation in the range in step 1. Also, when the display mode (m2) is adopted, the display objects 1101 and 1102 showing the relatively high frequency of the abnormal retention situation can be displayed in the inter-step range 2-3 in which the frequency of the abnormal retention situation is relatively high. Also, when the display mode (m3) is adopted, the affected interval display object 1201 can be displayed for the target time group. Also, when the display mode (m4) is adopted, the event display object 1301 can be displayed. Also, when the display mode (m5) is adopted, the display object 1401 belonging to the changing tendency can be subjected to the accentuated display.

Third Embodiment

Figure 22:
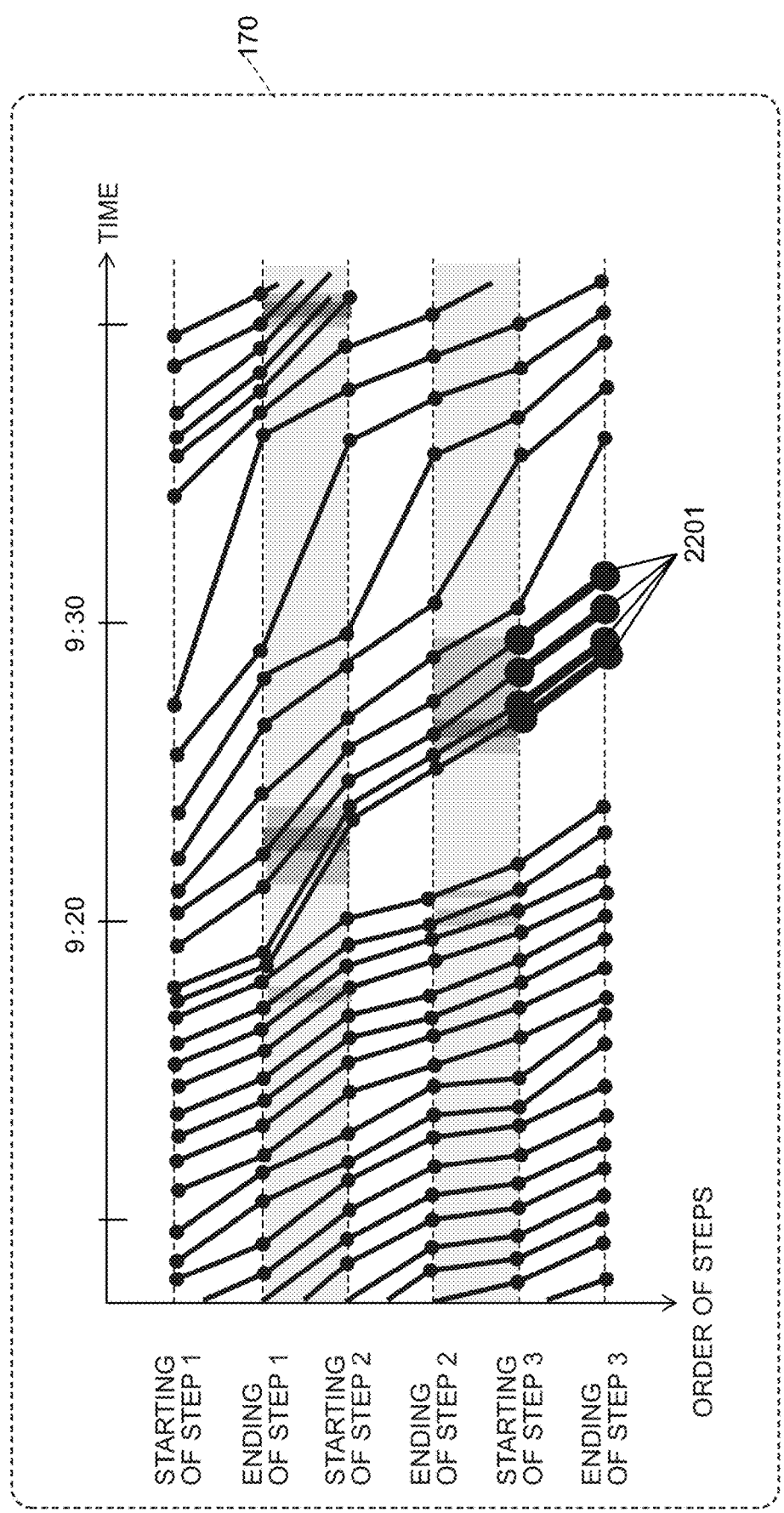
FIG. 22 shows an example of accentuated display of a line segment subsequent to an inter-step range (or an intra-stage range) in which a retention period equal to or larger than a threshold has occurred for a product corresponding to the retention period equal to or larger than the threshold, in a third embodiment.

Also, for example, the management server program 271 may determine, for each product, whether or not the retention periods in each inter-step range and each intra-step range are equal to or larger than a predetermined threshold (e.g., the threshold included in the related information 281, which is the threshold for the retention period set by the user). When there are a product and an inter-step range (or an intra-step range) which have the retention period equal to or larger than the threshold, the management server program 271 may perform, for the product, the accentuated display of a line segment 2201 subsequent to the inter-step range (or intra-step range), as shown by way of example in FIG. 22.

Fourth Embodiment

Figure 23:
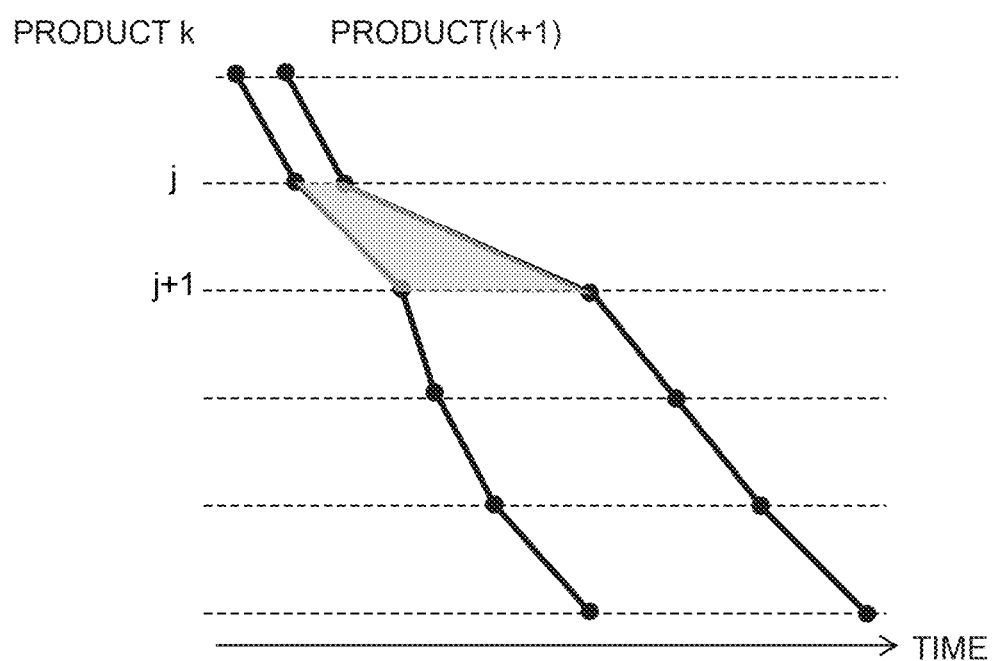
FIG. 23 is a schematic diagram showing the definition of a blank region according to a fourth embodiment.

Also, for example, instead of or in addition to limiting the range in which the occurrence or non-occurrence of the trouble retention situation (e.g., the excess situation or the over-reduction situation) is examined to the time block satisfying the requirement for the analysis time block described above, the management server program 271 may also limit the range to a time block and/or an inter-step range (or intra-step range) satisfying a predetermined requirement other than the requirement for the analysis time block. As the "predetermined requirement", the time block and/or the inter-step range (or intra-step range) to which the blank region determined to be the accentuated display target belongs can be adopted. The definition of the blank region is as shown in, e.g., FIG. 23. Specifically, the blank region is a region bounded by four points (coordinates) shown below which are:

the point corresponding to a product k and coordinates j;
the point corresponding to the product k and coordinates (j+1);
the point corresponding to a product (k+1) and the coordinates j; and
the point corresponding to the product (k+1) and the coordinates (j+1).

The product k and the product (k+1) are an example of two consecutive products. In the case where the starting time and the ending time of each step are displayed (e.g., in FIG. 1), when the coordinates j correspond to the starting time of a given step (starting time of a given intra-step range), the coordinates (j+1) correspond to the ending time of the given step (starting time of a given inter-step range). In the case where the execution time (starting time or ending time) of each step is displayed (e.g., in FIG. 21), when the coordinates j correspond to the execution time of a given step, the coordinates (j+1) correspond to the execution time of the step subsequent to the given step.

The display objects that may be determined to be accentuated display objects in the diagram chart are one or more blank regions interposed between a polygonal line corresponding to a product y (y-th product (y is a natural number)) and a polygonal line corresponding to a product (y+1). Each blank region is a region bounded by four points (coordinates) (p1) to (p4) shown below which are:

(p1) for the product y, the point corresponding to a step x (x-th step (x is a natural number)) and the execution time of the step x;

(p2) for the product y, the point corresponding to the execution time of a step (x+1) and a step (x+1);

(p3) for the product (y+1), the point corresponding to the step x and the execution time of the step x; and (p4) for the product (y+1), the point corresponding to the step (x+1) and the execution time of the step (x+1).

The management server program 271 may receive a specification of any blank region subjected to the accentuated display from the user. In response to the specification, the management server program 271 may acquire, using, as a key, information showing at least one vertex of at least the specified blank region in continuous blank regions that are interposed between two polygonal lines interposing the specified blank region, are determined to be accentuated display targets, and are one or more blank regions continuously arranged along the direction of the step axis (an example of the second axis), related data related to at least the specified blank region in the continuous blank regions from the related information 281, and display the acquired related data.

The display object subjected to the accentuated display may be a blank region having an area equal to or larger than a predetermined threshold.

The display object subjected to the accentuated display may be a blank region having an area such that a value obtained by applying a weight to the area is equal to or larger than a predetermined threshold. The weight for the blank region may be based on at least one of (r1) to (r4), shown below which are:

(r1) the degree of importance of the importance of an attentional perspective of blank region area;

(r2) the related data corresponding to the blank region;

(r3) the number of other attentional perspectives on the basis of which the blank region is determined to be the accentuated display target; and (r4) the degree of importance of the other attentional perspectives on the basis of which the blank region is determined to be the accentuated display target.

The display object subjected to the accentuated display may be a blank region in which a measurement value obtained during the interval between the execution times satisfy a predetermined requirement.

The display object subjected to the accentuated display may be one or a plurality of blank regions in which the relationship with at least one of the time and step of the occurrence of issue which is at least one of the occurrence of overtaking of a product, occurrence of a defective product, occurrence of rework, occurrence of excess lead time, and occurrence of unevenness satisfies a predetermined requirement. The overtaking product may be at least one of at least one of one or more products whose execution time of at least one step is earlier than that of another product although it is loaded in the initial step later than the other product and the other product. The defective product may be at least one of a product for which any step has no execution time and a product that has been found to be defective in an inspection after the last step. The reworked product may be a product for which rework having occurred causes two or more execution times in the same step. The product in which the lead time is exceeded may be a product for which the lead time, which is a period from the start to the end of the whole or at least one step, exceeds a certain period. The unevenness product may be a product for which the difference between the execution time of a first step, which is any step, and the execution time of a second step, which is another step different from the first step, is longer or shorter than the tact time between the first step and the second step by a certain value or more.

The accentuation level of the blank region belonging to the step to which the occurrence of issue belongs among one or a plurality of blank regions may be an accentuation level depending on the difference between the time of the occurrence of issue and the execution time to which the blank region belongs.

The management server program 271 may perform the accentuated display on a predetermined one of the four points of the blank region that serves as the detected display object and has the earliest or latest step and execution time, among blank regions that satisfy at least (w1) of (w1) and (w2), shown below which are:

(w1) the upper base of the blank region is smaller than a threshold, and the lower base of the blank region is larger than a threshold; and (w2) any specified requirement, e.g., at least one of overtaking of a product and a defective product occurring in a certain period before the execution time.

Fifth Embodiment

According to the fourth embodiment, among the continuous blank regions including a specified blank region, the related data corresponding to at least the specified blank region in the continuous blank regions is acquired by using at least one vertex of at least the specified blank region as a key to display information including at least a portion of the acquired related data. This makes it possible to know detailed information related to the blank regions.

In the present embodiment, a display object (event display object) corresponding to an event indicated by event data, which is an example of the related data, is displayed so that the display object overlaps the diagram chart.

Figure 38:
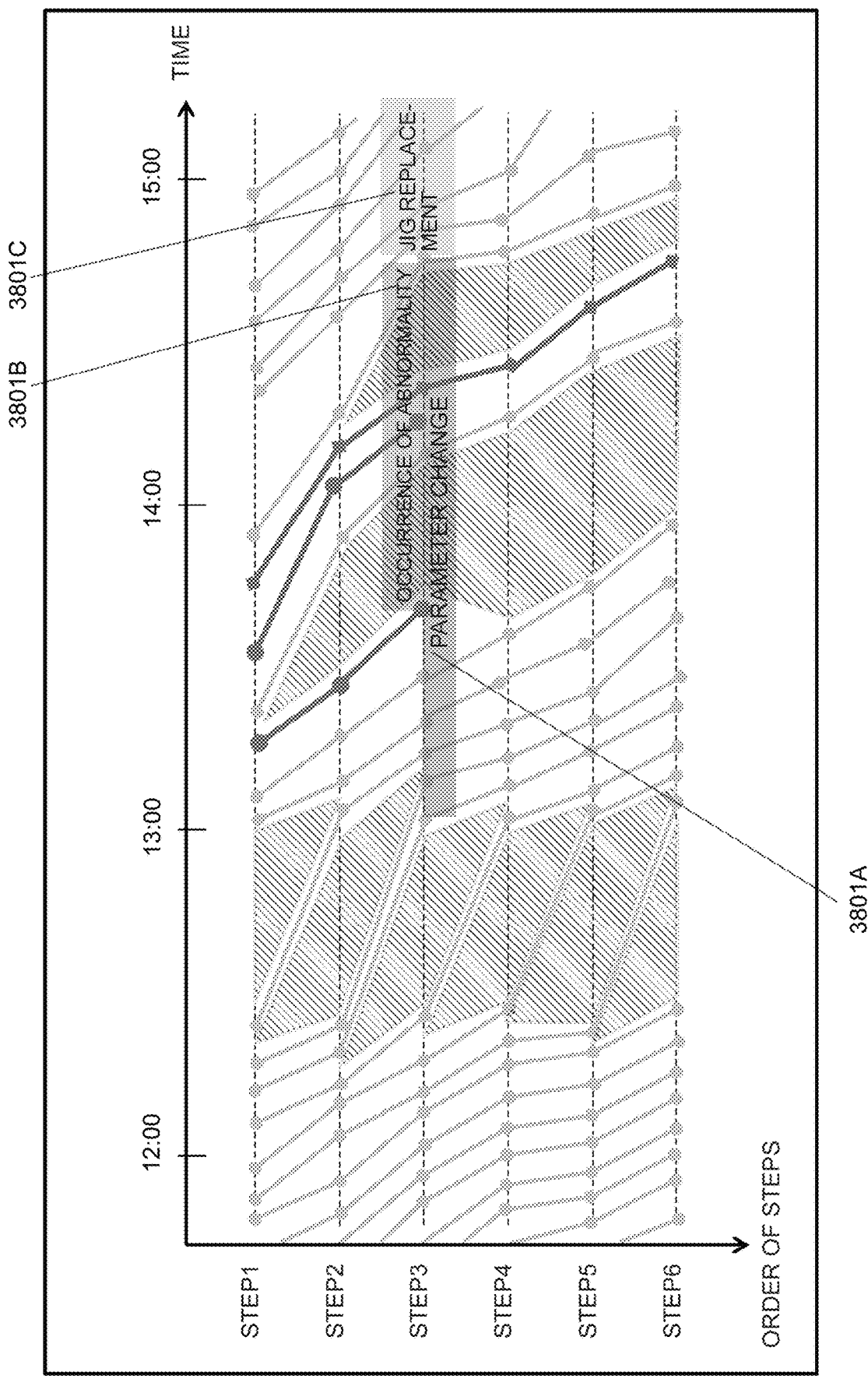
FIG. 38 shows an example of a diagram chart according to a fifth embodiment.

For each of one or a plurality of events of all the events indicated by at least a portion of event data whose event time block belongs to the display target period in event information including, for each event, event data including information showing an event time block including at least the occurrence time of the occurrence time and ending time and the occurrence step which is a step in which the event has occurred, the management server program 271 superimposes an event display object 3701, which a display object having a length corresponding to the event time block of the event and parallel with the first axis, on a position on the diagram chart corresponding to the step coincident with the occurrence step of the event and to the event time block of the event (see, e.g., FIG. 38).

The one or plurality of events may include one or more accentuated events. Each of the one or more accentuated events may be an event to which an accentuated object, which is a display object that satisfies one or more requirements associated with a predetermined attentional perspective among the one or more attentional perspectives, belongs. The event to which the accentuated object belongs may be an event in which an occurrence step coincides with any step belonging to the accentuated object and the event time block belongs to the execution time for any step belonging to the accentuated object.

At least one of the one or more accentuated events is an accentuated event corresponding to at least one of an event having a relatively large number of accentuated objects and an event having a relatively short event time block, of accentuated events which have the same occurrence step and in which event time blocks overlap.

According to the event data of any of the one or more accentuated events, when the ending time of the event time block of the accentuated event is undetermined, and a plurality of events include, in addition to the accentuated event, a subsequent event, which is an event which has the same occurrence step as the accentuated event and whose occurrence time is later than the occurrence time of the accentuated event and is also an event which is not an accentuated event, the management server program 271 may set the ending time of the event time block of the accentuated event to be the occurrence time of the subsequent event or an earlier time, and overlap the event display object of the accentuated event and the event display object of the subsequent event over the diagram chart.

This makes it possible to appropriately perform display control of event display objects of a plurality of events having overlapping event time blocks (e.g., see event display objects 3801A to 3801C). The event display object may be a display object which has a length corresponding to the event time block of the event corresponding to the event display object and is parallel with the time axis (an example of the first axis), for example, a belt-like display object. The "event time block" may be continuous time blocks. When a given event occurs again after it has been ended once, there may be, for the given event, event data of the event in which the event time block set to the time until the event is ended once and event data of the event in which the event time block set to the time when the event occurs again. "The event time block belongings to the display target period" may mean that at least a portion (e.g., occurrence time) of the event time block overlaps the display target period. "At least a portion of event data in which the event time block belongs to the display target period" may mean that the event to be displayed need not be all events indicated by all event data in which the event time block belongs to the display target period.

Sixth Embodiment

The display object subjected to the accentuated display may be at least one of (a) to (e), shown below which are:

(a) the polygonal line corresponding to an overtaking product, which is at least one of (a1) and (a2), shown below which are:

(a1) at least one of one or more products whose execution time of at least one step is earlier than that of a given product although it is loaded in the production line later than the given product, and (a2) the given product;

(b) the polygonal line corresponding to a defective product, which is at least one of products for which any step has no execution time and a product that has been found to be defective in an inspection after the last step;

(c) the polygonal line corresponding to a reworked product, which is a product for which rework having occurred causes two or more execution times in the same step;

(d) the polygonal line corresponding to a product in which the lead time is exceeded, which is a product for which the lead time, which is the time from the start to the end of the whole or at least one step, exceeds a certain time; and (e) the polygonal line corresponding to an unevenness product, which is a product for which the difference between the execution time of the first step, which is any step, and the execution time of the second step, which is another step different from the first step, is longer or shorter than the tact time between the first step and the second step by a certain value or more.

The management server program 271 can identify not only the occurrence of overtaking of a product and the occurrence of a defective product but also any occurrence of issue of the occurrence of rework, the occurrence of excess lead time, and the occurrence of unevenness from the record information 140. Also, for example, in terms of the occurrence of a defective product, a plurality of defect types and which defect content belongs to which defect type are defined in advance (e.g., the related information 281 including a table showing the relationship between the defect type and the defect content), and accordingly, the management server program 271 may set the accentuation level of the polygonal line corresponding to the defective product to the accentuation level according to the defect type to which the defective content of the defective product belongs.

Seventh Embodiment

In the first to sixth embodiments, the production system 200 is a line production system.

Figure 24:
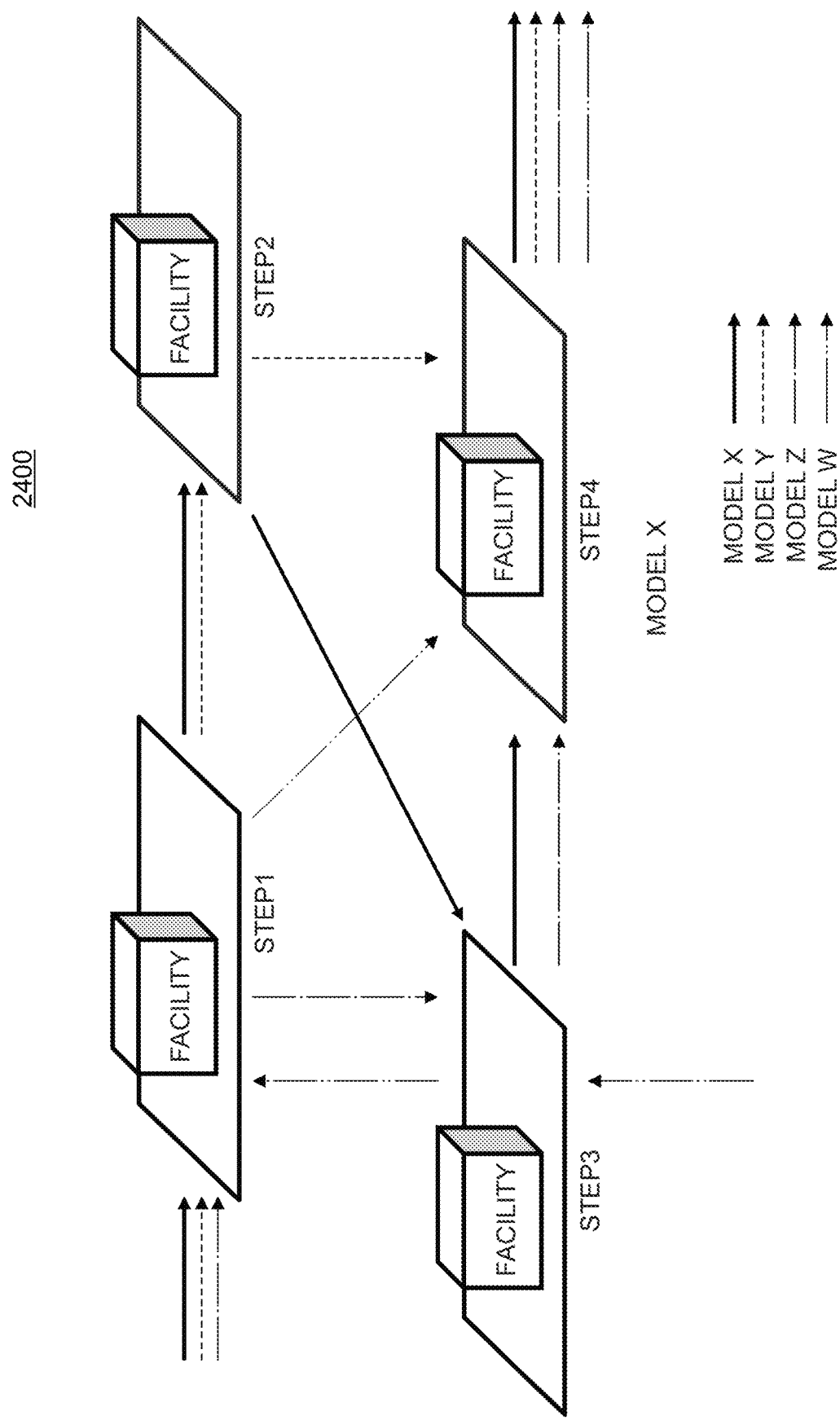
FIG. 24 shows a configuration of a production system according to a seventh embodiment.

In the seventh embodiment, a production system 2400 shown by way of example in FIG. 24 is adopted instead of the production system 200.

FIG. 24 shows a configuration of the production system 2400 according to the seventh embodiment. Note that, in FIG. 24, a product for which each step has not started is referred to as "member", a product for which the step has been started but not completed is referred to as "in-process", and a product for which the step has been completed is referred to as "finished product". In other words, for each step, the name of the product changes from member→in-process→finished product. In each step, the finished product in the previous step corresponds to the member before the start of the step. In the present invention, the "product" may be any product of the member, the in-process, and the finished product. Also, in the present embodiment, there is one facility in each step.

The production system 2400 is a production system, for example, a job shop production system, in which a plurality of different models of products are loaded and the sequential order of two or more of a plurality of steps is different depending on the model. In the production system 2400, there is a production line, for one model, in which two or more steps are arranged in the sequential order of steps corresponding to the model. Therefore, a plurality of different production lines respectively corresponding to the different models share one or some of the steps. For example, two or more production lines respectively corresponding to given two or more models share a given step, and other two or more production lines respectively corresponding to other two or more models share another step.

The production system 2400 differs from the line production system 200 in at least the following two points.

Figure 25:
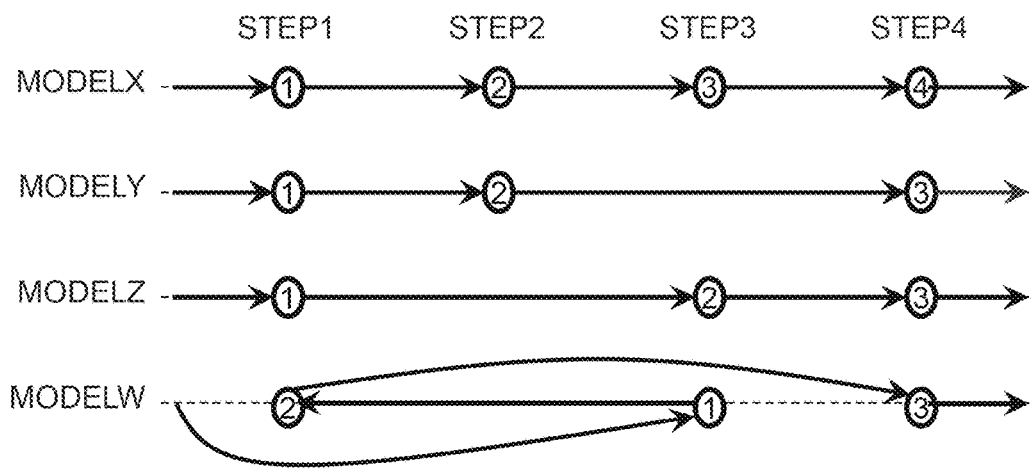
FIG. 25 schematically shows the sequential order of the steps for each model.

The first point of difference is that at least the sequential order of the steps is different depending on the model in the production system 2400. Two or more steps to be performed may differ depending on the model. For example, as shown by way of examples in FIGS. 24 and 25, for a product belonging to a model X, all of steps 1 to 4 are performed, and they are performed in the order of step 1, step 2, step 3, and step 4. For a product belonging to a model Y, the steps other than the step 2 of steps 1 to 4 are performed, and they are performed in the order of step 1, step 3, and step 4. For a product belonging to a model W, the same steps as those for the product belonging to the model Y are performed, but they differ in the execution order. Specifically, the steps other than step 2 of steps 1 to 4 are performed in the order of step 3, step 1, and step 4 (in this way, there are models for which initial step is a step other than step 1). Because of these characteristics, the standard LT (standard lead time) of products differs depending on the model. In the present embodiment, there are two types of standard LT: an overall standard LT and a partial standard LT. Their details will be described later.

Figure 26:
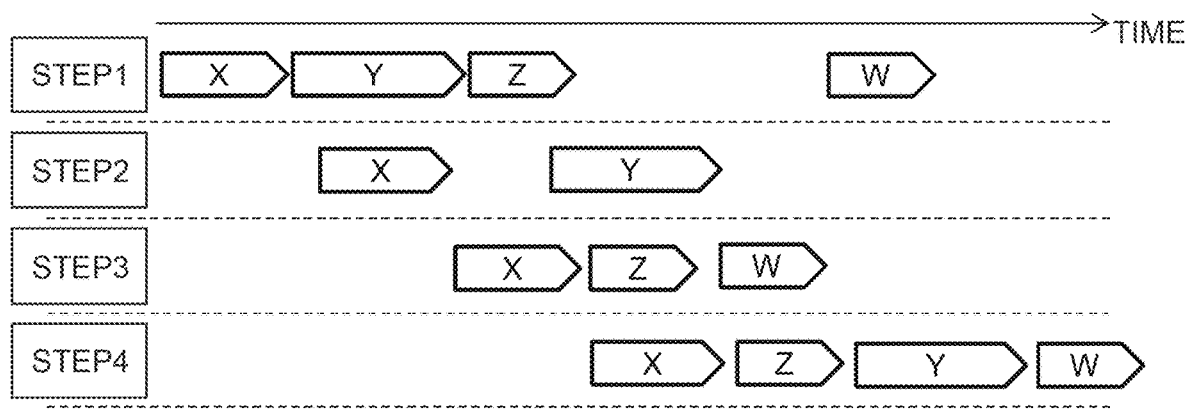
FIG. 26 schematically shows the steps for each model in time series.

The second point of difference is that two or more products belonging to two or more models can be produced in parallel. As shown by way of example in FIG. 26, in some cases, the initial step for a first model starts earlier than that for a second model, but the final step ends later and vice versa (i.e., first-in first-out (FIFO) does not necessarily hold). Note that, in the present embodiment, there is only one facility in each step, for ease of explanation, in the production system 2400. For this reason, in each step, there is one model present at the same time (time slice). However, there may be a plurality of facilities in at least one step. In this case, two or more products belonging to two or more models may present at the same time in the at least one step (e.g., a product belonging to the model Y and a product belonging to the model X at step 2 may be present at the same time). Note that, in each step, typically, a plurality of products (members) are continuously loaded in each facility in a unit (lot).

In production management of the production system 2400 having such characteristics, it is conceivable that the past record table 351 is prepared for each model. Also, it is conceivable that a model-product table (an example of information showing which product belongs to which product) showing the relationship between models and products is managed by the data managing portion 341 as a table included in the related information 281, for example.

Figure 27:
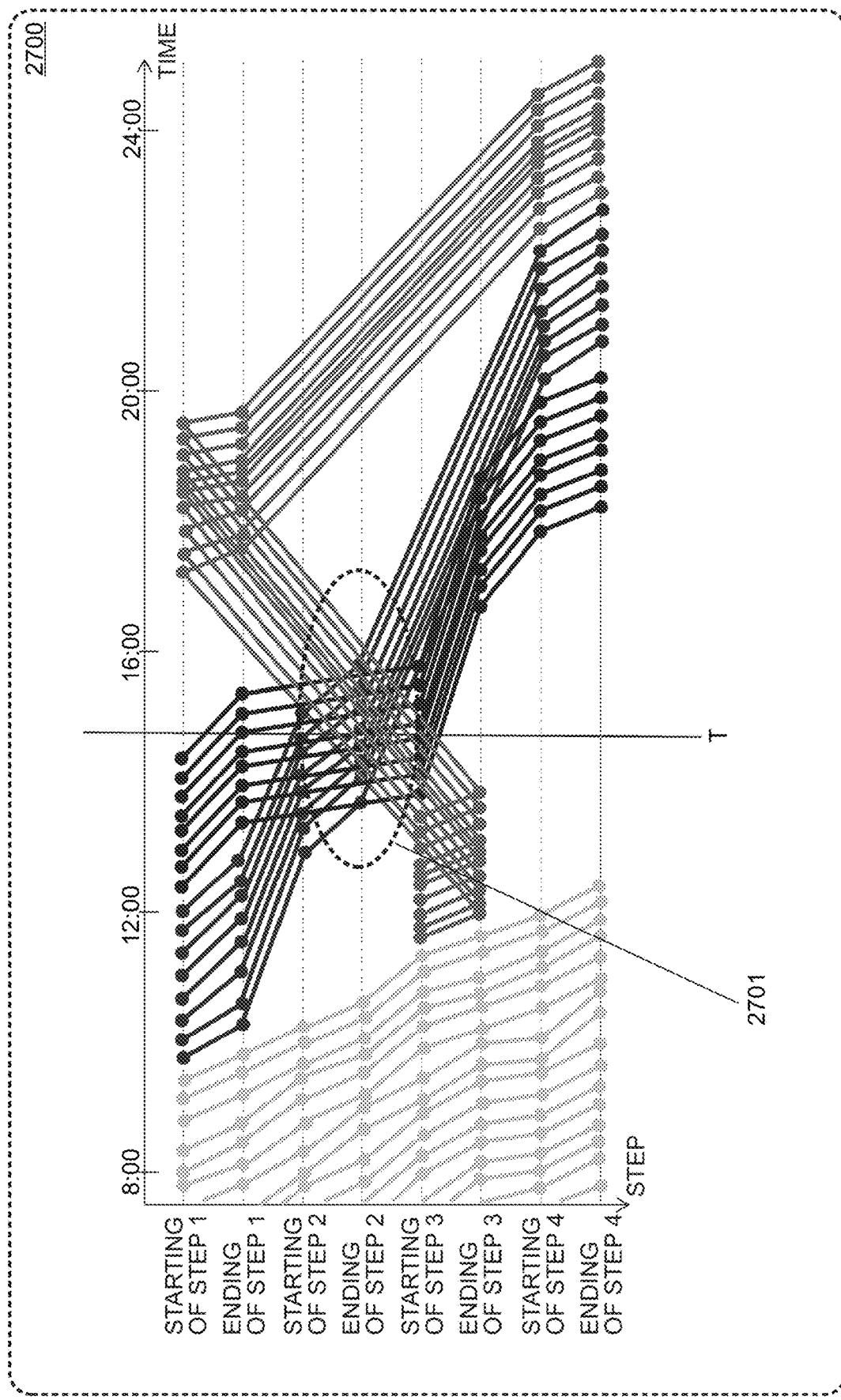
FIG. 27 shows an example of a diagram chart according to a comparative example to which production management of a line production system is simply applied.

When production management of the line production system 200 is simply applied to production management of the production system 2400, a diagram chart 2700 shown by way of example in FIG. 27 can be displayed. However, the chart 2700 has the following problems. As a result, even when a rectangular portion where the retention situation satisfies a predetermined requirement is subjected to the accentuated display or an event display object is superimposed in the diagram chart 2700, it is hard to identify the relationship between the retention situation or the event and the production situation for each model.

(Problem A) The propriety of the situation cannot be determined from the inclination of the polygonal line. For example, even when overtaking appears on the chart 2700, it cannot be determined whether or not the overtaking is appropriate (see, e.g., reference numeral 2701). This is because the standard LT differs depending on the model.

(Problem B) It is difficult to calculate the retention number for the intra-step range. Specifically, the fact that the retention number is the number of products present in the time slice for the intra-step range is not necessarily an accurate retention number. This is because the sequential order of the steps differs depending on the model, and as a result, the intra-step range may differ. For example, according to the chart 2700, it appears that a plurality of models of products are present in the time slice T for the inter-step range 2-3, but the models corresponding to the sequential order of the steps not including the inter-step range 2-3 (models with no plot at the start of step 3) are present.

(Problem C) It is hard to recognize the retention portion. This is because the sequential order of the steps is different depending on the model, and as a result, there are many overlapping and crossing of polygonal lines as compared with the diagram chart for the line production system 200.

(Problem D) It is hard to identify the retention tendency. This is because, depending on the model, a step not passed is displayed, or there is a polygonal line including a line segment that returns from down to up.

Therefore, in the present embodiment, the following process is performed.

The management server program 271 generates, on the basis of past record information (e.g., the past record table 351 for each model), a production management chart that includes information as a past record which shows, for each product loaded in the production system 2400 in which the plurality of different models of products are loaded and a sequential order of two or more of a plurality of steps is different depending on the model, an execution time of each of the steps and that shows the management situation. The production management chart has a first axis and a second axis perpendicular to the first axis. The first axis corresponds to time. The second axis corresponds to the steps. Specifically, the management server program 271 analyzes, from one or more attentional perspectives on a plurality of different models of products, the past record information to detect, among display objects displayed in the production management chart, a display object satisfying one or more requirements associated with the one or more attentional perspectives. The management server program 271 then performs the accentuated display on at least one of the detected display objects. This makes it possible to support production management of the production system 2400.

The production management chart is not limited to a diagram chart. For example, the production management chart may have at least one of (x) to (z), shown below which are:

(x) an event display object corresponding to the event time block belonging to the display target period;

(y) a portion that is a target portion that is a portion which corresponds to an inter-step range and/or an intra-step range to which a step in which a retention situation satisfying a predetermined requirement has occurred belongs and to a period having the satisfying retention situation, and that is subjected to the accentuated display; and (z) a polygonal line that corresponds to at least one of the plurality of models, for each product unit in which the execution time of at least one of the plurality of steps belongs to the display target period.

Specifically, for example, two or more types of display objects of (x) to (z) may be displayed at the same time, or (z) may be additionally displayed on a production management chart on which at least one of (x) and (y) is displayed, or at least one of (x) and (y) may be additionally displayed on a production management chart on which (z) is displayed. The "product unit" is, for example, a product or a lot. One polygonal line may correspond to one product or one lot.

The following will describe the present embodiment in detail where the production management chart is a diagram chart.

Figure 28:
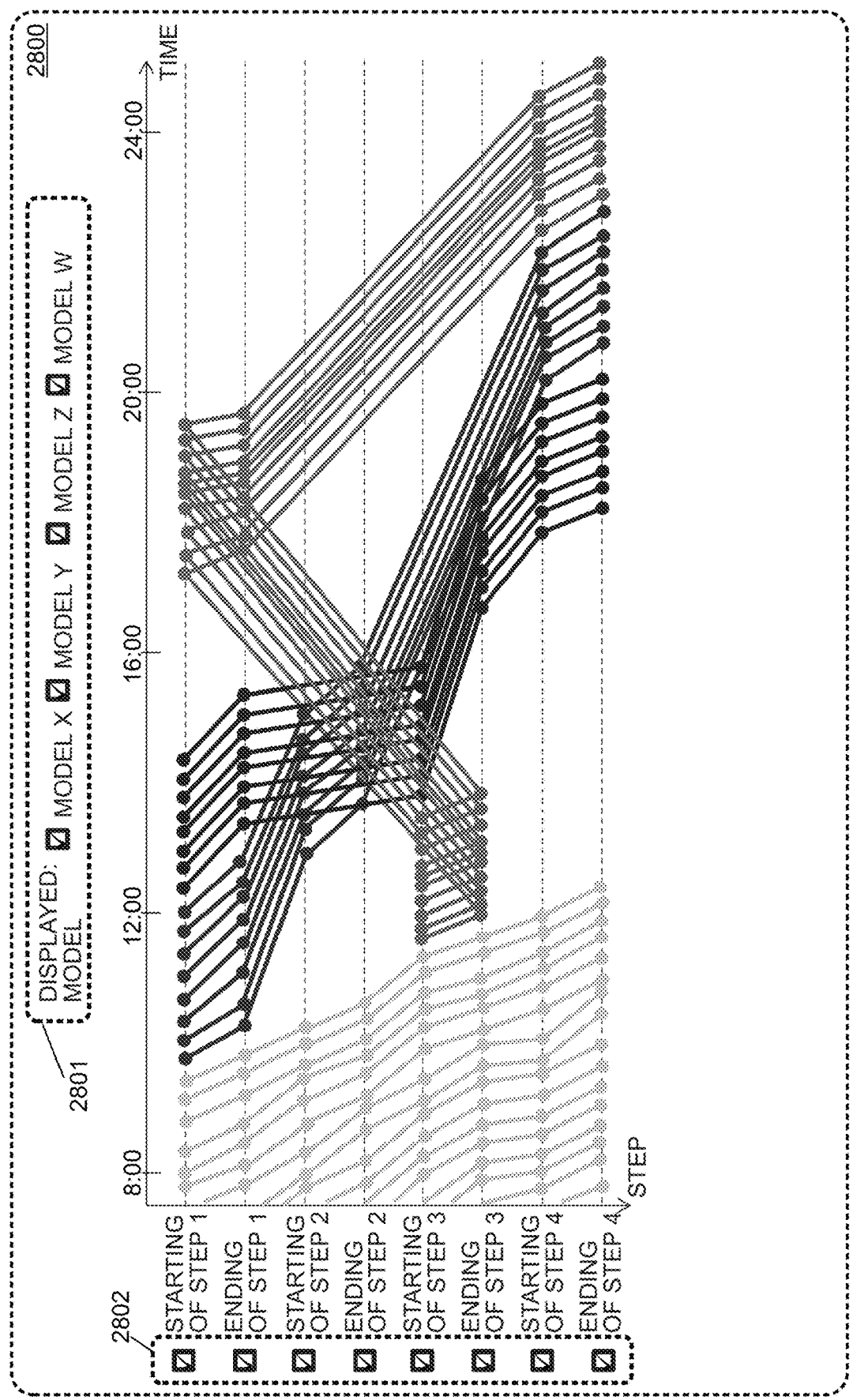
FIG. 28 shows an example of a diagram chart according to the seventh embodiment.

FIG. 28 shows an example of the diagram chart according to the seventh embodiment.

The management server program 271 generates and displays a diagram chart 2800. The diagram chart 2800 has at least one of a model selection UI 2801 and a step selection UI 2802.

Figure 29:
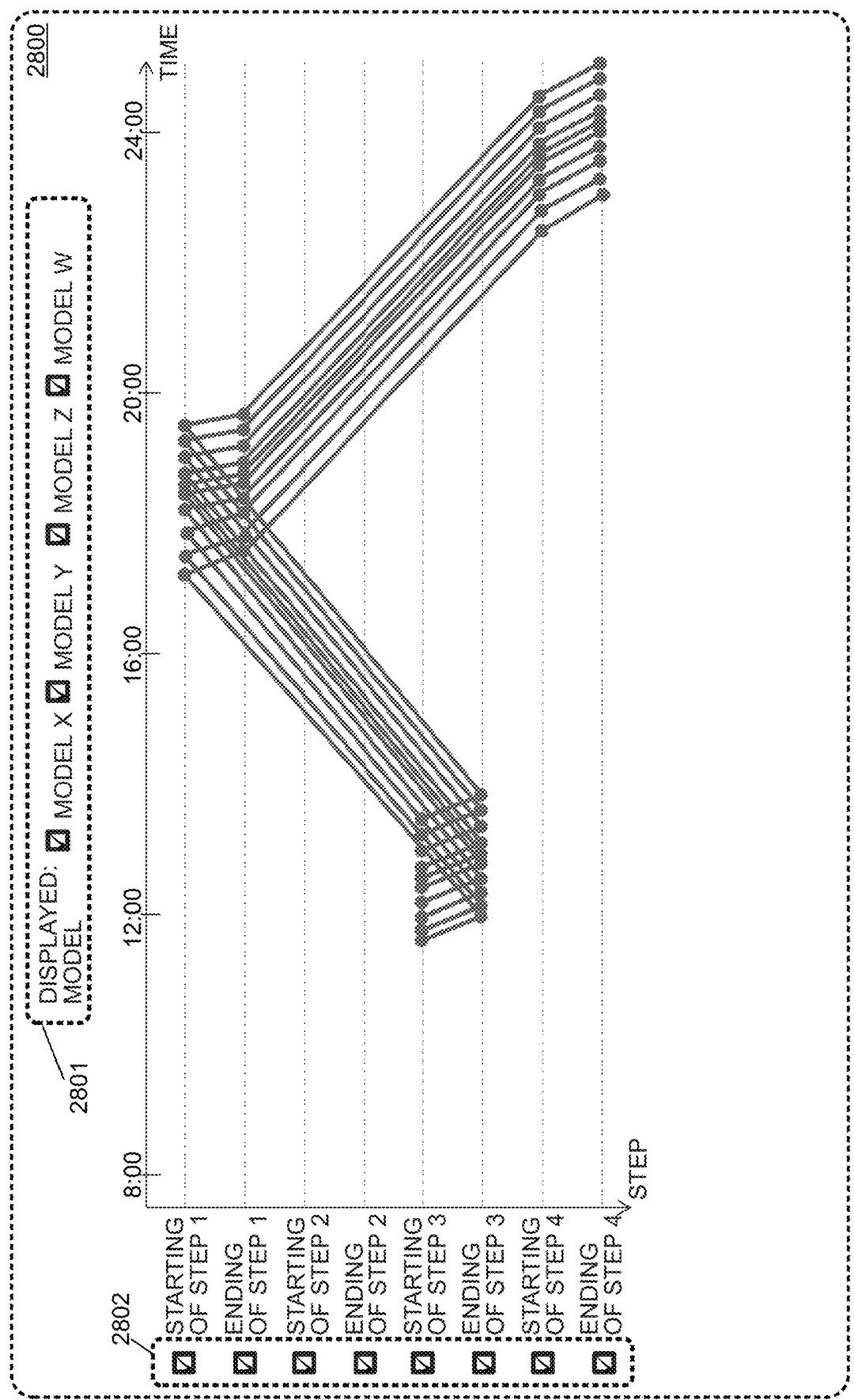
FIG. 29 shows an example of a diagram chart after selection of model.

The model selection UI 2801 is a UI for receiving a selection of at least one model. In the following, the model selected via the model selection UI 2801 is referred to as "selected model", and the model not selected via the model selection UI 2801 is referred to as "non-selected model". According to FIG. 28, since all the models X, Y, Z, and W are the selected models, the polygonal lines corresponding to all the models X, Y, Z, and W are displayed. For example, when the selection of only the model W is received via the model selection UI 2801, the management server program 271 displays the polygonal lines on the diagram chart 2800 such that the display of the polygonal lines corresponding to the selected model W are accentuated rather than the display of the polygonal lines corresponding to the non-selected models X, Y, and Z, as shown in FIG. 29. Such accentuation (i.e., relative accentuation) includes at least one of raising the accentuation level of the polygonal line corresponding to the selected model (e.g., thickening or darkening) and lowering the accentuation level of the polygonal line corresponding to the non-selected model (e.g., a broken line or lighting). According to FIG. 29, the polygonal lines corresponding to the selected model W remains (their accentuation level is maintained), and the polygonal lines corresponding to the non-selected models X, Y, and Z disappear (their accentuation level is lowered). Accordingly, the above Problem C is solved.

Note that, although not shown, the management server program 271 may perform at least one of the following processes when the selection of the model is received via the model selection UI 2801.

The management server program 271 accentuates the display of the intra-step range and/or the inter-step range included in the sequential order of the steps corresponding to the selected model rather than the display of the intra-step range and/or the inter-step range not included in the sequential order of the steps corresponding to the selected model.

The management server program 271 rearranges the arrangement order of the steps along the step axis to the sequential order of the steps corresponding to the selected model. For example, when the model W is selected, the arrangement order of the steps along the step axis is the order of starting of step 3, ending of step 3, starting of step 1, ending of step 1, starting of step 4, and ending of step 4.

Figure 30:
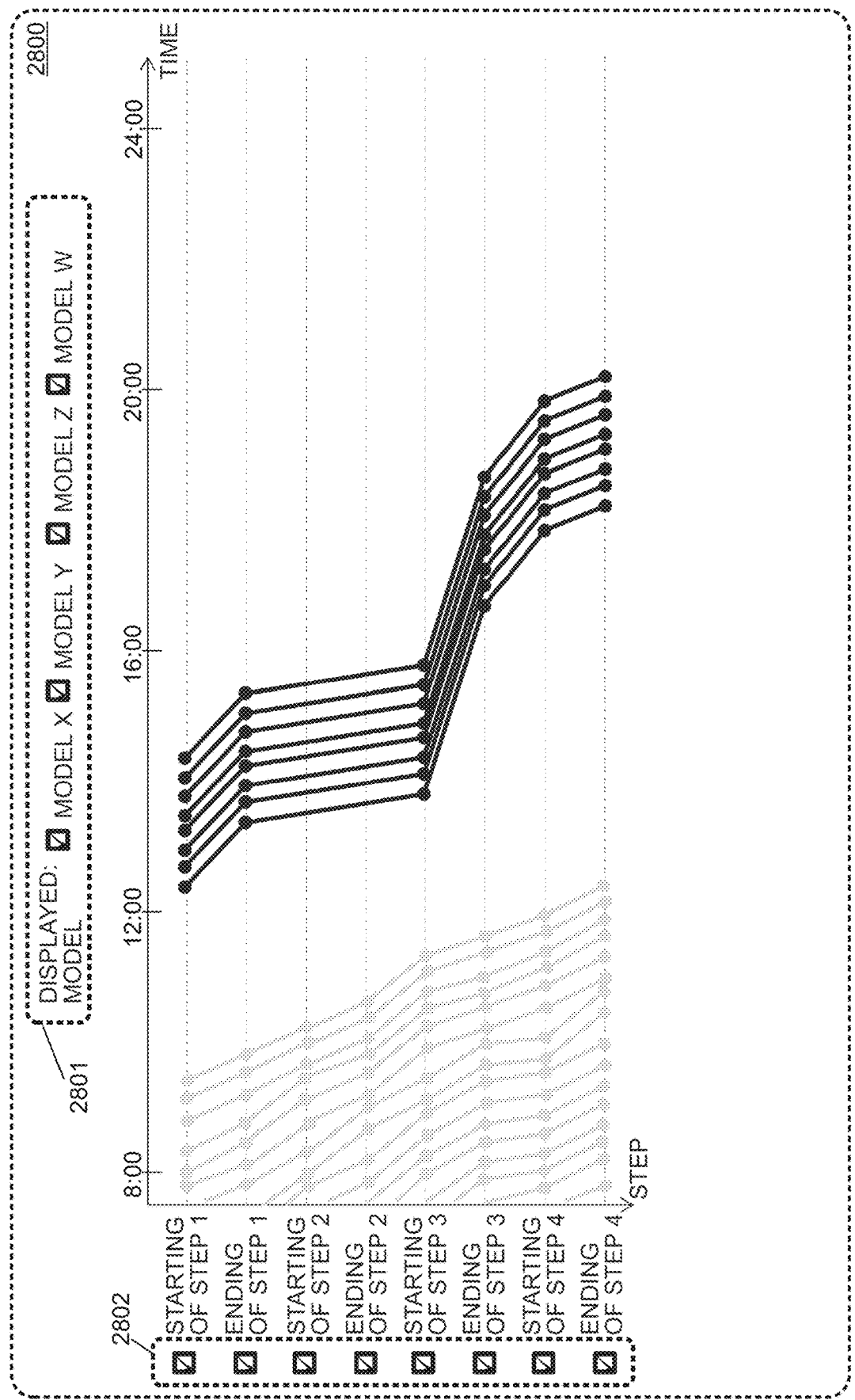
FIG. 30 shows an example of a diagram chart after selection of step.

The step selection UI 2802 is a UI for receiving a selection of at least one step. The step to be selected is a step as a retention portion (in other words, a step in which a member is loaded). In the following, a model corresponding to the sequential order of the steps including the step selected via the step selection UI 2802 as a step other than the starting of the initial step is referred to as "applicable model", and a model corresponding to the sequential order of the steps not including the step selected via the step selection UI 2802 (and the sequential order of the steps including the selected step as the step of the starting of the initial step) is referred to as "non-applicable model". According to FIG. 28, since all steps 1 to 4 are selected, a polygonal line is displayed for the model corresponding to the sequential order of the steps including any one of steps 1 to 4 as a step in which the member is loaded (as a result, all models are applicable models). For example, when the selection of only the starting of step 3 is received via the step selection UI 2802, the management server program 271 displays the polygonal lines on the diagram chart 2800 such that the display of the polygonal lines of the applicable models X and Z are accentuated rather than the display of the polygonal lines of the non-applicable models Y and W, as shown in FIG. 30. According to FIG. 30, the polygonal lines corresponding to the applicable models X and Z remains (their accentuation level is maintained), and the polygonal lines corresponding to the non-applicable models Y and W disappear (their accentuation level is lowered). Accordingly, the above Problem D is solved.

In the present embodiment, the above Problem A and Problem B are also solved. The following will describe solutions of Problem A and Problem B in detail. At that time, for ease of explanation and for improvement of the visibility of the diagram chart, a polygonal line corresponding to the model X is typically shown. Specifically, for example, it is assumed that only the model X is selected via the model selection UI 2801 and all the steps are performed via the step selection UI 2802. Note that the description of the polygonal line corresponding to the model X can also be applied to the polygonal line corresponding to another model. Also, production management of line production (specifically, at least one of the first to sixth embodiments) can be applied to production management for one model.

Figure 31:
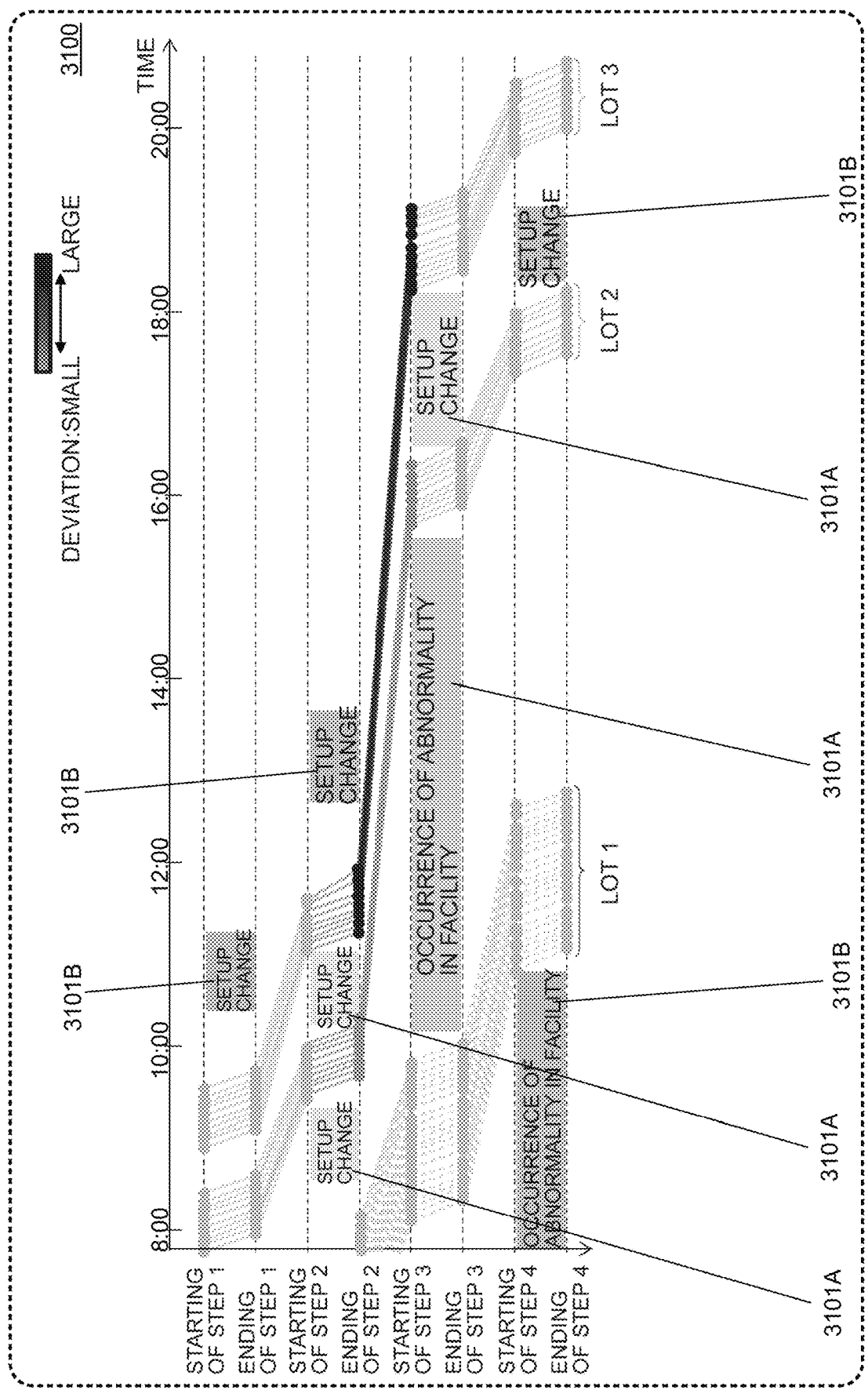
FIG. 31 shows an example of a diagram chart according to the seventh embodiment for model X.

FIG. 31 shows an example of a diagram chart according to the seventh embodiment for the model X. Note that the model selection UI 2801 and the step selection UI 2802 are not shown for improvement of visibility.

According to FIG. 31, the management server program 271 displays a diagram chart 3100 having polygonal lines corresponding to the model X on the basis of the past record table 351 corresponding to the model X. Specifically, the management server program 271 specifies the standard LT corresponding to the model X from the standard LT table described later, and also specifies the actual LT of each lot (an example of the product unit) belonging to the model X from the past record table 351 corresponding to the model X. The management server program 271 calculates the deviation between the standard LT and the actual LT. The management server program 271 performs the accentuated display on the polygonal line or the line segment corresponding to a lot (lots 2 and 3 in the example of FIG. 31) for which the calculated deviation satisfies any of one or more deviation requirements. Specifically, the management server program 271 performs at least one of lowering the accentuation level of the display of the polygonal line or the line segment corresponding to a lot for which the calculated deviation does not satisfy any of one or more deviation requirements and raising the accentuation level of the display of the polygonal line or the line segment corresponding to a lot for which the calculated deviation satisfies any of one or more deviation requirements. Accordingly, the above Problem A is solved. Specifically, the polygonal line or the line segment corresponding to a lot having a problem with the relationship between the standard LT and the actual LT is subjected to the accentuated display. Therefore, it is easy to identify the model or the lot having such a problem even when the polygonal lines corresponding to a plurality of models are mixed. Note that the deviation between the standard LT and the actual LT may be a difference between the standard LT and the actual LT, or may be a ratio of the actual LT to the standard LT. Also, the actual LT for a lot may be an LT (e.g., an average value, a maximum value, or a minimum value) based on one or more actual LTs corresponding to one or more products (e.g., all products) belonging to the lot.

Specification of the standard LT, specification of the actual LT, calculation of the deviation, and accentuated display are performed, for each lot, both for from the starting of the initial step to the ending of the final step and for an inter-step range and/or intra-step range of interest. In the following, the standard LT from the starting of the initial step to the ending of the final step is referred to as "overall standard LT", and the actual period from the starting of the initial step to the ending of the final step is referred to as "overall actual LT". Also, the standard LT for the inter-step range and/or the intra-step range is referred to as "partial standard LT", and the actual LT for the inter-step range and/or the intra-step is referred to as "partial actual LT". For each model, the total of the plurality of partial standard LTs is the overall standard LT, and the total of the plurality of partial actual LTs is the overall actual LT.

For each model, the overall standard LT is a standard period from the starting of the initial step to the ending of the final step in the sequential order of the steps corresponding to the model. The overall actual LT is a period from the actual starting time of the initial step to the actual ending time of the final step in the sequential order of the steps corresponding to the model. According to FIG. 31, the display of the polygonal line corresponding to the model and lot for which the overall deviation, which is the deviation between the overall standard LT and the overall actual LT, satisfies at least one of the deviation requirements is accentuated rather than the display of the polygonal line corresponding to the model and lot for which the overall deviation does not satisfy any of the deviation requirements. This makes it easy for the user to identify the model and lot having a problem with the overall actual LT. Also, even when there is no problem with a partial actual LT of such as a given inter-step range or a given intra-step range, the user can identify the model and lot having a problem with the actual LT as a whole.

For each model, the partial standard LT is a standard period of an intra-step range and/or inter-step range of interest in the sequential order of the steps corresponding to the model. The partial actual LT is an actual period of the intra-step range and/or inter-step range of interest in the sequential order of the steps corresponding to the model. According to FIG. 31, the display of the line segment corresponding to the model and lot for which the actual deviation, which is the deviation between the partial standard LT and the partial actual LT, satisfies at least one of the deviation requirements is accentuated rather than the display of the line segment corresponding to the model and lot for which the actual deviation does not satisfy any of the deviation requirements. This makes it easy for the user to identify the model and lot having a problem with the partial actual LT corresponding to the intra-step range and/or inter-step range of interest.

According to FIG. 31, it can be seen that lot 2 and lot 3 have a problem with the overall actual LT, and in particular, there is a major problem with the partial actual LT corresponding to the inter-step range 2-3.

For both the overall deviation and the partial deviation, the one or more deviation requirements may be a plurality of deviation ranges. Depending on which of the plurality of deviation ranges the calculated deviation belongs to, the accentuation level of the polygonal line or line segment that satisfies the one or more requirements differs. This makes it possible for the user to recognize the degree of deviation between the standard LT and the actual LT for each model or lot for the whole steps or the intra-step range and/or inter-step range of interest. According to FIG. 31, for the inter-step range 2-3, the line segment corresponding to lot 3 is the darkest and the line segment corresponding to lot 2 is the next darkest. This makes it possible to recognize, for the inter-step range 2-3, that the degree of partial deviation occurring for lot 3 is the largest and the degree of partial deviation occurring for lot 2 is the next highest.

Also, the management server program 271 specifies an event corresponding to the event time block belonging to the display target period on the basis of the event table 352, and superimposes an event display object 3101 corresponding to the specified event on the diagram chart 3100. In specification of the event, the management server program 271 determines whether each event corresponding to the event time block belonging to the display target period is a valid event or an invalid event. The accentuation level of display of an event display object 3101A corresponding to the valid event is higher than the accentuation level of display of an event display object 3101B corresponding to the invalid event. For example, in the event display object 3101A, the text color of the event name is different system color from the background color, and in the event display object 3101B, the text color of the event name is the same system color as the background color (e.g., all gray). At least one of the first to sixth embodiments may be applied to the position, width, and height of each event display object 3101. Note that the "valid event" is an event that is relatively likely to be a cause of a relatively large deviation between the standard LT and the actual LT (in other words, a cause of a relatively long retention period). The "invalid event" is an event that is not the valid event.

For example, when there is a lot for which the partial deviation satisfies at least one deviation requirement, in other words, a lot for which at least one line segment is subjected to the accentuated display, the valid event is, for example, an event satisfying all the following requirements. According to FIG. 31, the inter-step range or intra-step range of interest is the inter-step range 2-3. Accordingly, the event display object 3101A is subjected to the accentuated display.

an event corresponding to a step belonging to the starting of the inter-step range of interest or a step belonging to the intra-step range of interest;

an event whose any time belonging to the event time block (e.g., the starting time or ending time of the event time block) is earlier than at least one starting time (e.g., the first starting time) or at least one ending time (e.g., the last ending time) of the inter-step range or intra-step range of interest for the corresponding lot; and an event whose any time belonging to the event time block (e.g., the starting time or ending time of the event time block) is later than at least one starting time (e.g., the first starting time) or at least one ending time (e.g., the last ending time) of the inter-step range or intra-step range of interest for a lot for which any line segment is not subjected to the accentuated display.

Also, for example, when there is a lot for which the overall deviation satisfies at least one deviation requirement, the valid event is, for example, an event satisfying all of the requirements shown below which are:

an event whose any time belonging to the event time block (e.g., the starting time or ending time of the event time block) is earlier than at least one starting time (e.g., the first starting time) or at least one ending time (e.g., the last ending time) of at least one step (e.g., initial step) for the corresponding lot; and an event whose any time belonging to the event time block (e.g., the starting time or ending time of the event time block) is later than at least one starting time (e.g., the first starting time) or at least one ending time (e.g., the last ending time) of at least one step (e.g., final step) for a lot for which any line segment is not subjected to the accentuated display.

As shown by way of example in FIG. 31, an accentuation level (e.g., darkness) corresponding to the degree of deviation between the standard LT and the actual LT is adopted, and the event display object 3101A corresponding to the valid event is subjected to the accentuated display. This makes it possible to consider the reason why the degree of deviation is different between lots 2 and 3 in the inter-step range 2-3 of interest. Specifically, for example, according to FIG. 31, the user can guess the facts shown below which are:

The starting of step 3 was delayed for both lots 2 and 3 due to occurrence of abnormality in a facility in step 3.

After the abnormality in the facility in step 3 is recovered, the starting of step 3 for lot 2 becomes possible, then it takes more time than usual to change the setup for starting step 3 for lot 3, and accordingly, the starting of step 3 was further delayed for lot 3.

Figure 32:
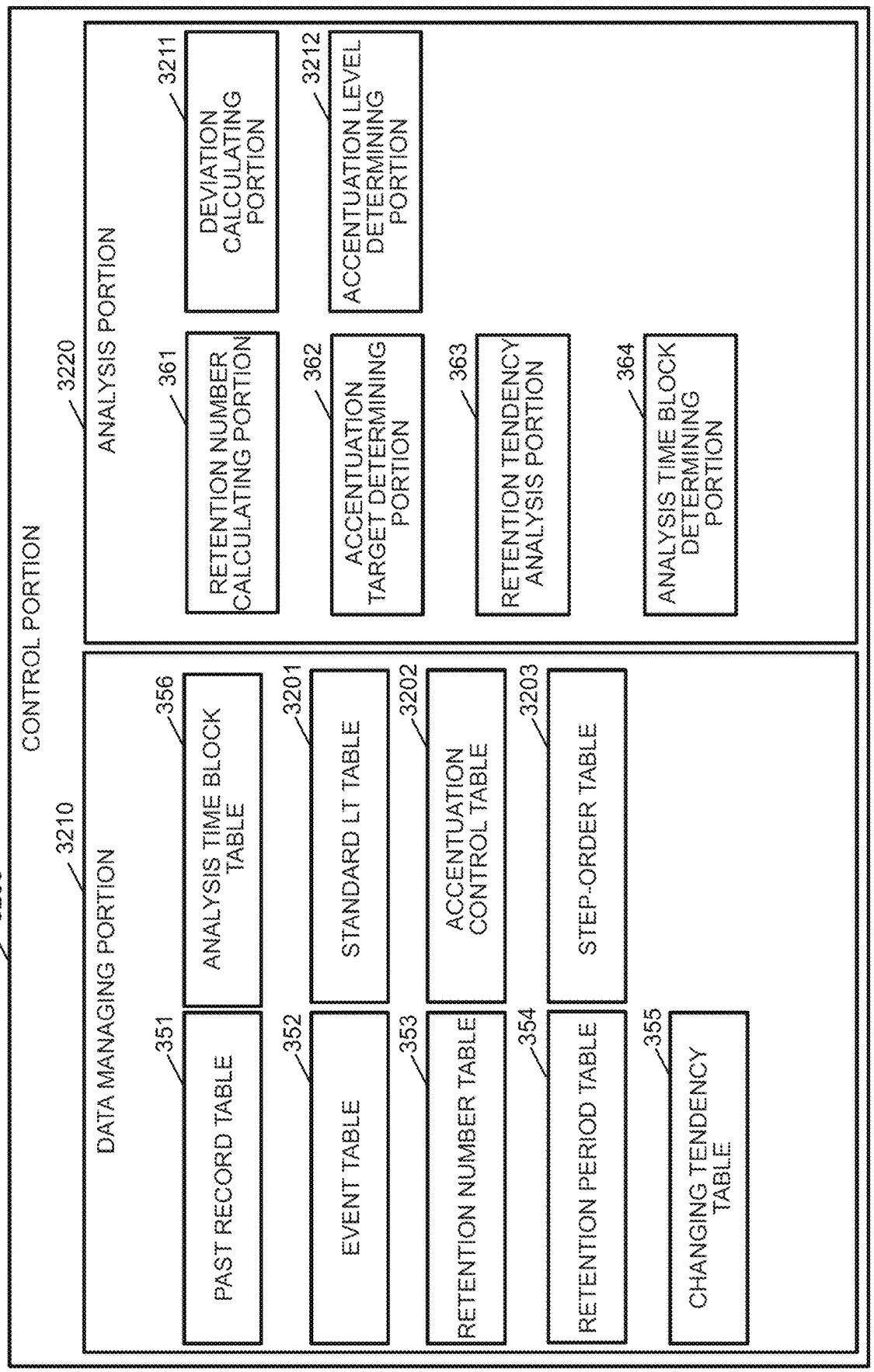
FIG. 32 shows a configuration of a control portion according to the seventh embodiment.

FIG. 32 shows a configuration of a control portion according to the seventh embodiment.

A data managing portion 3210 of a control portion 3200 manages a standard LT table 3201, an accentuation control table 3202, and an order-of-step table 3203, in addition to the tables 351 to 356 described above. An analysis portion 3220 of the control portion 3200 includes a deviation calculating portion 3211 that calculates the deviation between the standard LT and the actual LT, and an accentuation level determining portion 3212 that determines an accentuation level of the polygonal line or the line segment (e.g., line type and darkness), in addition to the functions 361 to 364 described above.

FIG. 33 shows the standard LT table 3201.

The standard LT table 3201 shows an overall standard LT and a plurality of partial standard LTs as its breakdown for each model. As described above, each partial standard LT is a standard LT of the inter-step range or the intra-step range. The inter-step range and the intra-step are each defined using From and To. For example, From "starting of step 1" and To "ending of step 1" means the range in step 1, and From "ending of step 1" and To "starting of step 3" means the inter-step range between steps 1 and 3.

FIG. 34 shows the accentuation control table 3202.

The accentuation control table 3202 is prepared for each model. Also, for each model, the accentuation control table 3202 is prepared for the overall standard LT and each partial standard LT (for each inter-step range and each intra-step range). The structure of each accentuation control table 3202 may be the same. The accentuation control table 3202 in FIG. 34 is a table for the overall standard LT of the model X, for example. The accentuation control table 3202 shows, for each of a plurality of deviation ranges (an example of the one or more deviation requirements), the deviation range (e.g., a pair of deviation upper limit and deviation lower limit) and the accentuation level adopted when the deviation range is satisfied.

FIG. 35 shows the order-of-step table 3203.

The order-of-step table 3203 shows the sequential order of the steps for each model.

Figure 36:
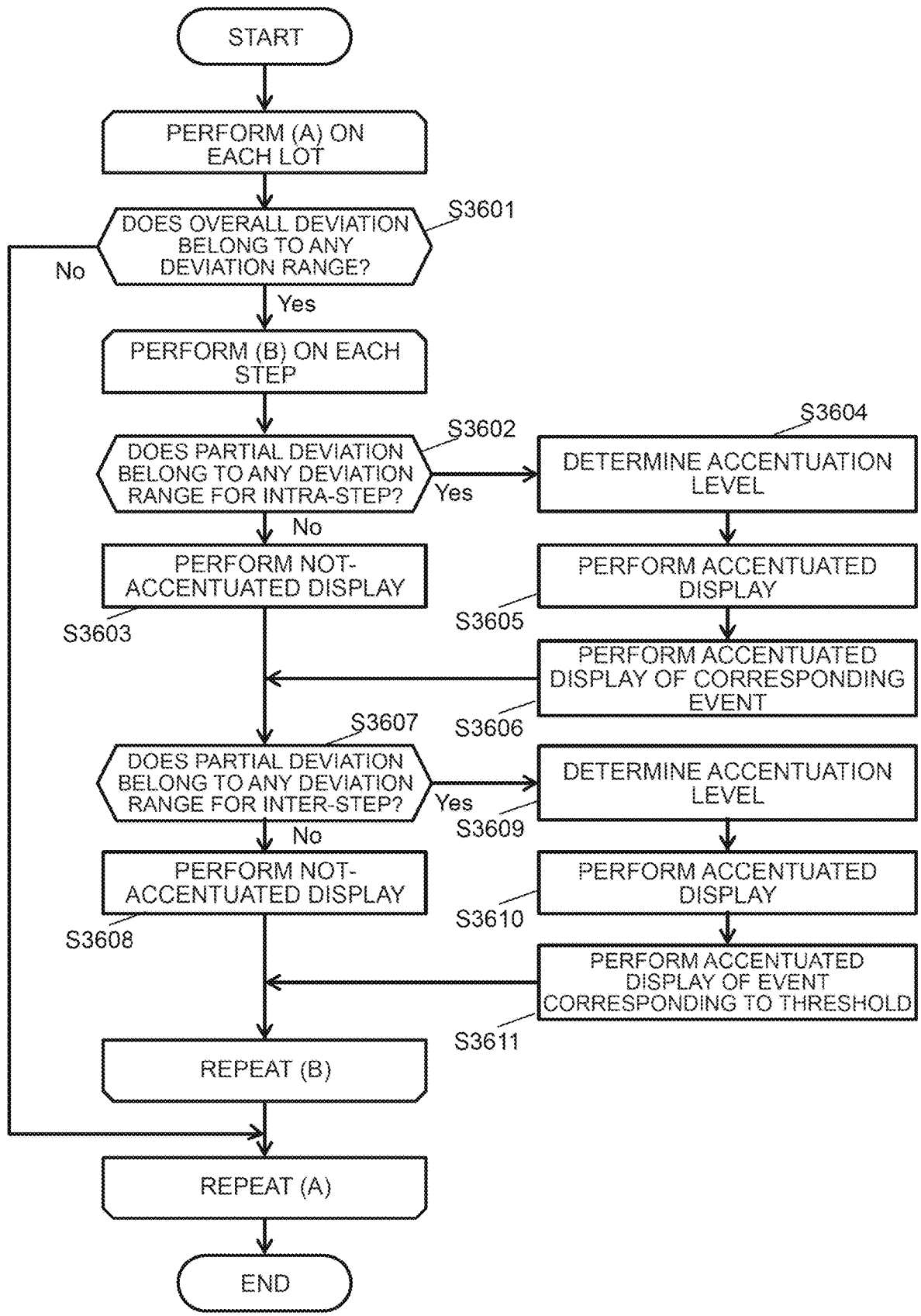
FIG. 36 shows a flow of display of the diagram chart according to the seventh embodiment.

FIG. 36 shows a flow of display of the diagram chart according to the seventh embodiment. The flow shown in FIG. 36 may be performed in S701 of FIG. 7, for example.

On each lot, processes of S3601 to S3611 are performed (loop (A)). In the following, one lot is taken as an example ("target lot" in the description of FIG. 36). Note that the processes may be performed on every product in place of each lot.

The management server program 271 (deviation calculating portion 3211) calculates an overall deviation for the target lot, and determines whether the calculated overall deviation belongs to any deviation range (S3601). Specifically, the management server program 271 specifies a model to which the target lot belongs from, for example, the model-product table (not shown) described above, and specifies the overall standard LT corresponding to the specified model from the standard LT table 3201. Also, the management server program 271 specifies the overall actual LT of the target lot from the past record table 351 corresponding to the specified model. The management server program 271 calculates an overall deviation which is the deviation between the specified overall standard LT and the specified overall actual LT. The management server program 271 determines whether or not the calculated overall deviation belongs to any of the plurality of deviation ranges shown in the accentuation control table 3202 (accentuation control table 3202 corresponding to the model to which the target lot belongs) for the overall deviation.

When the result of the determination result in S3601 is false (No in S3601), the processing ends. Alternatively, at least one of the following processes may be performed:

lower the level of polygonal line accentuation corresponding to the target lot (e.g., set the line type of the polygonal line to a broken line); and perform loop (B) described later.

When the result of the determination in S3601 is true (Yes in S3601), processes of S3602 to S3611 are performed on each step (loop (B)). In the following, one step is taken as an example ("target step", "target intra-step range", or "target inter-step range" in the description of FIG. 36). Note that, in addition to that, the following process may be performed:

maintain or raise the accentuation level of the polygonal line corresponding to the target lot (e.g., differentiate the color of the polygonal line corresponding to the target lot from the color of the polygonal line corresponding to the product for which the overall deviation does not belong to any deviation range).

The management server program 271 (deviation calculating portion 3211) calculates a partial deviation corresponding to the target intra-step range for the target lot, and determines whether the calculated partial deviation belongs to any deviation range (S3602). Specifically, the management server program 271 specifies a model to which the target lot belongs from, for example, the model-product table (not shown) described above, and specifies the partial standard LT corresponding to the target intra-step range and the specified model from the standard LT table 3201. Also, the management server program 271 specifies the partial actual LT of the target lot for the target intra-step range from the past record table 351 corresponding to the specified model. The management server program 271 calculates a partial deviation which is the deviation between the specified partial standard LT and the specified partial actual LT. The management server program 271 determines whether or not the calculated partial deviation belongs to any of the plurality of deviation ranges shown in the accentuation control table 3202 (accentuation control table 3202 corresponding to the model to which the target lot belongs) for the partial deviation.

When the result of the determination in S3602 is false (No in S3602), the management server program 271 (display portion 302 in FIG. 3) maintains the accentuation level of display of the line segment corresponding to the target lot and the target intra-step range (S3603). As a result, the line segment corresponding to the target lot and the target intra-step range is displayed in a non-accentuated manner.

When the result of the determination in S3602 is true (Yes in S3602), the management server program 271 (accentuation level determining portion 3212) determines an accentuation level in accordance with the deviation range to which the partial deviation calculated in S3602 belongs on the basis of the accentuation control table 3202 (S3604). The management server program 271 (display portion 302 in FIG. 3) performs the accentuated display on the line segment corresponding to the target lot and the target intra-step range at the determined accentuation level (S3605). Also, the management server program 271 specifies, from the event table 352, an event having any time (e.g., starting time or ending time of the event time block) belonging to the event time block earlier than the starting time in the target intra-step range for the target lot, and performs the accentuated display on the event display object 3101 corresponding to the specified event on the diagram chart (S3606).

After S3603 or S3606, the management server program 271 (deviation calculating portion 3211) calculates a partial deviation corresponding to the target inter-step range for the target lot, and determines whether the calculated partial deviation belongs to any deviation range (S3607). Specifically, the management server program 271 specifies a model to which the target lot belongs from, for example, the model-product table (not shown) described above, and specifies the partial standard LT corresponding to the target inter-step range and the specified model from the standard LT table 3201. The target inter-step range mentioned here is a range from the ending of the target step to the starting of the next step (may be a range from the ending of the previous step to the starting of the target step). The management server program 271 specifies the partial actual LT of the target lot for the target inter-step range from the past record table 351 corresponding to the specified model. The management server program 271 calculates a partial deviation which is the deviation between the specified partial standard LT and the specified partial actual LT. The management server program 271 determines whether or not the calculated partial deviation belongs to any of the plurality of deviation ranges shown in the accentuation control table 3202 (accentuation control table 3202 corresponding to the model to which the target lot belongs) for the partial deviation.

When the result of the determination in S3607 is false (No in S3607), the management server program 271 maintains the accentuation level of display of the line segment corresponding to the target lot and the target inter-step range (S3608). As a result, the line segment corresponding to the target lot and the target inter-step range is displayed in a non-accentuated manner.

When the result of the determination in S3607 is true (Yes in S3607), the management server program 271 (accentuation level determining portion 3212) determines an accentuation level in accordance with the deviation range to which the partial deviation calculated in S3607 belongs on the basis of the accentuation control table 3202 (S3609). The management server program 271 performs the accentuated display on the line segment corresponding to the target lot and the target inter-step range at the determined accentuation level (S3610). Also, the management server program 271 specifies, from the event table 352, an event having any time (e.g., starting time or ending time of the event time block) belonging to the event time block earlier than the starting time in the target inter-step range for the target lot, and performs the accentuated display on the event display object 3101 corresponding to the specified event on the diagram chart (S3611).

By the process shown in FIG. 36, the diagram chart 3100 shown by way of example in FIG. 31 is displayed.

Note that, in the diagram chart 3100, in place of or in addition to the event display object 3101, a rectangular portion corresponding to the retention situation satisfying a predetermined requirement, specifically, a rectangular portion corresponding to the retention number that is equal to or larger than a warning threshold and smaller than an abnormal threshold or a rectangular portion corresponding to the retention number that is equal to or larger than the abnormal threshold may be displayed. In the seventh embodiment, the retention number is calculated as shown by way of example in FIG. 37. The retention number calculation according to the seventh embodiment may be applied to at least one other embodiment.

Figure 37:
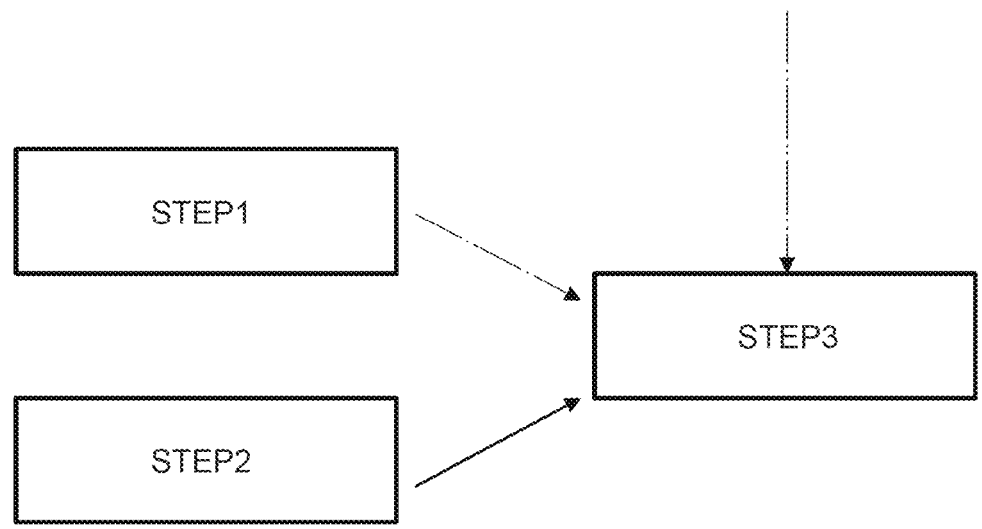
FIG. 37 schematically shows an example of retention number calculation according to the seventh embodiment.

FIG. 37 schematically shows an example of the retention number calculation according to the seventh embodiment.

The retention number calculating portion 361 calculates the retention number corresponding to one of the following numbers for each step for each of one or more times during the display target period on the basis of the past record table 351 corresponding to each model. The accentuation target determining portion 362 determines whether or not one or more retention situations in accordance with the retention number specified for each of the one or more times on a per step basis include a retention situation satisfying a predetermined requirement. The display portion 302 performs the accentuated display on a rectangular portion that is a portion which corresponds to an inter-step range and/or an intra-step range to which the step in which the retention situation satisfying the predetermined requirement has occurred belongs and to a period having the satisfying retention situation.

(p) The number of products for which the previous step has been completed before that time but the step has not been started at that time.

(q) The number of products for which the step has been started before that time but the step has not been completed at that time.

A specific example is as shown in FIG. 37. Specifically, for the model X, the step previous to step 3 is step 2, while for the model Z, the step previous to step 3 is step 1. Accordingly, the retention number calculating portion 361 specifies the number of products for which the previous step has been completed but step 3 has not been started from the past record table 351 corresponding to the models X and Z. The specified number of products is the retention number of (p) for step 3. Accordingly, the above Problem B is solved. Note that the retention number of (q) for step 3 is a number that can be specified from the past record table 351 corresponding to the models X, Z, and W corresponding to the sequential order of the steps including step 3, and also the number of products for which step 3 has been started but step 3 has not been completed.

Eighth Embodiment

In any of the embodiments described above, the management server program 271 can perform the accentuated display on a display object that satisfies the requirement associated with the attentional perspective. It may be possible for the user to specify which type of the display object to be subjected to the accentuated display, of a polygonal line, a line segment, a blank region, an event display object, a rectangular portion, or the like. At least one attentional perspective may be associated with the degree of importance of the attentional perspective.

For example, the processor portion (for example, the input portion 301) may provide a user interface (UI) for receiving specification of at least one attentional perspective or its degree of importance. At least one of the one or more attentional perspectives may be an attentional perspective specified via the UI, or may include the degree of importance of the attentional perspective. For example, the UI may include a selection UI and a degree-of-importance specification UI for each attentional perspective that can be specified by the user. A selection UI 1401 may be a UI (e.g., a check box) for inputting whether or not to select as the attentional perspective to be specified. A degree-of-importance specification UI may be a UI for inputting a degree of importance (e.g., one of three levels of high, medium, and low) associated with the attentional perspective. A character string showing the content of the attentional perspective may also be displayed.

Also, as the attentional perspective, various perspectives can be adopted. For example, as the attentional perspective that can be specified, at least one of perspectives shown below can be adopted, which are:

the size of an interval (a work suspension period in the same step (the difference between the ending time of the product y and the ending time of the product (y+1)));
the area of a blank region;
a target step;
the type of a facility (machine) associated with a production line;
the type of target work;
the occurrence of overtaking;
the relationship with the occurrence of overtaking (e.g., whether or not overtaking has occurred immediately before (a given time before) or immediately after (a given time after));
the occurrence of a defective product;
the relationship with the occurrence of a defective product (e.g., whether or not a defective product has occurred immediately before or immediately after);
the type of the occurred defect;
the degree of overtaking (e.g., the number of the overtaken products);
the magnitude of a specific measurement value;
the changing tendency of a specific measurement value;
the type or content of a facility alert;
a worker;
the type or content of data in a work record file (records of events (e.g., alert or work) occurred in a production site) associated with the occurrence time of at least one of a defective product, facility trouble, and a facility alert;
elimination of a display object associated with plan suspension from the accentuated display targets;
a maximum standby period;
the point of origin of a blank region;
the deviation between standard LT and actual LT; and
the retention situation (the retention number).

There may be at least one of an attentional perspective for which it is fixedly set in advance that selection of whether or not the attentional perspective is specified by a user is impossible and an attentional perspective for which selection of whether or not the attentional perspective is specified by a user is possible.

While some embodiments of the present invention have been described heretofore, the embodiments are examples for describing the present invention and are not intended to limit the scope of the present invention to the embodiments. The present invention can be implemented even in various other forms. For example, two or more of the first to eighth embodiments may be combined. Also, for example, in place of or in addition to the accentuation level of the blank region, the accentuation level of another type of display object (e.g., at least a portion of a polygonal line) is also a level in accordance with at least one of: the degree of importance of at least one of the one or more attentional perspectives on the basis of which the display object is determined to be the accentuated display target; the number of attentional perspectives on the basis of which the display object is determined to be the accentuated display target; and a value obtained for the display object on the basis of the attentional perspectives.

What is claimed is:

1. A production management supporting system, comprising:

an interface including one or more interfaces and coupled to a display device;
a storage including one or more memories, the storage storing order of step information showing a sequential order of steps for each model and past record information that includes information of a past record which shows a completion time for each product loaded in a production system in which a plurality of different models of products are loaded and a sequential order of two or more of a plurality of steps is different depending on the model of each of the steps; and
a processor coupled to the interface and to the storage, wherein
the production management chart has a first axis and a second axis perpendicular to the first axis,
the first axis corresponds to time,
the second axis corresponds to the steps,
the processor:
displays a production management chart on the display device referring to the past record information, wherein the production management chart shows a production situation and includes display objects,
receives a selection of at least one of the plurality of models as an at least one selected model,
specifies the sequential order of the steps of the at least one selected model, referring to the order of step information, and
rearranges an arrangement order of the steps along a step axis to the sequential order of the steps corresponding to the at least one selected model,
wherein the processor controls production of each product produced in the production system based on the at least one selected model;
wherein the production management chart is for at least one of the plurality of models, for each product unit in which the execution time of at least one of the plurality of steps belongs to a display target period,
each product unit is a product or a lot,
a point on each polygonal line corresponds to the step and the execution time of the step,
the execution time of each of the steps in the past record information is at least one of a starting time and an ending time of the step, and
the display object that satisfies one or more requirements associated with the one or more attentional perspectives is a polygonal line or a line segment that corresponds to the product unit for which a deviation between a standard lead time for the corresponding model and an actual lead time obtained from the past record information satisfies any of one or more deviation requirements;
wherein the one or more deviation requirements are a plurality of deviation ranges,
the accentuation level of the polygonal line or the line segment that satisfies the one or more requirements differs depending on which of the plurality of deviation ranges the deviation belongs to;

wherein the processor:
specifies, for each of one or more times during the display target period and on a per step basis, a retention number corresponding to any of numbers shown below on the basis of the past record information:
the number of products for which the previous step has been completed before the time but the step has not been started at the time; and
the number of products for which the step has been started before the time but the step has not been completed at the time, and
determines whether or not one or more retention situations in accordance with the retention number specified for each of the one or more times on a per step basis include a retention situation satisfying a predetermined requirement, and
the display object that satisfies the one or more requirements associated with the one or more attentional perspectives is a target portion that is a portion which corresponds to an inter-step range and/or an intra-step range to which a step in which the retention situation satisfying the predetermined requirement has occurred belongs and to a period having the satisfying retention situation, in the production management chart.

2. The production management supporting system according to claim 1, wherein, for each model,
the standard lead time is a standard period from the starting of an initial step to the ending of a final step in the sequential order of the steps corresponding to the model, and
the actual lead time is a period from the actual starting time of the initial step to the actual ending time of the final step in the sequential order of the steps corresponding to the model.

3. The production management supporting system according to claim 1, wherein, for each model,
the standard lead time is a standard period of an intra-step range and/or an inter-step range of interest in the sequential order of the steps corresponding to the model, and
the actual lead time is an actual period of the intra-step range and/or the inter-step range of interest in the sequential order of the steps corresponding to the model.

4. The production management supporting system according to claim 1, wherein,
in the past record information, the execution time of each of the steps is a starting time and an ending time of the step,
in the production management chart, in the sequential order of the steps, starting axes corresponding to the starting times and parallel with the first axis and ending axes corresponding to the ending times and parallel with the first axis are alternately arranged along a direction perpendicular to the first axis, and consequently intra-step bands and inter-step bands are alternately arranged along a direction parallel with the second axis, each of the intra-step bands being a band-like region extending in parallel with the first axis from the starting axis to the ending axis and corresponding to the intra-step range from starting of the step to ending of the step, each of the inter-step bands being a band-like region extending in parallel with the first axis from the ending axis to the starting axis and corresponding to the inter-step range from the ending of the step to starting of a subsequent step, and the accentuated display of the target portion is accentuated display of a rectangular portion corresponding to a period having the satisfying retention situation in the inter-step band or the intra-step band corresponding to the inter-step range or the intra-step range to which the step in which the satisfying retention situation has occurred belongs.

5. The production management supporting system according to claim 1, wherein
the display object subjected to the accentuated display in the production management chart is a display object for the selected at least one model.

6. The production management supporting system according to claim 1, wherein
the processor receives a selection of at least one step as a retention portion among the plurality of steps, and
the display object subjected to the accentuated display in the production management chart is a display object for the model corresponding to the sequential order of the steps including the selected at least one step as a step other than starting of an initial step.

7. The production management supporting system according to claim 1, wherein the processor:
analyzes the past record information on the basis of one or more attentional perspectives on the plurality of different models of products to detect, among display objects displayed in the production management chart, a display object satisfying one or more requirements associated with the one or more attentional perspectives, and
performs accentuated display on at least one of the detected display objects.

8. A production management supporting system, comprising:
an interface including one or more interfaces and coupled to a display device;
a storage including one or more memories, the storage storing order of step information showing a sequential order of steps for each model and past record information that includes information of a past record which shows a completion time for each product loaded in a production system in which a plurality of different models of products are loaded and a sequential order of two or more of a plurality of steps is different depending on the model of each of the steps; and
a processor coupled to the interface and to the storage, wherein
the production management chart has a first axis and a second axis perpendicular to the first axis,
the first axis corresponds to time,
the second axis corresponds to the steps,
the processor:
displays a production management chart on the display device referring to the past record information, wherein the production management chart shows a production situation and includes display objects,
receives a selection of at least one of the plurality of models as an at least one selected model,
specifies the sequential order of the steps of the at least one selected model, referring to the order of step information, and
rearranges an arrangement order of the steps along a step axis to the sequential order of the steps corresponding to the at least one selected model,
wherein the processor controls production of each product produced in the production system based on the at least one selected model;

wherein the production management chart is for at least one of the plurality of models, for each product unit in which the execution time of at least one of the plurality of steps belongs to a display target period, each product unit is a product or a lot, a point on each polygonal line corresponds to the step and the execution time of the step, the execution time of each of the steps in the past record information is at least one of a starting time and an ending time of the step, and the display object that satisfies one or more requirements associated with the one or more attentional perspectives is a polygonal line or a line segment that corresponds to the product unit for which a deviation between a standard lead time for the corresponding model and an actual lead time obtained from the past record information satisfies any of one or more deviation requirements;

wherein the one or more deviation requirements are a plurality of deviation ranges, the accentuation level of the polygonal line or the line segment that satisfies the one or more requirements differs depending on which of the plurality of deviation ranges the deviation belongs to;

wherein the processor:
 specifies, for each of one or more times during the display target period and on a per step basis, a retention number corresponding to any of numbers shown below on the basis of the past record information:
  the number of products for which the previous step has been completed before the time but the step has not been started at the time; and
  the number of products for which the step has been started before the time but the step has not been completed at the time, and
 determines whether or not one or more retention situations in accordance with the retention number specified for each of the one or more times on a per step basis include a retention situation satisfying a predetermined requirement, and the display object that satisfies the one or more requirements associated with the one or more attentional perspectives is a target portion that is a portion which corresponds to an inter-step range and/or an intra-step range to which a step in which the retention situation satisfying the predetermined requirement has occurred belongs and to a period having the satisfying retention situation, in the production management chart.

9. A production management supporting method, comprising the steps of:

analyzing, by a processor, on the basis of one or more attentional perspectives on a plurality of different models of products, order of step information showing a sequential order of steps for each model and past record information that includes information as a past record which shows a completion time for each product loaded in a production system in which the plurality of different models of products are loaded and a sequential order of two or more of a plurality of steps is different depending on the model, of each of the steps, to detect, among display objects displayed in the production management chart, a display object satisfying one or more requirements associated with the one or more attentional perspectives, wherein the production management chart has a first axis and a second axis perpendicular to the first axis, wherein the first axis corresponds to time, and wherein the second axis corresponds to the steps; and displaying a production management chart on a display device referring to the past record information, the production management chart showing a production situation and the display objects;

receiving a selection of at least one of the plurality of models as an at least one selected model;

specifying the sequential order of the steps of the at least one selected model, referring to the order of step information; and rearranging an arrangement order of the steps along a step axis to the sequential order of the steps corresponding to the at least one selected model, wherein the processor controls production of each product produced in the production system based on the at least one selected model;

wherein the production management chart is for at least one of the plurality of models, for each product unit in which the execution time of at least one of the plurality of steps belongs to a display target period, each product unit is a product or a lot, a point on each polygonal line corresponds to the step and the execution time of the step, the execution time of each of the steps in the past record information is at least one of a starting time and an ending time of the step, and the display object that satisfies one or more requirements associated with the one or more attentional perspectives is a polygonal line or a line segment that corresponds to the product unit for which a deviation between a standard lead time for the corresponding model and an actual lead time obtained from the past record information satisfies any of one or more deviation requirements;

wherein the one or more deviation requirements are a plurality of deviation ranges, and wherein the accentuation level of the polygonal line or the line segment that satisfies the one or more requirements differs depending on which of the plurality of deviation ranges the deviation belongs to;

specifying, for each of one or more times during the display target period and on a per step basis, a retention number corresponding to any of numbers shown below on the basis of the past record information:
 the number of products for which the previous step has been completed before the time but the step has not been started at the time, and
 the number of products for which the step has been started before the time but the step has not been completed at the time; and determining whether or not one or more retention situations in accordance with the retention number specified for each of the one or more times on a per step basis include a retention situation satisfying a predetermined requirement;

wherein the display object that satisfies the one or more requirements associated with the one or more attentional perspectives is a target portion that is a portion which corresponds to an inter-step range and/or an intra-step range to which a step in which the retention situation satisfying the predetermined requirement has occurred belongs and to a period having the satisfying retention situation, in the production management chart.

10. A computer program for causing a computer to perform the steps of:

analyzing, by a processor, on the basis of one or more attentional perspectives on a plurality of different models of products, order of step information showing a sequential order of steps for each model and past record information that includes information as a past record which shows a completion time for each product loaded in a production system in which the plurality of different models of products are loaded and a sequential order of two or more of a plurality of steps is different depending on the model, of each of the steps, to detect, among display objects displayed in the production management chart, a display object satisfying one or more requirements associated with the one or more attentional perspectives,
  wherein the production management chart has a first axis and a second axis perpendicular to the first axis,
  wherein the first axis corresponds to time, and
  wherein the second axis corresponds to the steps; and
displaying a production management chart on a display device referring to the past record information, the production management chart showing a production situation and the display objects;
receiving a selection of at least one of the plurality of models as an at least one selected model;
specifying the sequential order of the steps of the at least one selected model, referring to the order of step information; and
rearranging an arrangement order of the steps along a step axis to the sequential order of the steps corresponding to the at least one selected model,
wherein the processor controls production of each product produced in the production system based on the at least one selected model;
wherein the production management chart is for at least one of the plurality of models, for each product unit in which the execution time of at least one of the plurality of steps belongs to a display target period,
each product unit is a product or a lot,
a point on each polygonal line corresponds to the step and the execution time of the step,
the execution time of each of the steps in the past record information is at least one of a starting time and an ending time of the step, and
the display object that satisfies one or more requirements associated with the one or more attentional perspectives is a polygonal line or a line segment that corresponds to the product unit for which a deviation between a standard lead time for the corresponding model and an actual lead time obtained from the past record information satisfies any of one or more deviation requirements;
wherein the one or more deviation requirements are a plurality of deviation ranges, and
wherein the accentuation level of the polygonal line or the line segment that satisfies the one or more requirements differs depending on which of the plurality of deviation ranges the deviation belongs to;
specifying, for each of one or more times during the display target period and on a per step basis, a retention number corresponding to any of numbers shown below on the basis of the past record information:
  the number of products for which the previous step has been completed before the time but the step has not been started at the time, and
  the number of products for which the step has been started before the time but the step has not been completed at the time; and
determining whether or not one or more retention situations in accordance with the retention number specified for each of the one or more times on a per step basis include a retention situation satisfying a predetermined requirement;
wherein the display object that satisfies the one or more requirements associated with the one or more attentional perspectives is a target portion that is a portion which corresponds to an inter-step range and/or an intra-step range to which a step in which the retention situation satisfying the predetermined requirement has occurred belongs and to a period having the satisfying retention situation, in the production management chart.

* * * * *